(12) United States Patent
Yamagishi et al.

(10) Patent No.: US 10,595,064 B2
(45) Date of Patent: Mar. 17, 2020

(54) RECEIVING DEVICE, TRANSMITTING DEVICE, AND DATA PROCESSING METHOD

(71) Applicant: SONY CORPORATION, Tokyo (JP)

(72) Inventors: Yasuaki Yamagishi, Kanagawa (JP); Tatsuya Igarashi, Tokyo (JP); Naohisa Kitazato, Tokyo (JP); Yoshiharu Dewa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/566,900

(22) PCT Filed: Apr. 26, 2016

(86) PCT No.: PCT/JP2016/062985
§ 371 (c)(1),
(2) Date: Oct. 16, 2017

(87) PCT Pub. No.: WO2016/203850
PCT Pub. Date: Dec. 22, 2016

(65) Prior Publication Data
US 2018/0131972 A1 May 10, 2018

(30) Foreign Application Priority Data
Jun. 16, 2015 (JP) .................................. 2015-120805

(51) Int. Cl.
*G06F 3/00* (2006.01)
*G06F 13/00* (2006.01)
(Continued)

(52) U.S. Cl.
CPC ........ *H04N 21/2362* (2013.01); *H04H 60/13* (2013.01); *H04N 21/434* (2013.01);
(Continued)

(58) Field of Classification Search
CPC ............ H04N 21/2362; H04N 21/434; H04N 21/44222; H04N 21/478; H04N 21/8173; H04H 60/13
See application file for complete search history.

(56) References Cited

U.S. PATENT DOCUMENTS 9,398,323 B2 * 7/2016 Patel .................... G06F 3/0482
2006/0095952 A1 5/2006 Chung
(Continued)

FOREIGN PATENT DOCUMENTS

EP  1 898 539 A2  3/2008
JP  2011-87103 A  4/2011
(Continued)

OTHER PUBLICATIONS

International Search Report dated Aug. 9, 2016 in PCT/JP2016/062985 filed Apr. 26, 2016.
(Continued)

*Primary Examiner* — Mulugeta Mengesha
(74) *Attorney, Agent, or Firm* — Oblon, McClelland, Maier & Neustadt, L.L.P.

(57) ABSTRACT

A configuration is realized such that a playback application applied in a receiving device can be determined using a service category identifier recorded in an SLT that can be received in advance. The service category identifier capable of identifying an application applied to a provided service such as a program provided by a transmitting device is transmitted to the receiving device. The receiving device performs a continuation process on an application applied before service transition when the service transition occurs and when applications applied to services before and after the transition are same. The service category identifier is an identifier capable of identifying the service by determining
(Continued)

whether to apply a residential playback application or a broadcast playback application for playback of the service.

20 Claims, 29 Drawing Sheets

(51) Int. Cl.
    *H04N 5/445*     (2011.01)
    *H04N 21/2362*     (2011.01)
    *H04N 21/434*     (2011.01)
    *H04N 21/478*     (2011.01)
    *H04H 60/13*     (2008.01)
    *H04N 21/81*     (2011.01)
    *H04N 21/442*     (2011.01)

(52) U.S. Cl.
    CPC ..... *H04N 21/44222* (2013.01); *H04N 21/478* (2013.01); *H04N 21/8173* (2013.01)

(56) References Cited

U.S. PATENT DOCUMENTS

| | | | |
|---|---|---|---|
| 2008/0072265 A1 | 3/2008 | Kim et al. | |
| 2009/0249326 A1 | 10/2009 | Ridley et al. | |
| 2011/0182562 A1* | 7/2011 | Iwakiri | H04N 21/235 386/248 |
| 2012/0050619 A1* | 3/2012 | Kitazato | H04N 21/44008 348/723 |
| 2014/0043540 A1 | 2/2014 | Kitazato et al. | |
| 2014/0173673 A1 | 6/2014 | Kitahara et al. | |
| 2015/0156546 A1 | 6/2015 | Moon et al. | |

FOREIGN PATENT DOCUMENTS

| | | |
|---|---|---|
| JP | 2014-57227 A | 3/2014 |
| WO | 2013/179570 A1 | 12/2013 |
| WO | 2015/083468 A1 | 6/2015 |
| WO | WO 2015/083315 A1 | 6/2015 |

OTHER PUBLICATIONS

Extended European Search Report dated Oct. 1, 2018 in European Patent Application No. 16811325.6, 7 pages.

* cited by examiner

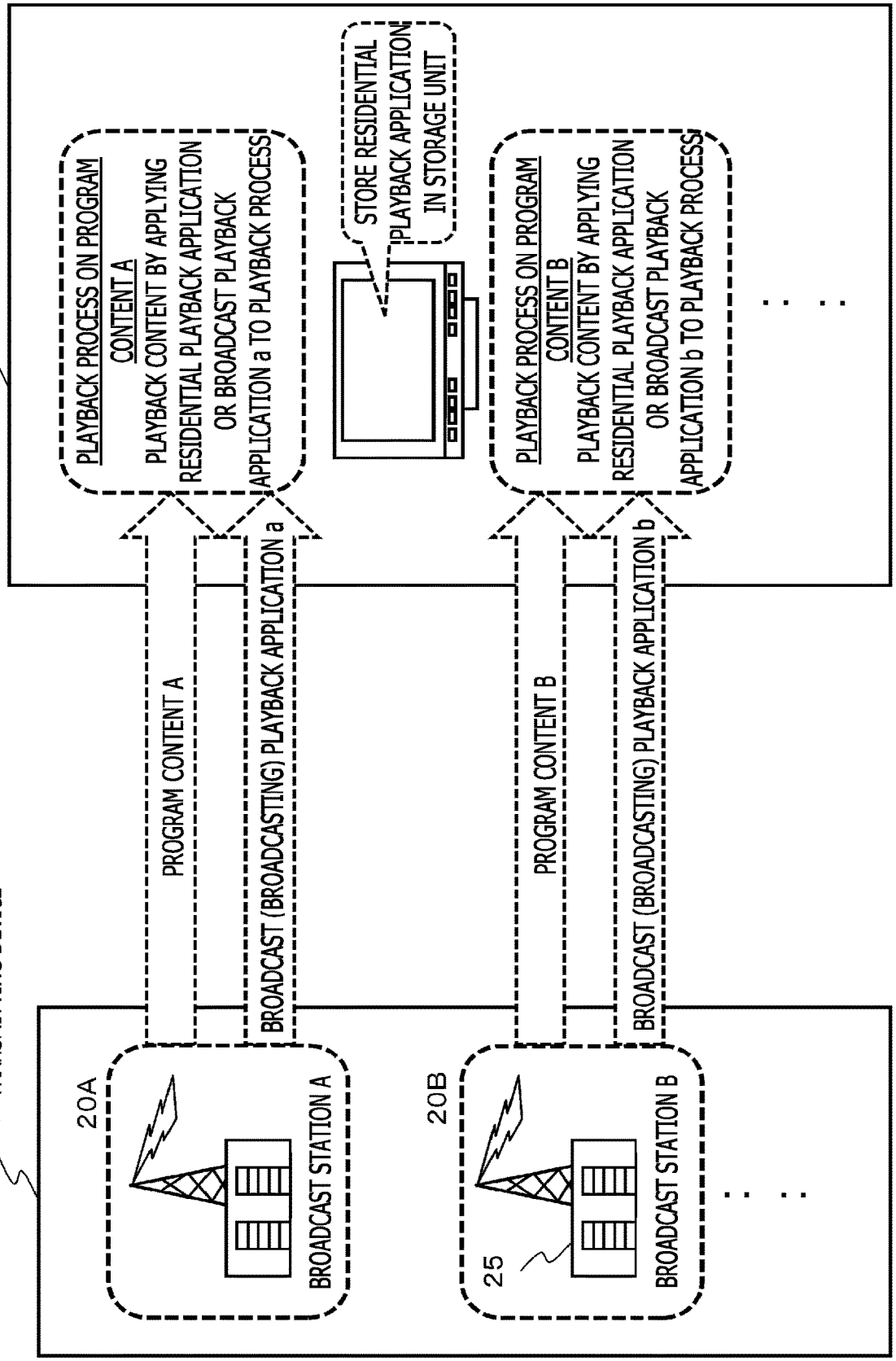

FIG. 6

| BROADCAST STATION | PROGRAM | PLAYBACK APPLICATION APPLIED TO PROGRAM PLAYBACK |
|---|---|---|
| BROADCAST STATION A | PROGRAM a1 | RESIDENTIAL PLAYBACK APPLICATION |
| | PROGRAM a2 | BROADCAST (BROADCASTING) PLAYBACK APPLICATION (BROADCAST STATION A-ENABLED PLAYBACK APPLICATION) |
| | PROGRAM a3 | BROADCAST (BROADCASTING) PLAYBACK APPLICATION (PROGRAM a3-ENABLED PLAYBACK APPLICATION) |
| | PROGRAM a4 | BROADCAST (BROADCASTING) PLAYBACK APPLICATION (BROADCAST STATION A-ENABLED PLAYBACK APPLICATION) |
| | .. | .. |
| BROADCAST STATION B | PROGRAM b1 | BROADCAST (BROADCASTING) PLAYBACK APPLICATION (BROADCAST STATION B-ENABLED PLAYBACK APPLICATION) |
| | PROGRAM b2 | BROADCAST (BROADCASTING) PLAYBACK APPLICATION (PROGRAM b2-ENABLED PLAYBACK APPLICATION) |
| | PROGRAM b3 | RESIDENTIAL PLAYBACK APPLICATION |
| | .. | .. |

FIG.11

| SERVICE CATEGORY (service_category) IDENTIFIER | MEANING (Meaning) |
|---|---|
| 0x00 | NOT SPECIFIED [Not specified] |
| 0x01 | LINEAR SERVICE (AUDIO/VIDEO OR AUDIO ONLY)-RESIDENTIAL PLAYBACK APP APPLICATION CONTROL [Linear service (A/V or Audio only)-Residential Control] |
| 0x02 | LINEAR SERVICE (AUDIO/VIDEO OR AUDIO ONLY)-BROADCAST PLAYBACK APP APPLICATION CONTROL [Linear service (A/V or Audio only)-Broadcaster Control] |
| 0x03 | APPLICATION-BASED SERVICE-BROADCAST APP APPLICATION CONTROL [App-based service] |
| 0x04~0x0F | RESERVED AREA [Reserved for future use] |

| SERVICE CATEGORY (service_category) IDENTIFIER | MEANING (Meaning) |
|---|---|
| 0x00 | NOT SPECIFIED [Not specified] |
| 0x01 | LINEAR SERVICE (AUDIO/VIDEO)-RESIDENTIAL PLAYBACK APP APPLICATION CONTROL [Linear service (A/V)-Residential Control] |
| 0x02 | LINEAR SERVICE (AUDIO/VIDEO)-BROADCAST PLAYBACK APP APPLICATION CONTROL [Linear service (A/V)-Broadcaster Control] |
| 0x03 | LINEAR SERVICE (AUDIO ONLY)-RESIDENTIAL PLAYBACK APP APPLICATION CONTROL [Linear service (Audio only)-Residential Control] |
| 0x04 | LINEAR SERVICE (AUDIO ONLY)-BROADCAST PLAYBACK APP APPLICATION CONTROL [Linear service (Audio only)-Broadcaster Control] |
| 0x05 | APPLICATION-BASED SERVICE-BROADCAST APP APPLICATION CONTROL [App-based service] |
| 0x06~0x0F | RESERVED AREA [Reserved for future use] |

FIG. 12

| SERVICE CATEGORY (service_category) IDENTIFIER | MEANING (Meaning) |
|---|---|
| 0x00 | NOT SPECIFIED [Not specified] |
| 0x01 | LINEAR SERVICE (AUDIO/VIDEO OR AUDIO ONLY)-RESIDENTIAL PLAYBACK APP APPLICATION CONTROL [Linear service (A/V or Audio only)-Residential Control] |
| 0x02 | LINEAR SERVICE (AUDIO/VIDEO OR AUDIO ONLY)-BROADCAST PLAYBACK APP APPLICATION CONTROL (NATIVE APP) [Linear service (A/V or Audio only)-Broadcaster Control-Native] |
| 0x03 | LINEAR SERVICE (AUDIO/VIDEO OR AUDIO ONLY)-BROADCAST PLAYBACK APP APPLICATION CONTROL (SHARED APP) [Linear service (A/V or Audio only)-Broadcaster Control-Shared] |
| 0x04 | APPLICATION-BASED SERVICE-BROADCAST APP APPLICATION CONTROL [App-based service] |
| 0x05~0x0F | RESERVED AREA [Reserved for future use] |

F I G . 1 3

| SERVICE CATEGORY (service_category) IDENTIFIER | MEANING (Meaning) |
|---|---|
| 0x00 | NOT SPECIFIED [Not specified] |
| 0x01 | LINEAR SERVICE (AUDIO/VIDEO)-RESIDENTIAL PLAYBACK APP APPLICATION CONTROL [Linear service (A/V)-Residential Control] |
| 0x02 | LINEAR SERVICE (AUDIO/VIDEO)-BROADCAST PLAYBACK APP APPLICATION CONTROL (NATIVE APP) [Linear service (A/V)-Broadcaster Control-Native] |
| 0x03 | LINEAR SERVICE (AUDIO/VIDEO)-BROADCAST PLAYBACK APP APPLICATION CONTROL (SHARED APP) [Linear service (A/V)-Broadcaster Control-Shared] |
| 0x04 | LINEAR SERVICE (AUDIO ONLY)-RESIDENTIAL PLAYBACK APP APPLICATION CONTROL [Linear service (Audio only)-Residential Control] |
| 0x05 | LINEAR SERVICE (AUDIO ONLY)-BROADCAST PLAYBACK APP APPLICATION CONTROL (NATIVE APP) [Linear service (Audio only)-Broadcaster Control-Native] |
| 0x06 | LINEAR SERVICE (AUDIO ONLY)-BROADCAST PLAYBACK APP APPLICATION CONTROL (SHARED APP) [Linear service (Audio only)-Broadcaster Control-Shared] |
| 0x07 | APPLICATION-BASED SERVICE-BROADCAST APP APPLICATION CONTROL [App-based service] |
| 0x08~0x0F | RESERVED AREA [Reserved for future use] |

F I G . 1 4

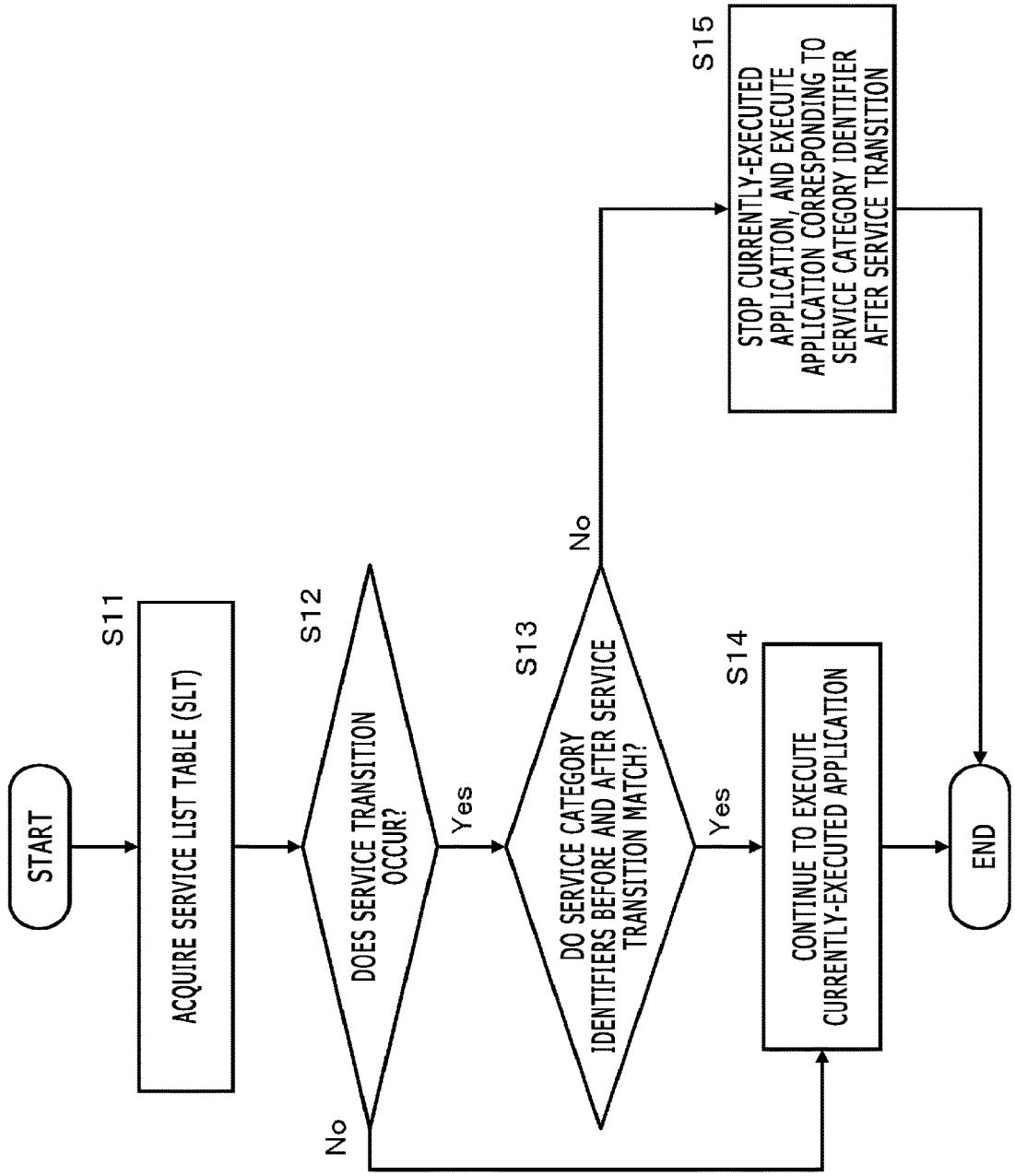

F I G. 17

```
<ServiceDescovery ... > ...
  <mhp:ApplicationDescovery ... > ...
    <mhp:ApplicationList ... > ...
      <mhp:Application ... > ...
        <mhp:applicationSpecificDescriptor ... > ...
        <mhp:otherDescriptor ... > ...
        <atsc:ContinuousComponentSupportable>true</atsc:ContinuousComponentSupportable> ...
        </mhp:otherDescriptor> ...
        </mhp:applicationSpecificDescriptor> ...
      </mhp:Application> ...
    </mhp:ApplicationList> ...
  </mhp:ApplicationDescovery> ...
</ServiceDescovery>
```

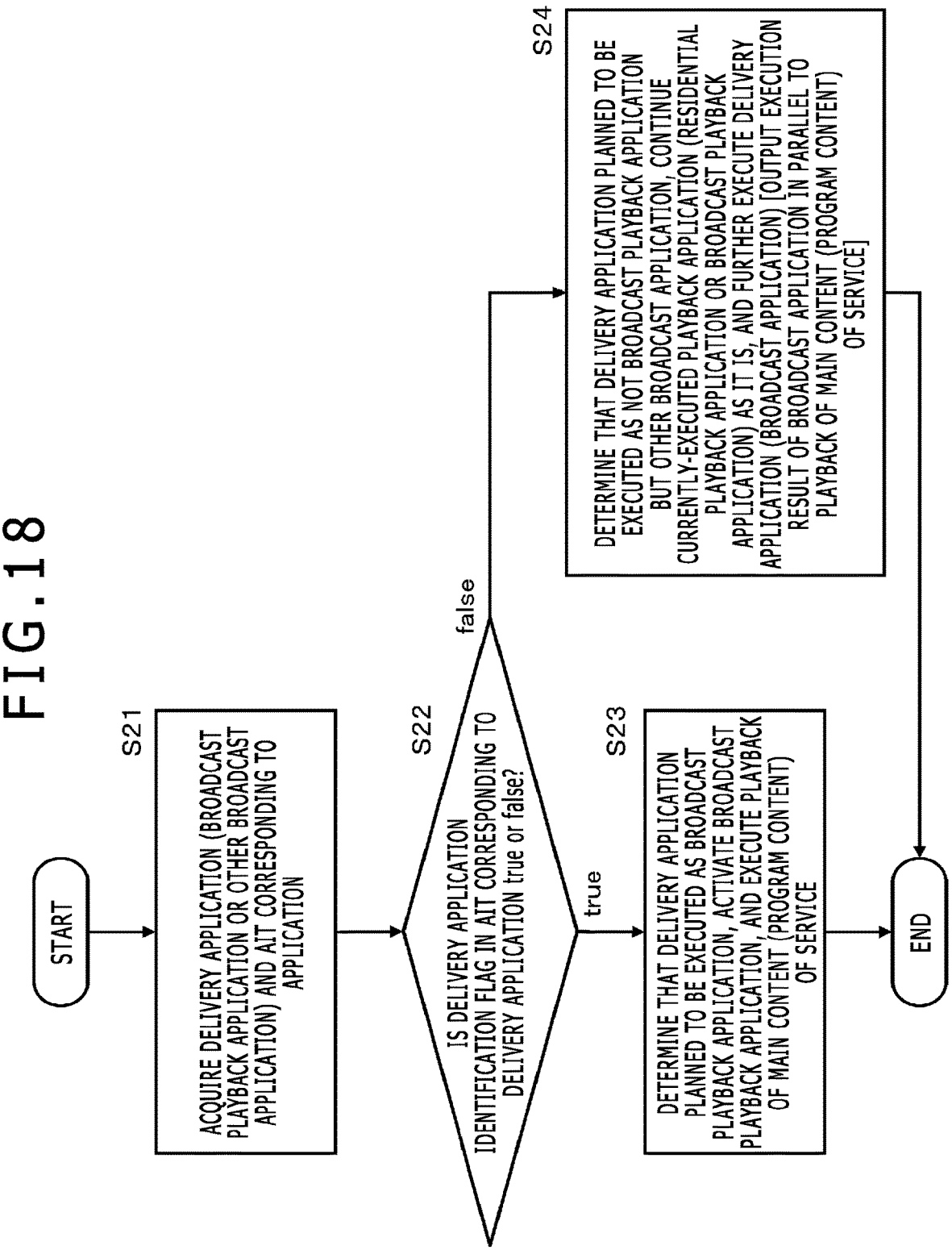

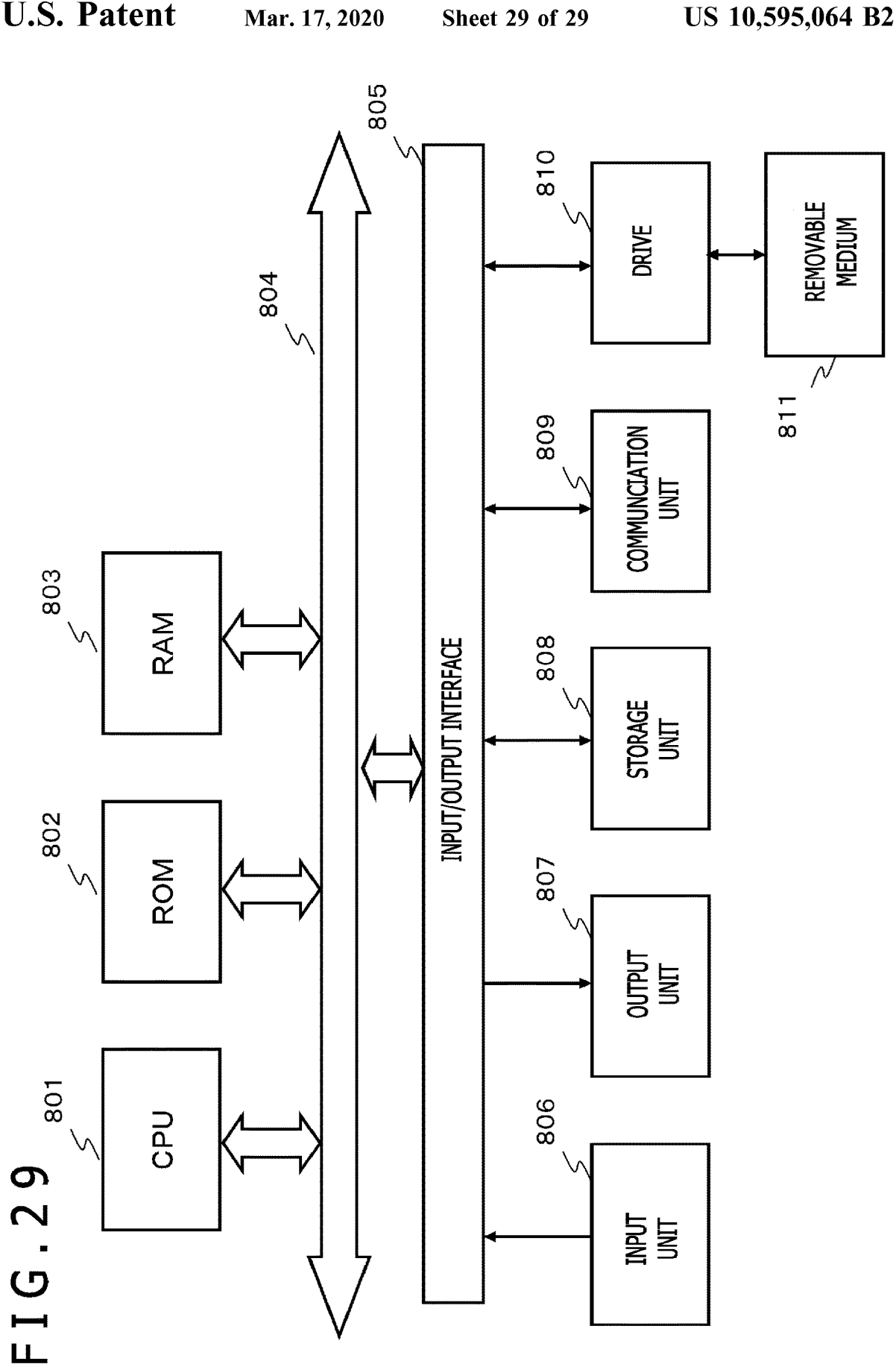

RECEIVING DEVICE, TRANSMITTING DEVICE, AND DATA PROCESSING METHOD

TECHNICAL FIELD

The present disclosure relates to a receiving device, a transmitting device, and a data processing method. More specifically, the present disclosure relates to a receiving device and a transmitting device for executing reception or transmission of data via, for example, a broadcast wave or a network, and a communication data-enabled data processing method.

BACKGROUND ART

There is known an OTT (Over The Top) as a data delivery scheme capable of delivering a content such as image data and audio data irrespectively of a service form of each telecommunications carrier. A content delivered by the OTT is referred to as "OTT content," and an image (video) data delivery service using the OTT is referred to as OTT video or "OTT-V (Over The Top Video)."

A DASH (Dynamic Adaptive Streaming over HTTP) standard is present as a data streaming delivery standard compliant with the OTT-V. The DASH is the standard related to adaptive streaming delivery using a streaming protocol based on an HTTP (Hypertext Transfer Protocol).

For adaptive streaming, a content delivery server such as a broadcast station creates segmented files of a video content at a plurality of bitrates and a manifest file that describes attribute information and URLs (Uniform Resource Locators) of these files, and provides the files to a client in order to allow playback of contents in various clients which become a destination of data delivery.

The client acquires the manifest file from the server, selects a content at an optimum bitrate according to a size of a display unit of the client or an available communication band therefor, and receives and plays back the selected contents. Bitrates can be dynamically changed in response to a variation in a network band, so that the client can receive an optimum content depending on a situation by switching as needed and realize playback of the video content with reduced frequency of the occurrence of video interruption. It is noted that the adaptive streaming is described in, for example, PTL 1 (JP 2011-87103A).

The development and standardization of a system for enabling transmitting and receiving a content of a broadcast program and the like from a transmitting device such as a broadcast station or another content server to a receiving device such as a television, a PC (Personal Computer) or a mobile terminal by using uni-directional communication via a broadcast wave or the like, or using bi-directional communication or uni-directional communication via a network such as the Internet are currently actively underway.

Examples of a conventional technique disclosing a technique for realizing data delivery via a broadcast wave and a network include PTL 2 (JP 2014-057227A).

As a standard related to data delivery systems via the broadcast wave and the network, the standardization of ATSC (Advanced Television System Committee) 3.0 is currently underway.

In relation to the ATSC 3.0, a configuration that can receive signaling data including control information and the like for ATSC broadcasting and enables various controls by the signaling data by implementing middleware that executes processes such as a process for receiving ATSC 3.0 broadcasting in a receiving device that implements ATSC 3.0-compatible physical layers (ATSC-PHY) is under consideration.

Specifically, the configuration that can realize a process for outputting a broadcast content using an application program used in the Internet or the like or so-called client application as it is, and a data process using various applications provided via the broadcast wave and the like under the control of the signaling data is under consideration.

For example, the ATSC 3.0-compatible physical layers (ATSC-PHY) and the ATSC 3.0 broadcast receiving middleware are implemented in a server (such as a PC, a TV (Television), a tablet, or a smartphone as well as a dedicated server) installed in an ordinary house or a hot spot and receiving broadcast services.

Once such a server receives an ATSC 3.0 broadcast service, the server transfers broadcast received data to a user device (such as a PC, a TV, a tablet, or a smartphone) via a network (such as LAN (Local Area Network)/WiFi (Wireless Fidelity) such as a home network or a hot spot).

The user device that has received the broadcast received data transferred via the server can play back the broadcast content using an application (such as an ATSC 3.0 DASH client application) running on a playback control unit or an application control unit of the user device and execute various applications delivered by broadcasting.

A broadcast server such as the broadcast station that transmits a broadcast program can provide not only program data (broadcasting content) but also an application (referred to as "playback application, player application, or the like") that executes a program data playback process to the receiving device (client) such as the TV that is the user device.

For example, a broadcast station A provides a playback application a that is applicable only to the playback of a content provided by the broadcast station A to the receiving device (client) via the broadcast wave or the like.

The receiving device (client) can receive the playback application a, and play back the content provided by the broadcast station A by a playback process to which the received playback application a is applied.

A broadcast station B provides a playback application b different from the playback application a, and the receiving device (client) play backs a content provided by the broadcast station B using the playback application b when playing back the content.

Furthermore, the broadcast server can provide not a playback application per broadcast station but also a playback application per specific program. The receiving device (client) play backs a specific program while applying a program-enabled playback application received from the transmitting device to a playback process when playing back the program.

However, the receiving device (client) such as the television originally holds a playback application or a so-called residential (resident type) playback application that is embedded in the receiving device at a time of manufacturing, and has conventionally and normally executed a process for playing back a program using one residential playback application irrespectively of channel setting.

If the broadcast server provides the playback application per broadcast station or per program in the future as described above, it is essential for the receiving device (client) to select one playback application applied to the playback of each program from among a plurality of playback applications and to use the selected playback application.

If the receiving device fails to acquire or select a correct broadcast station-enabled or program-enabled playback application, the failure causes a situation in which the receiving device is unable to play back a correct program.

For example, if a playback application that should be applied to the playback of a program provided by a certain broadcast station is limited to an application delivered and provided by the broadcast station and the receiving device incorrectly uses the residential playback application, this failure causes a situation in which the receiving device is unable to play back a correct program.

However, under a present situation, specifications for configurations of processes such as a process for providing a playback application and a process for acquiring, selecting, and using the playback application by the receiving device are not specifically defined yet.

CITATION LIST

Patent Literature

[PTL 1]
JP 2011-87103A
[PTL 2]
JP 2014-057227A

SUMMARY

Technical Problems

The present disclosure has been achieved in the light of, for example, the problems described above, and an object of the present disclosure is to provide a receiving device, a transmitting device, and a data processing method capable of realizing processes for appropriately selecting and using a playback application with a configuration in which a broadcast station-enabled or broadcast program-enabled playback application or the like is provided to the receiving device.

Solution to Problems

According to a first aspect of the present disclosure, there is provided a receiving device including a communication unit receiving a service category identifier that can identify an application applied to a service provided by a transmitting device, and a data processing unit configured to determine an application applied to the service in response to the service category identifier, and perform a continuation process on an application applied before service transition when the service transition occurs and when applications applied to services before and after the transition are same.

Furthermore, according to a second aspect of the present disclosure, there is provided a transmitting device including a communication unit configured to transmit configuration data on a service available in a receiving device, a service category identifier capable of identifying an application applied to the service, and the application applied to the service.

Moreover, according to a third aspect of the present disclosure, there is provided a data processing method executed by a receiving device. The data processing method includes receiving, by a communication unit, a service category identifier capable of identifying an application applied to a service provided by a transmitting device, determining, by a data processing unit, an application applied to the service in response to the service category identifier, and performing, by the data processing unit, a continuation process on an application applied before service transition when the service transition occurs and when applications applied to services before and after the service transition are same.

Furthermore, according to a fourth aspect of the present disclosure, there is provided a data processing method executed by a transmitting device. The data processing method includes transmitting configuration data on a service available in a receiving device, a service category identifier capable of identifying an application applied to the service, and the application applied to the service.

Still other objects, features, and advantages of the present disclosure will be readily apparent from more detailed description based on embodiments of the present disclosure and accompanying drawings to be described later. It is noted that a system means in the present specification a logical assembly configuration of a plurality of devices and is not limited to a system in which devices with configurations are provided in the same casing.

Advantageous Effects of Invention

According to the configuration of one embodiment of the present disclosure, a configuration in which the playback application applied in the receiving device can be determined using the service category identifier recorded in the SLT that can be received in advance is realized.

Specifically, the service category identifier capable of identifying an application applied to a provided service such as a program provided by the transmitting device is transmitted to the receiving device. The receiving device performs a continuation process on an application applied before service transition when the service transition occurs and when applications applied to services before and after the transition are same. The service category identifier is an identifier capable of identifying the service by determining whether to apply a residential playback application or a broadcast playback application for playback of the service.

With the present configuration, a configuration is realized such that a playback application applied in a receiving device can be determined using a service category identifier recorded in an SLT that can be received in advance.

The effects described in the present specification are given as an example only, and the effects are not limited to those described in the present specification and may contain additional effects.

BRIEF DESCRIPTION OF DRAWINGS

FIG. 5 is an explanatory diagram of an example of data transmitted from the transmitting device to the receiving device and a data process in the receiving device.

FIG. 6 is an explanatory diagram of an example of data transmitted from the transmitting device to the receiving device and a data process in the receiving device.

FIG. 11 is an explanatory diagram of an example of setting of service category identifiers.

FIG. 12 is an explanatory diagram of an example of setting of the service category identifiers.

FIG. 13 is an explanatory diagram of an example of setting of the service category identifiers.

FIG. 14 is an explanatory diagram of an example of setting of the service category identifiers.

FIG. 15 depicts a flowchart explaining a process sequence using the service category identifiers.

FIG. 17 is an explanatory diagram of an example of XML data describing the delivery application identification flags in the AIT (Application Information Table).

FIG. 18 depicts a flowchart explaining a process sequence using the delivery application identification flags.

FIG. 29 is an explanatory diagram of an example of hardware configurations of the transmitting device and the receiving device that are communication devices.

DESCRIPTION OF EMBODIMENTS

Figure 1:
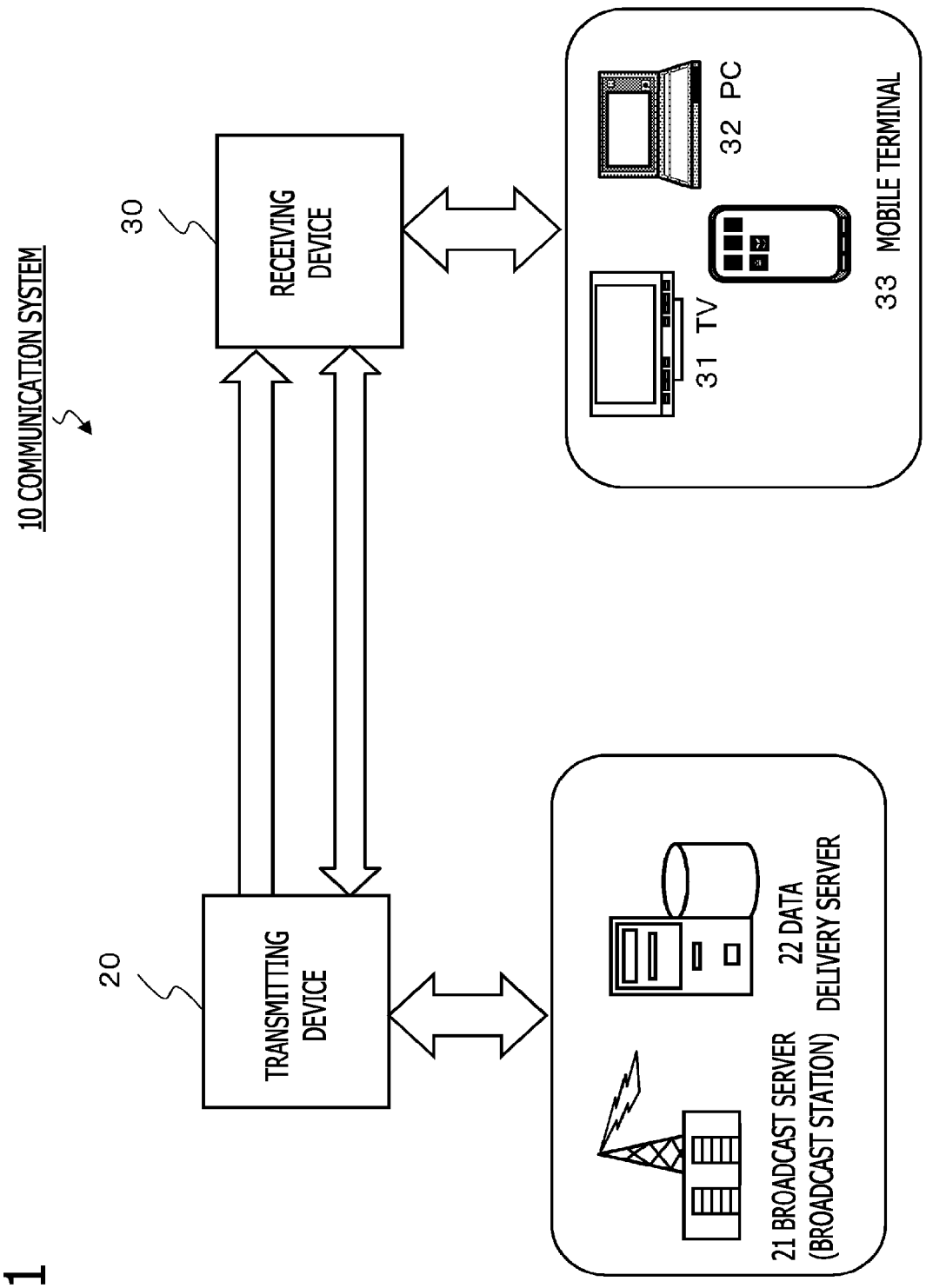
FIG. 1 is an explanatory diagram of an example of a configuration of a communication system that executes processes according to the present disclosure.

A receiving device, a transmitting device, and a data processing method according to the present disclosure will be described hereinafter in detail with reference to the drawings. It is noted that description will be given in accordance with the following items.

1. Example of configuration of communication system
2. Data communication protocols FLUTE and ROUTE
3. Example of communication processes executed by transmitting device and receiving device
4. Process examples of application selection process and application adaptation process in receiving device
5. Configuration example and process example of receiving device
6. SLT (Service List Table) that is signaling data for notification of control information and attribute information per service such as broadcast station or program
7. Service category setting configuration for services provided by transmitting device
8. Configuration in which information on application of broadcast playback application is recorded in AIT (Application Information Table)
9. Process sequences of processes executed by transmitting device and receiving device
9-1. (Process example 1) Process example of executing residential playback application and then also executing broadcast application in receiving device
9-2. (Process example 2) Process example of executing residential playback application, then executing broadcast playback application based on AIT description, and further executing residential playback application based on next AIT description in receiving device
9-3. (Process example 3) Process example of executing broadcast playback application based on AIT description in receiving device
9-4. (Process example 4) Process example of executing broadcast application based on AIT description in receiving device
10. Configuration example of transmitting device and receiving device
11. General overview of configuration of present disclosure 1. Example of Configuration of Communication System An example of a configuration of a communication system that executes processes according to the present disclosure will first be described with reference to FIG. 1.

As depicted in FIG. 1, a communication system 10 includes a transmitting device 20 that is a communication device transmitting a content such as image data and audio data, and a receiving device 30 that is a communication device receiving the content transmitted by the transmitting device 20.

Specifically, the transmitting device 20 is a device providing various pieces of data (broadcast programs, advertisements, and other data), for example, a broadcast server (broadcast station) 21 mainly transmitting data (content) of TV programs and the like or a data delivery server 22 transmitting various pieces of data.

On the other hand, the receiving device 30 is, for example, a client device of an ordinary user, and is specifically configured with a television 31, a PC 32, a mobile terminal 33, and the like.

While FIG. 1 illustrates that the broadcast server (broadcast station) 21 and the data delivery server 22 are distinguished as an example of the transmitting device 20, the transmitting device 20 may be configured such that one server transmits all of the broadcast programs, the advertisements, and the other data.

Data communication between the transmitting device 20 and the receiving device 30 is held as at least one of bi-directional communication and uni-directional communication via a network such as the Internet, and uni-directional communication via a broadcast wave or the like, or as communication using both the network and the broadcast wave.

Data transmission from the transmitting device 20 to the receiving device 30 is executed in accordance with, for example, an MPEG (Moving Picture Experts Group)-DASH standard that is a standard for adaptive streaming technology.

The MPEG-DASH standard includes the following two standards.
(a) A standard related to a manifest file for describing metadata that is management information on video and audio files (MPD: Media Presentation Description).
(b) A standard related to file formats (segment formats) for video content transmission.

Content delivery from the transmitting device 20 to the receiving device 30 is executed in accordance with the MPEG-DASH standard described above.

The transmitting device 20 encodes content data and generates a data file that includes encoded data and metadata on the encoded data. An encoding process is performed, for example, in accordance with an MP4 (MPEG-4) file format specified in MPEG. It is noted that the file of the encoded data in a case in which the transmitting device 20 generates a data file in an MP4 form is referred to as "mdat" and the metadata thereon is referred to as "moov," "moof," or the like.

A content provided by the transmitting device 20 to the receiving device 30 is various pieces of data, for example, music data, visual data such as movies, television programs, videos, photographs, documents, pictures, and diagrams, and games and software.

Data transmitted by the transmitting device 20 will be described with reference to FIG. 2.

Figure 2:
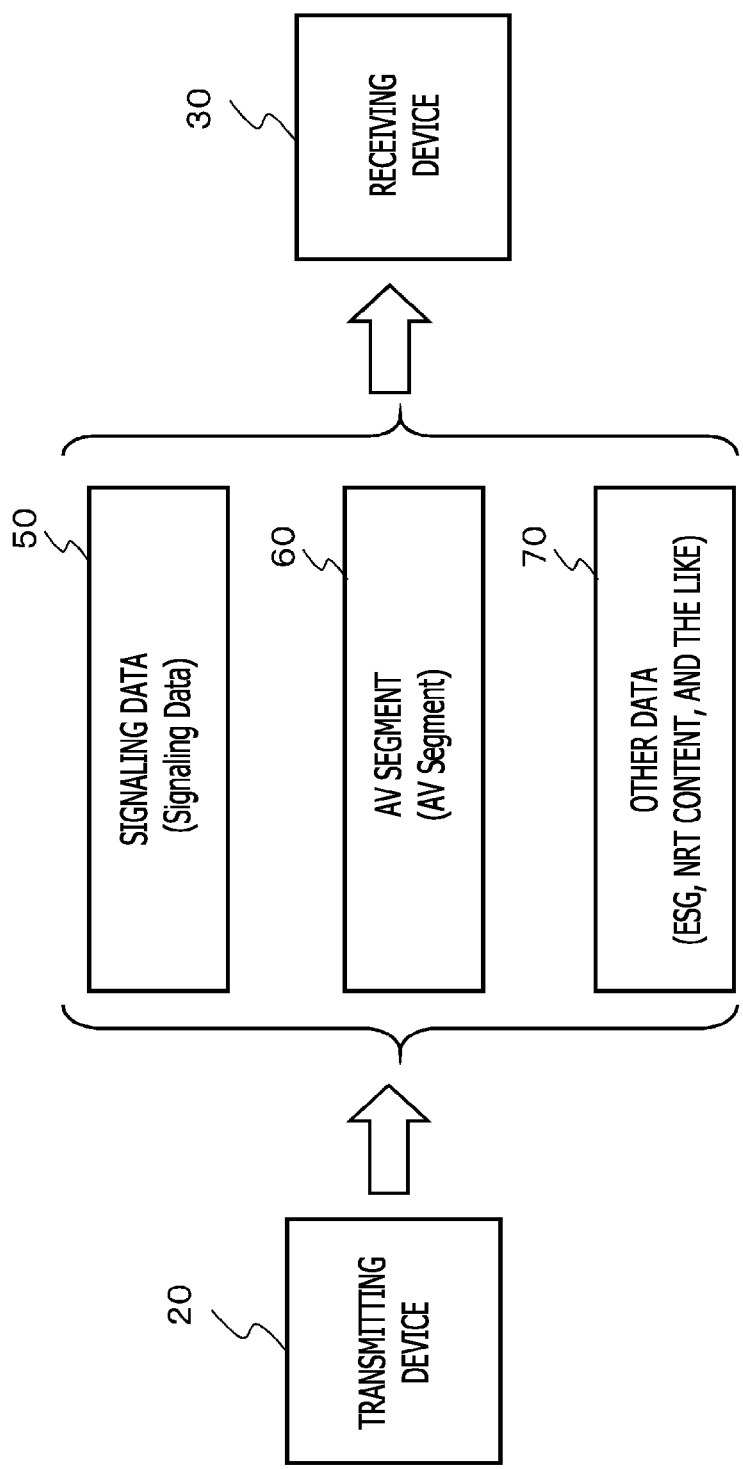
FIG. 2 is an explanatory diagram of data transmitted by a transmitting device.

As depicted in FIG. 2, the transmitting device 20 that executes data transmission in accordance with the MPEG-DASH standard generally transmits roughly a plurality of types of data as follows.
(a) Signaling data 50
(b) AV (Audio/Video) segments 60
(c) Other data (ESG (Electronic Service Guide), NRT (Non Real Time) content, and the like) 70, The AV segments 60 are each configured with image (Video) and audio (Audio) data played back by the receiving device, that is, a program content or the like provided by, for example, a broadcast station. For example, each AV segment 60 is configured with the MP4 encoded data (mdat) and the metadata (moov or moof) described above. The AV segments are also referred to as "DASH segments."

Meanwhile, the signaling data 50 is configured with program schedule information such as a program table, address information (a URL (Uniform Resource Locator) or the like) necessary to acquire a program, guidance information composed of information necessary for a content playback process, for example, codec information (encoding scheme or the like), and various pieces of control information such as application control information.

The receiving device 30 needs to receive this signaling data 50 before receiving the AV segments 60 that store a program content to be played back.

This signaling data 50 is transmitted from the transmitting device 20 as data in, for example, an XML (Extensible Markup Language) form.

The signaling data is transmitted repeatedly as needed. For example, the signaling data is transmitted repeatedly and frequently, for example, at intervals of 100 milliseconds.

This is intended to enable the receiving device (client) to quickly acquire the signaling data.

The client (receiving device) can execute processes necessary to receive and play back a necessary program content such as a process for acquiring an address for accessing the program content and a codec setting process on the basis of the signaling data that can be received as needed without delay.

The other data 70 includes, for example, ESG (Electronic Service Guide) and an NRT content.

The ESG is the electronic service guide, which is, for example, the guidance information such as the program table.

The NRT content is a non-realtime content.

The NRT content includes, for example, various application files executed on a browser of the receiving device 30 that is the client, and data files of moving images, still images, and the like.

As regards the data depicted in FIG. 2, that is,
(a) Signaling data 50
(b) AV segments 60
(c) Other data (ESG, NRT content, and the like) 70, these pieces of data are transmitted in accordance with, for example, a data communication protocol: FLUTE (File Delivery over Uni-directional Transport).

2. Data Communication Protocols FLUTE and ROUTE

The data communication protocol: FLUTE (File Delivery over Uni-directional Transport) is a protocol for managing sessions of a content transmitted by multicast. For example, a file (identified by a URL and a version) generated by the server that is the transmitting device is transmitted to the client that is the receiving device in accordance with the FLUTE protocol.

The receiving device (client) 30 stores the received file in, for example, a storage unit (client cache) to be associated with the URL and the version of the file.

It is assumed that the file having the same URL and a different version is a file having an updated content. The FLUTE protocol is intended only to exercise a uni-directional file transfer control and does not include a file selective filtering function on the part of the client. However, by causing the client to choose or reject a file transfer-controlled by the FLUTE using metadata linked to the file, it is possible to realize selective filtering and manage a configuration and an update of a local cache to reflect a user's preference. It is noted that the metadata can be incorporated in the FLUTE protocol as an extension or can be separately described in accordance with a protocol for the ESG (Electronic Service Guide) or the like.

It is noted that the FLUTE was initially specified as a file transfer protocol for multicast. The FLUTE is configured with a combination of an FDT (File Delivery Table) and a multicast protocol referred to as "ALC (Asynchronous Layered Coding)" for scalable file objects which is specifically LCT (Layered Coding Transport) and FEC (Forward Error Correction) components that are building blocks of the ALC.

While the conventional FLUTE was developed to be mainly used for asynchronous file transfer, extension of the FLUTE is underway by an ATSC (Advanced Television System Committee) that is a standardization group related to data delivery systems via the broadcast wave and the network in such a way as to facilitate applying the FLUTE to broadcast live streaming. An extension specification of this FLUTE is referred to as "ROUTE (Real-time Object Delivery over Uni-directional Transport).

There is an ATSC (Advanced Television System Committee) 3.0 the standardization of which is currently underway as one of the standards related to the data delivery systems via the broadcast wave and the network. This ATSC 3.0 specifies a stack configuration adopted to transmit the signaling data, the ESG, asynchronous files, synchronous streams, and the like with the conventional FLUTE protocol replaced by the ROUTE.

3. Example of Communication Processes Executed by Transmitting Device and Receiving Device Next, an example of communication processes executed by the transmitting device and the receiving device will be described.

Figure 3:
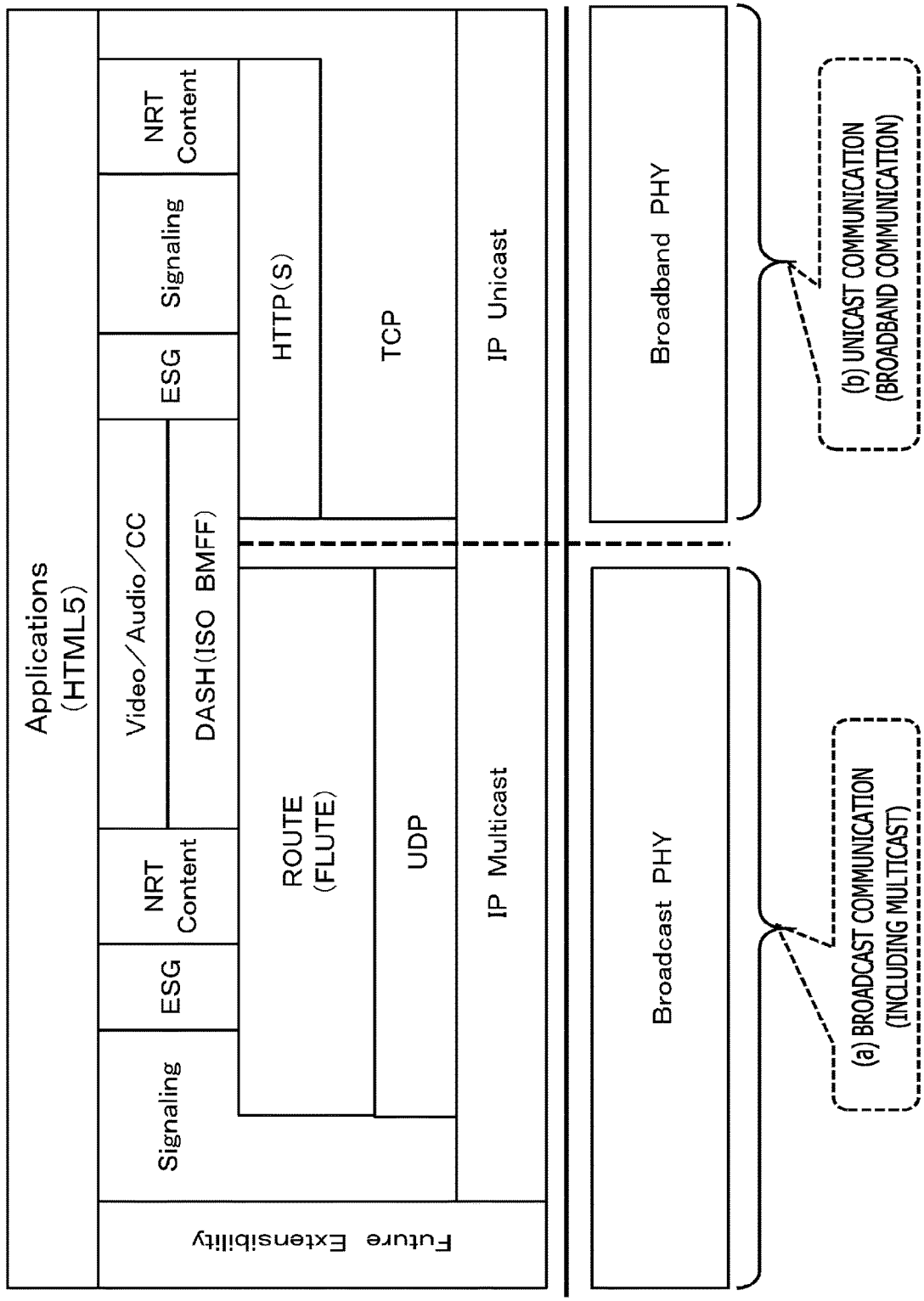
FIG. 3 is a diagram depicting an example of protocol stacks for the transmitting device and a receiving device.

FIG. 3 is a diagram depicting an example of protocol stacks for the transmitting device and the receiving device.

The example depicted in FIG. 3 has two protocol stacks for two communication data processes as follows.
(a) Broadcast (including multicast) communication (for example, broadcasting type data delivery); and
(b) unicast (broadband) communication (for example, HTTP type P2P (Peer to Peer) communication).

On a left-hand side of FIG. 3, a protocol stack corresponding to (a) broadcast communication (for example, broadcasting type data delivery) is depicted.

On a right-hand side of FIG. 3, a protocol stack corresponding to (b) unicast (broadband) communication (for example, HTTP type P2P (Peer to Peer) communication) is depicted.

The protocol stack corresponding to (a) broadcast communication (for example, broadcasting type data delivery) depicted on the left-hand side of FIG. 3 has the following layers in an ascending order.
(1) Broadcast physical layer (Broadcast PHY)
(2) IP (Internet Protocol) multicast layer (IP Multicast)
(3) UDP (User Datagram Protocol) layer
(4) ROUTE (=extension FLUTE) layer
(5) ESG, NRT content, DASH (ISO (International Organization for Standardization) BMFF (Base Media File Format)), and Video/Audio/CC (Closed Caption)
(6) Application layer (Applications (HTML5)).

It is noted that a signaling layer is set as a higher layer than the IP multicast layer (IP Multicast).

The signaling layer is a layer applied to transmission and reception of the signaling data 50 described previously with reference to FIG. 2. The signaling data includes the program schedule information such as the program table, the address information (URL or the like) necessary to acquire a program, the guidance information composed of the information necessary for the content playback process, for example, the codec information (such as the encoding scheme), the control information, and the like.

The signaling data is data that includes the access information on the AV segments received and played back by the receiving device (client), and the guidance information and the control information necessary for processes after reception such as a decoding process, and the data is transmitted repeatedly from the transmitting device as needed.

The signaling data has a variety of types depending on information. Specifically, examples of the types include USD (User Service Description) that is the signaling data per service.

The USD includes various types of control information. Typical control information is the MPD (Media Presentation Description) that is the signaling data having the manifest file storing the various pieces of guidance information and the control information corresponding to the content (AV segments).

Each of the various pieces of signaling data is data necessary for the receiving device (client) to perform reception, playback, and control processes on AV segments or an application (application program) transmitted from the transmitting device, and is set as an individual file (meta file), for example, by category and transmitted from the transmitting device.

As a higher layer than the (1) broadcast physical layer (Broadcast PHY), a layer permitted to use for a future new protocol (Future Extensibility) is set.

The (1) broadcast physical layer (Broadcast PHY) is a physical layer configured with a communication control unit that controls, for example, a broadcasting-related communication unit for executing broadcast communication.

The (2) IP multicast layer (IP Multicast) is a layer that executes a data transmission or reception process according to IP multicast.

The (3) UDP layer is a layer that executes generation and analysis processes on a UDP packet.

The (4) ROUTE layer is a layer that stores and fetches transfer data in accordance with the ROUTE protocol that is the extension FLUTE protocol.

Similarly to the FLUTE, the ROUTE is a multicast protocol referred to as "ALC" for scalable file objects, and is specifically configured with a combination of the LCT and the FEC components that are building blocks of the ALC.

Figure 4:
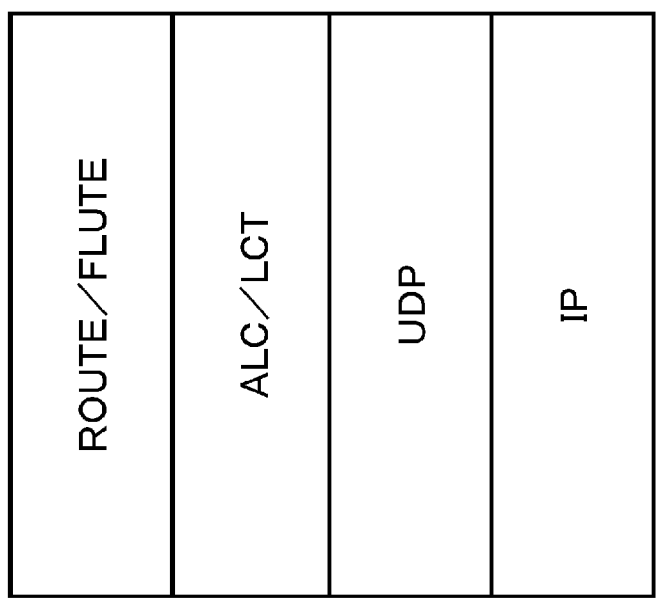
FIG. 4 is a diagram depicting a protocol stack related to ROUTE (Real-time Object Delivery over Uni-directional Transport) and FLUTE (File Delivery over Uni-directional Transport).

FIG. 4 depicts a protocol stack related to the ROUTE and the FLUTE.

The (5) ESG, NRT content, DASH (ISO BMFF), and Video/Audio/CC are data transferred in accordance with the ROUTE protocol.

A broadcast type delivery service according to the DASH standard is referred to as "MBMS (Multimedia Broadcast Multicast Service)." As a scheme for efficiently realizing this MBMS under LTE (Long Term Evolution), there is an eMBMS (evolved Multimedia Broadcast Multicast Service).

The MBMS and the eMBMS are each a broadcast type delivery service, which is a service for delivering identical data, for example, a video content by broadcast to a plurality of user terminals (UEs) that are receiving devices located in a specific area by means of a common bearer. Broadcast delivery according to the MBMS or the eMBMS can simultaneously provide the same content to the receiving devices such as many smartphones, PCs or televisions located in a delivery service providing area.

The MBMS and the eMBMS each specify a process for downloading a file according to a 3GPP (Third Generation Partnership Project) file format (ISO-BMFF file or MP4 file) in accordance with the transfer protocol ROUTE or FLUTE.

As regards the following data already described with reference to FIG. 2, that is,
(a) Signaling data 50
(b) AV segments 60
(c) Other data (ESG, NRT content, and the like) 70, most of these data is transmitted in accordance with the ROUTE protocol or the FLUTE protocol.

The (5) ESG, NRT content, DASH (ISO BMFF), and Video/Audio/CC are data transferred in accordance with the ROUTE protocol.

The ESG is the electronic service guide, which is, for example, the guidance information such as the program table.

The NRT content is the non-realtime content.

As described above, the NRT content includes, for example, the various application files executed on the browser of the receiving device that is the client, and the data files of moving images, still images, and the like.

The Video/Audio/CC is actual data to be played back such as video and audio data delivered in accordance with the DASH standard.

The (6) application layer (Application (HTML5)) is an application layer that executes generation or analysis of data transferred in accordance with the ROUTE protocol and various other data output controls and the like, and performs, for example, processes for generating, analyzing and outputting data while applying HTML5 to the processes.

Meanwhile, the protocol stack corresponding to the (b) unicast (broadband) communication (for example, HTTP type P2P communication) depicted on the right-hand side of FIG. 3 has the following layers in an ascending order.
(1) Broadband physical layer (Broadband PHY)
(2) IP unicast layer (IP Unicast)
(3) TCP (Transmission Control Protocol) layer
(4) HTTP layer
(5) ESG, Signaling, NRT content, DASH (ISO BMFF), and Video/Audio/CC
(6) Application layer (Applications (HTML5)).

The (1) broadband physical layer (Broadband PHY) is a physical layer configured with a communication control unit such as a device driver that controls, for example, a communication unit such as a network card for executing broadband communication.

The (2) IP unicast layer (IP Unicast) is a layer that executes an IP unicast transmission or reception process.

The (3) HTTP layer is a layer that executes generation and analysis processes on an HTTP packet.

Higher layers than this (3) HTTP layer are similar to those in a stack configuration of the (a) broadcast communication (for example, broadcasting type data delivery) on the left-hand side of FIG. 3.

It is noted that the transmitting device (server) 20 and the receiving device (client) 30 perform processes according to at least any one of the two processing systems depicted in FIG. 3, that is, two communication protocol stacks:
(a) broadcast communication (for example, broadcasting type data delivery); and
(b) unicast (broadband) communication (for example, HTTP type P2P communication).

In the protocol stacks depicted in FIG. 3, attributes (including URLs that are the file identifiers) of a file group transferred by multicast in accordance with the ROUTE (FLUTE) can be either described in a control file of the ROUTE (FLUTE) or can be described in the signaling data that describes file transfer sessions. Furthermore, more detailed attributes of the file transfer sessions can be described by the ESG (applicable to uses for presenting end users).

As described above, as one of the standards related to data delivery systems via the broadcast wave and the network, the standardization of the ATSC (Advanced Television System Committee) 3.0 is underway.

In a process of the standardization of IP-based transport stacks according to the ATSC 3.0, a method is proposed for transferring a file based on an MPEG-DASH file format (ISO-BMFF file or MP4 file) by the ROUTE (Real-time Object Delivery over Uni-directional Transport) protocol that is the extension of the FLUTE (File Delivery over Uni-directional Transport), and the method has been set as a standard candidate scheme.

By applying the ROUTE protocol, it is possible to transfer a fragmented MP4 file sequence according to the DASH standard, the MPD (Media Presentation Description) that is the metafile storing the control information (signaling data) according to the DASH standard, USBD (User Service Bundle Description)/USD (User Service Description), S-TSID (Service based Transport Session Description) that is the signaling data for broadcasting delivery, and the like.

As described above, the ROUTE protocol is the FLUTE-based protocol. A metadata file that describes transfer control parameters according to the FLUTE is referred to as "FDT (File Delivery Table)," and a metadata file that describes transfer control parameters according to the ROUTE is referred to as "S-TSID (Service based Transport Session Description)." The S-TSID is a super set of the FDT and includes the FDT.

All the USBD/USD, the S-TSID, the MPD, and the like proposed as the signaling data on service layers according to the ATSC 3.0 (SLS: Service Layer Signaling) are transferred by ROUTE sessions.

4. Process Examples of Application Selection Process and Application Adaptation Process in Receiving Device Process examples of an application selection process and an application adaptation process on a playback application and the like in the receiving device (client) 30 for receiving and outputting data from the transmitting device 20 such as the broadcast server 21 will next be described.

The receiving device 30 stores a playback application program (residential (resident type) playback application) for executing playback of the content of a broadcast program and the like in a storage unit of the receiving device.

This playback application is a conventional playback application that is not a playback application dedicated to a specific broadcast station and applicable to playback of programs (contents) provided by various broadcast stations.

If it is not requested to use the broadcast station-enabled playback application or program-enabled playback application provided from the transmitting device such as the broadcast server (broadcast station), the receiving device can play back a content (program) by applying this residential playback application.

This playback application is the playback application that is used when a broadcast-enabled or program-enabled playback application [broadcast (broadcasting delivery type) playback application] and that is held by the receiving device in advance, and the playback application that is not dedicated to a specific broadcast station or program is referred to as "residential (resident type) playback application."

It is noted that examples of the residential playback application include various types of applications such as a website application that can be executed on a browser and an application that can be executed without activating a browser.

As depicted in FIG. 5, the transmitting device 20 includes, for example, a plurality of broadcast stations 20A, 20B, and the like each corresponding to an individual broadcast station.

Each of these broadcast stations 20A, 20B, and the like provides broadcast program data to the receiving device 30 via the broadcast wave or the network.

Furthermore, each of the broadcast stations 20A, 20B, and the like can provide the playback application applied to playback of the broadcast program provided by each broadcast station and the control information such as the signaling data to the receiving device 30 via the broadcast wave or the network.

The playback application [broadcast (broadcasting delivery type) playback application] provided by each of the broadcast stations 20A and 20B is a playback application for playback of a broadcast program content provided by each broadcast station. In other words, this playback application is dedicated to a specific broadcast station or playback of a specific program.

As for a program a1 provided by a broadcast station A, for example, it is necessary to use a playback application (Aapl) dedicated to the broadcast station A. Furthermore, as for a program a2 provided by the broadcast station A, it is necessary to use a playback application (A-a2-enabled playback application) dedicated to the program a2 provided by the broadcast station A.

In this way, the playback application provided by each of the broadcast stations 20A, 20B, and the like to the receiving device 30 via the broadcast wave or the network is referred to as "broadcast (broadcasting delivery type) playback application (broadcast playback application)."

FIG. 6 is a diagram depicting an example of a correspondence relationship between a program provided by each broadcast station and a playback application applied to playback of the program.

The correspondence relationship between programs provided by the broadcast station A and playback applications to be applied is as follows.
Program a1—residential playback application
Program a2—broadcast playback application (=broadcast station A-enabled playback application)
Program a3—broadcast playback application (=program a3-enabled playback application)
Program a4—broadcast playback application (=broadcast station A-enabled playback application)

Moreover, the correspondence relationship between programs provided by a broadcast station B and playback applications to be applied is as follows.
Program b1—broadcast playback application (=broadcast station B-enabled playback application)
Program b2—broadcast playback application (=program b2-enabled playback application)
Program b3—residential playback application The receiving device 20 holds the residential playback application in the storage unit, and executes a playback process to which the residential playback application is applied on the program for which it is not required to apply the broadcast playback application among the programs provided by each broadcast station.

However, as for the program for which it is requested to apply the broadcast playback application among the programs provided by each broadcast station, the receiving device 20 needs to acquire the broadcast playback application provided by the broadcast station and to play back the program by applying the acquired broadcast playback application to the playback process.

If the receiving device 30 does not select a correct program-enabled playback application, the receiving device 30 is unable to play back a correct program, often resulting in occurrence of a playback error.

A configuration of the present disclosure to be described below is intended to realize a configuration such that the occurrence of such a playback error is prevented, the receiving device 30 can perform processes for selecting, acquiring, and applying a correct content (program)-enabled playback application, and such that the receiving device 30 can reliably execute a playback application change process at a time of channel switchover.

5. Configuration Example and Process Example of Receiving Device

A configuration example and a process example of the receiving device 30 will next be described with reference to FIG. 7 and the following.

Figure 7:
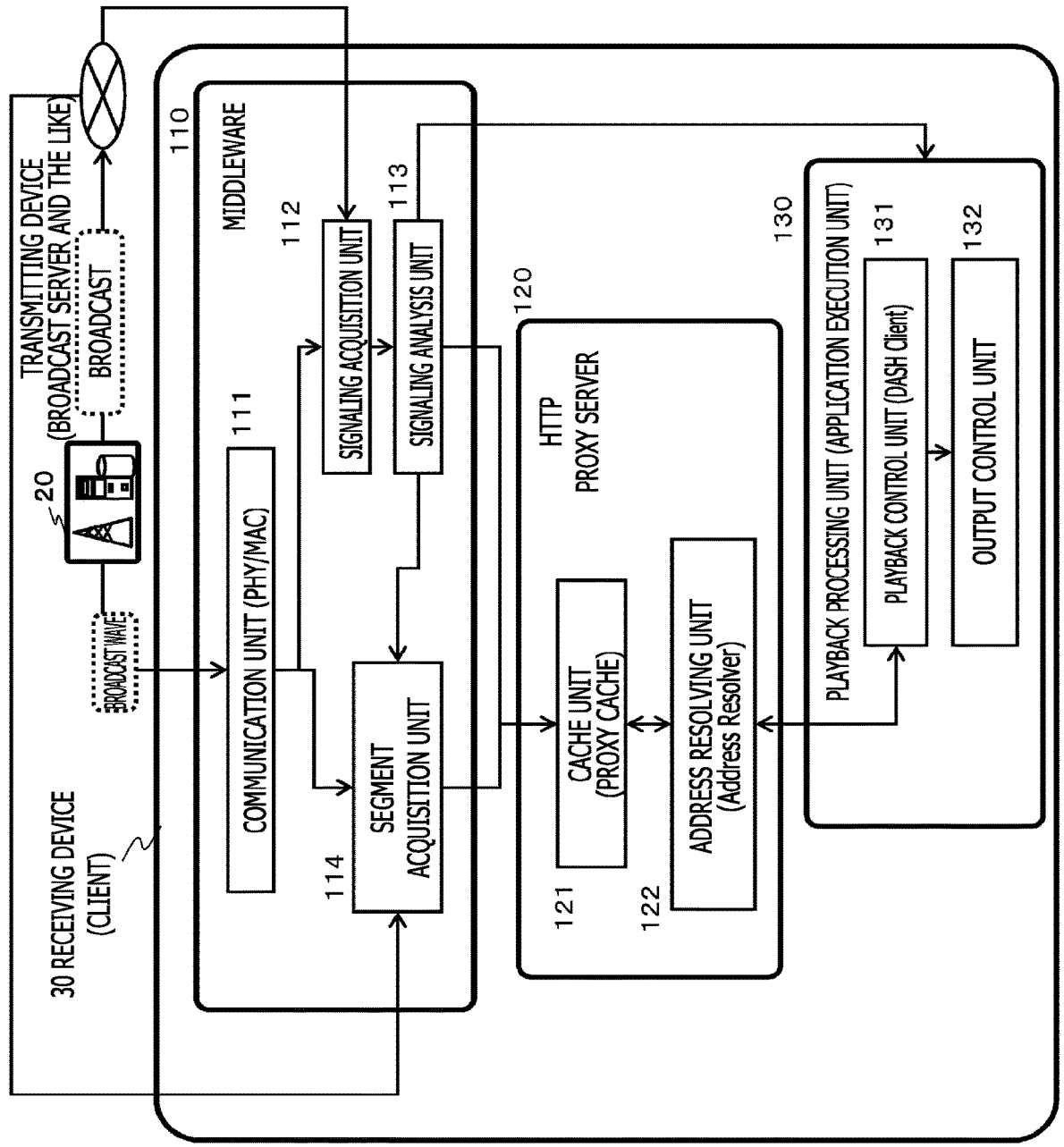
FIG. 7 is an explanatory diagram of an example of a configuration of the receiving device.

It is noted that FIG. 7 depicts one example of a configuration of the receiving device 30.

The receiving device 30 includes middleware 110 that receives data transmitted from the transmitting device 20 such as the broadcast server, a proxy server 120 that executes analysis and accumulation processes on the received data, and a playback processing unit (application execution unit) 130 that executes the playback process on the broadcast content as well as the applications and the like.

The transmitting device 20 such as the broadcast server transmits the AV segments including the broadcast content or the like, the signaling data, and other data by broadcasting transmission via the broadcast wave or the network.

The middleware 110 of the receiving device 30 depicted in FIG. 7 receives and analyzes the data provided by the transmitting device 20.

The middleware 110 includes a communication unit (PHY/MAC) 111, a signaling acquisition unit 112 acquiring the signaling data, a signaling analysis unit 113 analyzing the signaling data, and a segment acquisition unit 114 acquiring the signaling data, program content data such as video and audio data, and data files such as the NRT content including the applications and the like.

The data received by the middleware 110 is stored in a cache (Proxy Cache) unit 121 of the proxy server 120. In the proxy server 120, a data request from a playback control unit 131 is input to an address resolving unit (Address Resolver) 122, and the proxy server 120 acquires requested data from the cache (Proxy Cache) unit 121 or an outside and provides the acquired data.

The playback processing unit (application execution unit) 130 executes the playback application or the other application.

It is noted that examples of the application executed by the playback processing unit (application execution unit) 130 include the following applications.
(a) The residential (resident type) playback application stored in the storage unit of the receiving device in advance,
(b) The broadcast (broadcasting delivery type) playback application received from the transmitting device,
(c) The other application stored in the storage unit of the receiving device in advance, and
(d) The other application received from the transmitting device.

The playback processing unit (application execution unit) 130 executes, for example, these various applications.

The playback control unit (DASH Client) 131 of the playback processing unit (application execution unit) 130 executes a playback control over the content transmitted in accordance with the DASH (MPEG-DASH) standard.

As described above, the MPEG-DASH standard includes the following two standards.
(a) A standard related to a manifest file for describing metadata that is management information on video and audio files (MPD: Media Presentation Description).
(b) A standard related to file formats (segment formats) for video content transmission.

The content delivery from the transmitting device 20 to the receiving device 30 is executed in accordance with the MPEG-DASH standard described above.

The content is transmitted as segments that are data split in predetermined units in accordance with, for example, the MP4 file format specified in the MPEG, and the playback control unit (DASH Client) 131 executes processes such as a process for acquiring segments in which the content to be played back is stored while referring to the manifest file (MPD).

An output control unit 132 extracts an encoded content from the segments acquired by the playback control unit (DASH Client) 131, decodes the encoded content, and outputs the decoded content to the output unit such as the display unit.

It is noted that the playback control unit (DASH Client) 131 also functions as a signaling data processing unit (SLS Signaling Parser & Viewer).

The playback control unit (DASH Client) 131 executes a process based on the signaling data transmitted by the transmitting device 20 (broadcast server 21 or the like). As already described with reference to FIG. 2, the signaling data 50 is configured with the program schedule information such as the program table, the address information (URL (Uniform Resource Locator) or the like) necessary to acquire a program, the guidance information composed of information necessary for the content playback process, for example, the codec information (encoding scheme or the like), and the various pieces of control information such as the application control information.

The playback control unit (DASH Client) 131 acquires the signaling data (SLS: Service Layer Signaling) and executes a process based on the acquired signaling data. For example, the playback control unit (DASH Client) 131 executes processes such as a process for providing the program schedule information such as the program table, the address information (URL) necessary to acquire a program, the codec information (encoding scheme or the like) to the playback control unit 131, and a process for displaying the signaling data, for example, displaying the program table.

It is noted that the signaling data such as a program schedule (program table), the address information, and the codec information is possibly updated as needed, so that the receiving device needs to perform the processes using the latest signaling data.

A version identifier is set to the signaling data transmitted by the transmitting device, so that the receiving device can discriminate, acquire, and use newer signaling data on the basis of the version identifier.

Figure 8:
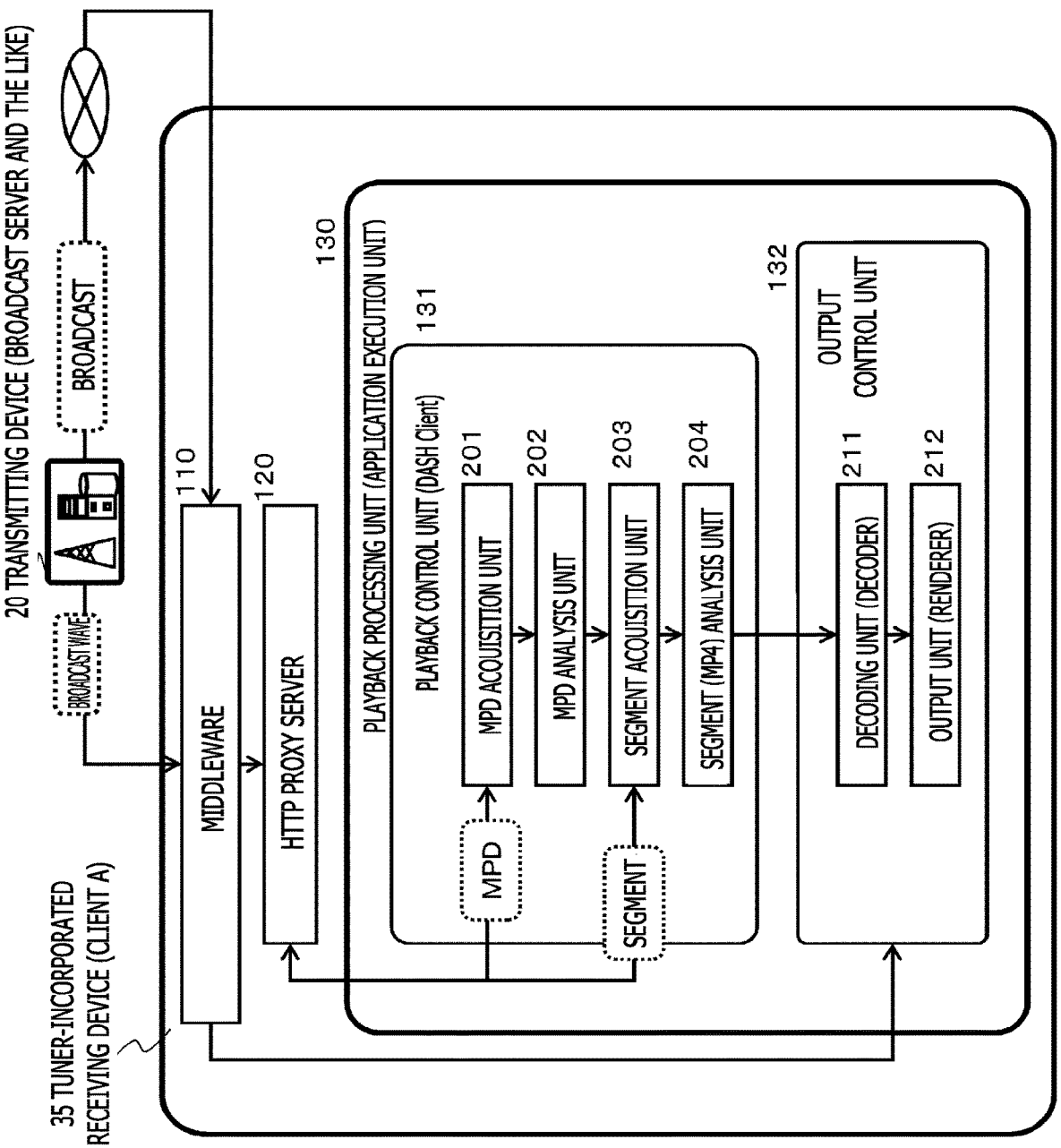
FIG. 8 is an explanatory diagram of an example of the configuration of the receiving device.

FIG. 8 is a view depicting detailed configurations of the playback control unit (DASH Client) 131, and the output control unit 132, which are provided in the playback processing unit (application execution unit) 130 of the receiving device 30.

The playback control unit (DASH Client) 131 of the playback processing unit (application execution unit) 130 includes an MPD acquisition unit 201, an MPD analysis unit 202, a segment acquisition unit 203, and a segment (MP4) analysis unit 204.

As described above, the playback control unit (DASH Client) 131 executes the playback control over the content transmitted in accordance with the DASH (MPEG-DASH) standard.

The MPD acquisition unit 201 acquires the manifest file (MPD: Media Presentation Description) that is a file describing the management information on videos and audio files.

The MPD is provided from the transmitting device 20 such as the broadcast server 21, stored in the proxy server 120, and then acquired by the playback control unit 131.

The MPD is the manifest file for describing the metadata that is the management information on the video and audio files.

The control information necessary for processes for acquiring and playing back the program content such as the access information related to the AV segments that are program configuration data provided by a broadcast station and the playback control information which is specifically the codec information and playback time information is recorded in the MPD.

The MPD analysis unit 202 analyzes a description content of the MPD acquired by the MPD acquisition unit 201, and provides information and the like necessary to acquire segments corresponding to data to be played back to the segment acquisition unit 203.

The segment acquisition unit 203 acquires the segments corresponding to the data to be played back in accordance with an MPD analysis result of the MPD analysis unit 202. Each segment is predetermined unit data set in accordance with a file format (segment format) for transmission of a content configured with AV data.

The segment analysis unit 204 acquires encoded image data, encoded audio data, and the like from the segments acquired by the segment acquisition unit 203, and outputs the acquired data to a decoding unit (decoder) 211 of the output control unit 132.

The output control unit 132 of the playback processing unit (application execution unit) 130 includes the decoding unit (decoder) 211 and an output unit (renderer) 212.

Each of these processing units executes a process according to an application program to be executed.

The decoding unit (decoder) 211 executes a decoding process (decode) on the encoded image data and the encoded audio data provided from the segment analysis unit 204.

The output unit 212 outputs the decoded image data and the decoded audio data to the output unit (a display and a loudspeaker).

As already described with reference to FIGS. 5, 6, and the like, each broadcast station can designate the application applied to the playback process in response to the transmitted content (program).

Specifically, each broadcast station can designate one of:
(a) the residential (resident type) playback application stored in the receiving device in advance, and
(b) the broadcast (broadcasting delivery type) playback application provided by the transmitting device such as the broadcast station via the broadcast wave or the network.

The broadcast station can determine which is to be used as the playback application by making this designation.

The playback processing unit (application execution unit) 130 of the receiving device (client) 30 needs to correctly select the application to be used in response to the content to be played back.

Information necessary for this application selection is transmitted from the transmitting device 20 to the receiving device 30 while applying the signaling data. This signaling data and a process for using the signaling data will be described later in detail.

The playback control unit (DASH Client) 131 of the receiving device (client) 30 also serves as an execution unit of an ATSC 3.0 client application (3.0 DASH Client). The playback control unit (DASH Client) 131 executes a browser application executed on a browser mounted in the ATSC 3.0 broadcasting receiving client device or the other application.

The ATSC 3.0 client application executed by the playback control unit (DASH Client) 131 is configured with an ATSC 3.0 DASH client application (3.0 DASH Client), an ATSC 3.0 stream associated application (3.0 Application), and the like.

The playback control unit (DASH Client) 131 executes a process on the data received by the middleware (Client Local ATSC Middleware) 110 and the data received by the proxy server (Client Local HTTP Proxy Server) 120 via the network.

In other words, the DASH-MPD file and the DASH segment file acquired by the middleware 110 or the proxy server 120, other ordinary application files, and the SLS (Service Level Signaling) file storing the signaling data are input to the playback processing unit (application execution unit) 130 using the playback control unit (DASH Client) 131 and the output control unit 132, and the playback processing unit (application execution unit) 130 performs stream rendering and application control.

A model depicted in FIG. 7 can improve application portability for the following reason. Since the ATSC 3.0 client application or the other application executed by the playback processing unit (application execution unit) 130 always accesses an outside world via the proxy server 120, there is no need of awareness of a distinction as to whether a group of those files is acquired via broadcasting or via the network (network transparency is provided).

Therefore, it is unnecessary to implement the application dedicated only to broadcasting but the application can be implemented irrespectively of use of broadcasting or the Internet.

When the application executed by the playback processing unit (application execution unit) 130 issues a request (HTTP request) to acquire a DASH-MPD file, a DASH segment file, and the other ordinary application file as well as a signaling data file, the proxy server 120 that receives the request determines whether the address resolving unit (Address Resolver) 122 acquires the files via a broadcasting receiving stack or the network.

Information used for determination is provided as a signaling data analysis result. The playback control unit (DASH Client) 131 requests the signaling acquisition unit (SLS Signaling Retriever) 112 to acquire USBD/USD, S-TSID or the like that is ATSC 3.0 signaling metadata.

The signaling acquisition unit (SLS Signaling Retriever) 112 extracts the signaling metadata carried by an SLS LCT packet received by broadcasting via the communication unit (ATSC tuner: ATSC 3.0 PHY/MAC) 111.

Further, the signaling analysis unit (SLS Signaling Parser) 113 extracts signaling metadata from the URL included in the request to acquire segments and application resources, and resolves broadcasting delivery address information for acquiring the file of interest. When recognizing that the file is (has been) broadcast and delivered, the signaling analysis unit (SLS Signaling Parser) 113 acquires an LCT packet storing the desired file on the basis of the broadcasting delivery address information and loads the LCT packet into the cache (Proxy Cache) unit 121. The proxy server 120 returns the file to the playback control unit 131 (as a response to HTTP). When the URL included in the request to acquire the application parts is not present in the signaling metadata, the proxy server 120 acquires the file via the ordinary network stack.

6. SLT (Service List Table) that is Signaling Data for Notification of Control Information and Attribute Information Per Service Such as Broadcast Station or Program Next, the SLT (Service List Table) that is the signaling data for notification of control information and attribute information per service (broadcast station, program, or the like) will be described.

As described above, as the standard related to data delivery systems via the broadcast wave and the network, the standardization of the ATSC (Advanced Television System Committee) 3.0 is currently underway.

As for the ATSC 3.0, standardization of an IP-based transport stack has been worked on, and there is proposed a method of transferring a file based on the file format (ISO-BMFF file, MP4 file) according to the MPEG-DASH standard that is becoming a mainstream in delivery according to the OTT (Over The Top) that is the data delivery scheme capable of delivering a content such as image data and audio data irrespective of the service form of each telecommunications carrier, by the ROUTE (Real-time Object Delivery over Uni-directional Transport protocol previously described with reference to FIGS. 3 and 4.

The transmitting device 20 transmits, for example, the following data in accordance with the ROUTE protocol.
(1) Fragmented MP4 files (fragmented MP4) transferred in accordance with the DASH standard,
(2) MPD that is the control metadata (signaling data) according to the DASH standard, and
(3) S-TSID that is the control metadata (signaling data) on an ATSC-version USD that is an extension of signaling for broadcasting delivery (3GPP-MBMS3-USD (User Service Description) or the ROUTE protocol.

The transmitting device 20 transmits these various pieces of data.

As already described with reference to FIGS. 3, 4, and the like, the ROUTE protocol is the extension FLUTE-based protocol.

While the metadata (signaling data) describing the transfer control parameters according to the FLUTE is referred to as "FDT (File Delivery Table)," the control metadata (signaling data) according to the ROUTE corresponding to the FDT is referred to as "S-TSID (Service based Transport Session Instance Description)."

The S-TSID describes transfer control metadata on all service components (video/audio/data component stream and the like) transferred per service (for example, per broadcast channel or broadcast program).

It is noted that the service components (video/audio/data component stream and the like) are all transferred by a file transfer session.

The S-TSID itself that is the signaling data per service is also transferred using a service signaling data transfer session among ROUTE sessions. The S-TSID is the signaling data on the transfer session of component files transferred within one service.

Furthermore, as the metadata (signaling data) for acquiring an address (service boot strap address) of a service level signaling data transfer session per service in which the S-TSID itself is transferred (address resolution), the SLT (Service List Table) is used.

The SLT (Service List Table) is transferred using a special address and a special port (Destination IP Address/Destination Port) different from those for each service on the UDP/IP.

The SLT (Service List Table) will be described with reference to FIG. 9 and the following.

Figure 9:
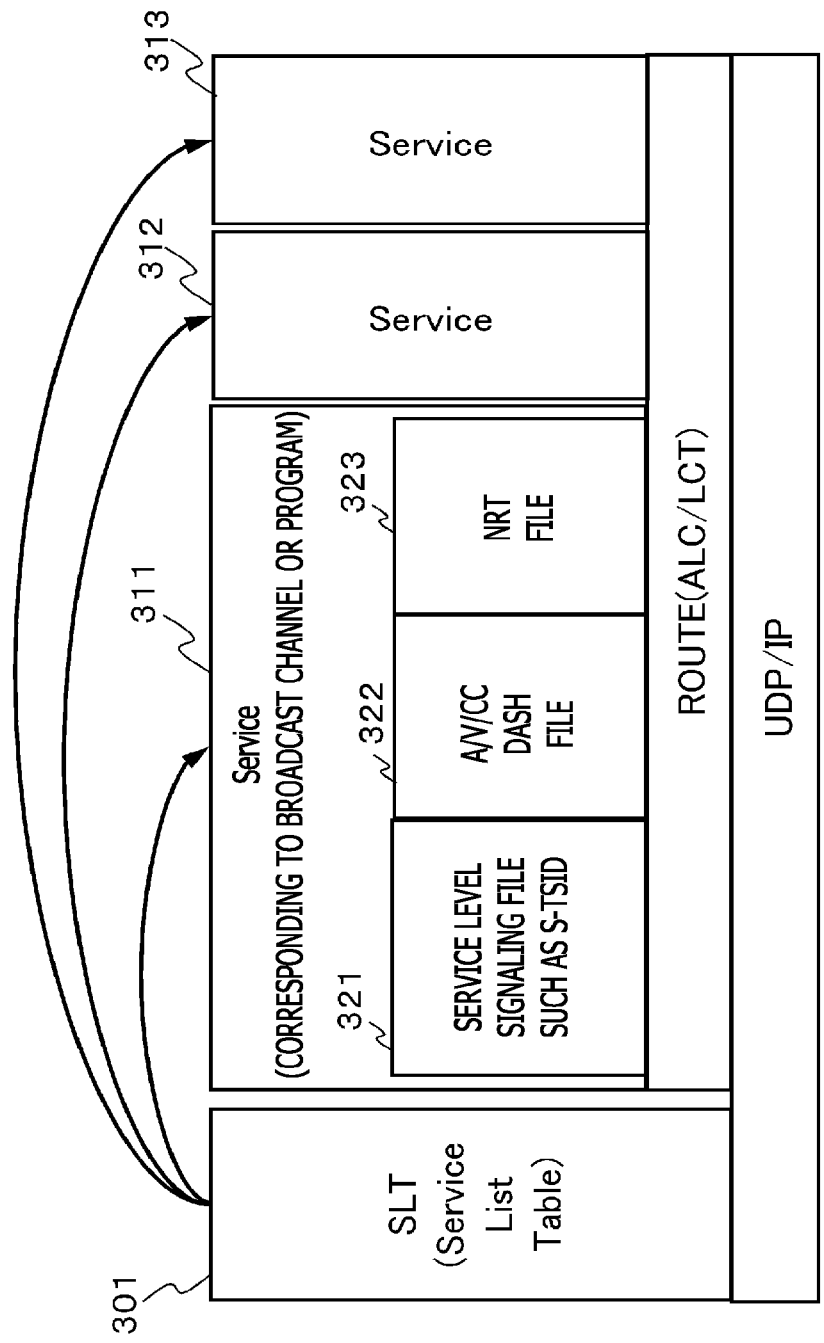
FIG. 9 is an explanatory diagram of data transmitted from the transmitting device to the receiving device and an SLT (Service List Table).

FIG. 9 is a diagram depicting a protocol stack for describing a correspondence relationship between an SLT (Service List Table) 301 and services 311 to 313.

The protocol stack depicted in FIG. 9 corresponds to a part of the protocol stack described previously with reference to FIG. 3.

The SLT (Service List Table) 301 depicted in FIG. 9 is one constituent element of the signaling data (Signaling) in the protocol stack depicted in FIG. 3.

Each of layers of a plurality of services (Service) 311 to 313 depicted in FIG. 9 is a transfer data layer per service per broadcast station or program. Each of the services 311 to 313 transfers the following data.

(a) A service level signaling data file 321 such as the S-TSID that is the signaling data including control data and attribute data per service,
(b) A/V/CC-DASH file 322 that serves as configuration data on a program content or the like, and
(c) an NRT file 323 configured with the non-realtime data such as a playback application, an index file, and other applications.

The SLT (Service List Table) 301 is a table listing information for acquiring the abovementioned data transferred for each of the services 311 to 313.

Figure 10:
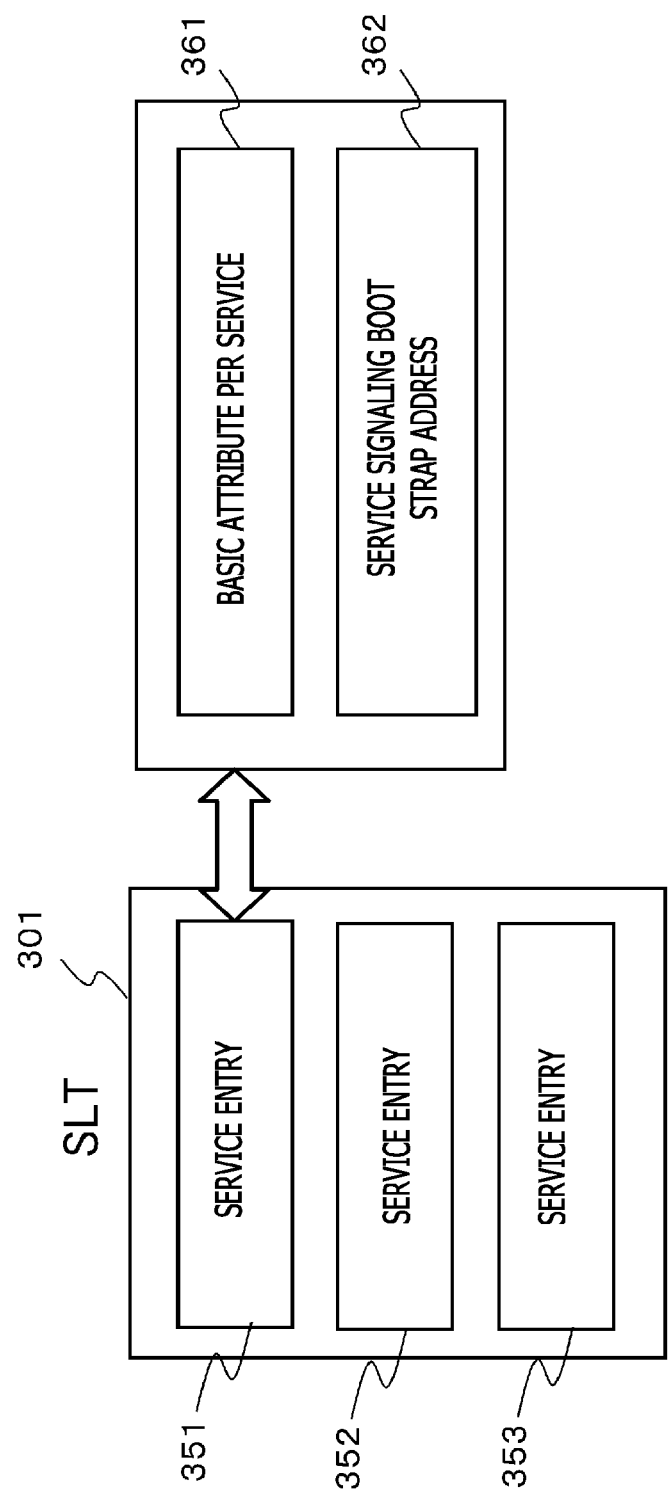
FIG. 10 is an explanatory diagram of the SLT (Service List Table).

An example of a specific configuration of the SLT (Service List Table) 301 is depicted in FIG. 10.

As depicted in FIG. 10, the SLT (Service List Table) 301 includes service entries 351 to 353 corresponding to the respective services.

Each of the service entries 351 to 353 records the following data:
(p) basic attribute information 361 per service, and
(q) service signaling boot strap address 362.

The service signaling boot strap address 362 corresponds to an address for acquiring the service level signaling such as the S-TSID that is the metadata (signaling data) per service.

When setting a channel to a certain channel and determining a service to be received (broadcast station, program or the like), the receiving device (client) 30 first acquires necessary information from the SLT (Service List Table) that is the signaling data.

It is noted that the signaling data such as the SLT (Service List Table) is repeatedly transmitted from the transmitting device such as the broadcast station as needed, so that the receiving device 30 can receive the SLT (Service List Table) as needed.

It is noted that the SLT (Service List Table) can be updated as needed, so that the receiving device 30 selects and acquires the latest SLT (Service List Table) on the basis of the version identifier set to the SLT (Service List Table), stores the SLT (Service List Table) in the storage unit of the receiving device, and uses the SLT (Service List Table).

The receiving device 30 selects the service entry corresponding to a service (broadcast station or program) planned to be received from the acquired SLT (Service List Table), and acquires the information recorded in the selected service entry. That is, the receiving device 30 acquires the following information:
(p) basic attribute information 361 per service, and
(q) service signaling boot strap address 362.

Address information or the like for acquiring the SLS (Service Level Signaling) that is the metadata (signaling data) describing the attribute information, the control information, and the like corresponding to each service (for example, the service 311 of FIG. 9) is recorded in the (q) service signaling boot strap address 362.

The receiving device (client) acquires the SLS (Service Level Signaling) such as the S-TSID that is the metadata (signaling data) per service using this address.

In the SLS (Service Level Signaling), each data corresponding to a service (for example, the service 311 depicted in FIG. 9), for example, the following data depicted in FIG. 9 are recorded. That is,
(b) A/V/CC-DASH file 322 that serves as configuration data on a program content or the like, and
(c) NRT file 323 configured with the non-realtime data such as a playback application, an index file, and other applications,
information for acquiring these data, service attribute information, control information, and the like such as information necessary for the processes (a playback process, an application execution process, and the like) using these data are recorded.

The receiving device (client) receives data (AV content and/or application) provided per service using the data recorded in the SLS (Service Level Signaling) such as the S-TSID that is the metadata (signaling data) per service, and executes a program playback process and the like.

As for the ATSC 3.0, a discussion has been conducted about whether to record a "service category" that is information for identifying a service type as one of the basic attributes 361 per service recorded per service entry in the SLT 301 depicted in FIG. 10.

For example, specific service category types are proposed as follows.
(1) Service category 1: linear AV=[Linear AV (service that can activate, as appropriate, an ordinary Audio/Video broadcast stream and an application attached to a broadcast channel], and
(2) Service category 2: Linear A=[Linear A (service that can activate, as appropriate, an ordinary Audio broadcast service (equivalent to a radio) and an application attached to a broadcast channel].

It is also proposed that an upper-level service category of Linear Service be defined by integrating the services of the linear AV (Linear AV) and the linear A (Linear A) in the service categories 1 and 2 above.

Yet another service category is proposed as follows.
(3) Service category 3: application-based [App-based (service that activates an application provided by a broadcast channel first, where the application may be arbitrary).

This category is also under discussion.

In a case of the linear services defined as the service category described above, when the receiving device (client) sets (tunes) a channel to a channel provided by one certain service, the receiving device (client) starts a playback process including a rendering process on an audio/video stream included in a broadcast stream corresponding to the service.

This playback process is executed by the playback application embedded in a current TV or the like at the time of manufacturing the TV, that is, the residential playback application.

However, the transmitting device 20 such as each broadcast station is planned to provide the playback application (broadcast playback application) unique to the broadcast station to the receiving device 30 in the future.

The receiving device such as a high performance type television predicted to be widely available in the future, for example, a HbbTV (Hybrid Broadcast Broadband Television) having a function to execute a website application executed on a browser and the like can receive the broadcast playback application provided by the transmitting device such as the broadcast station and perform a program playback process using this application.

It is noted that control over processes such as a process for activating the broadcast playback application provided by the transmitting device 20 is recorded in an AIT (Application Information Table) that is the metadata (signaling data) transmitted from the transmitting device 20 and corresponding to the playback application.

The receiving device (client) 30 acquires both the broadcast playback application and the AIT (Application Information Table) corresponding to the broadcast playback application, and performs playback of a program while applying the broadcast playback application to the process.

The AIT (Application Information Table) is one of the signaling data and the transmitting device continuously and repeatedly transmits the AIT (Application Information Table).

The receiving device (client) can acquire the AIT (Application Information Table) at arbitrary timing, and execute control over the broadcast playback application provided from a specific broadcast station, for example, activation and stop processes thereon in accordance with the AIT.

In many cases, the current receiving device (client) such as the television executes a playback process on a broadcast program using the residential playback application.

It is noted that the residential playback application has the following two types.
(a) Embedded video player embedded in the receiving device such as the television in advance, and
(b) Website application executed on a browser.

The embedded video player is assumed to be provided by a manufacturer of TVs and the like (device vendor). The embedded video player is a playback application program that does not depend on a broadcast station or program and that is used for playback of services (program contents) provided by many different broadcast stations.

The website application serving as the residential playback application is stored in the storage unit in the receiving device (client) such as the television by the manufacturer (device vendor) at a time of, for example, manufacturing the television. As an alternative setting or the like, the website application is transmitted from, for example, a management server of the vendor via the network or the like to the receiving device (client) such as the television and stored in the storage unit.

On the other hand, as described above, the control information such as activation and stop of the broadcast playback application provided by the transmitting device such as the broadcast station as the playback application dedicated to a service (program content) provided by each broadcast station is recorded in the AIT (Application Information Table).

When executing the playback process using the broadcast playback application, the receiving device (client) needs to acquire the following two pieces of data.
(1) Service-enabled broadcast playback application, and
(2) AIT (Application Information Table) recording the control information on the broadcast playback application.

7. Service Category Setting Configuration for Services Provided by Transmitting Device As previously described, as for the ATSC 3.0, a discussion has been conducted about whether to record the "service category" as one of the basic attributes 361 per service recorded per service entry in the SLT 301 depicted in FIG. 10.

In other words, an aim of service category setting is such that the receiving device grasps the type of the service provided by the transmitting device.

As described above, as the service category types according to the ATSC 3.0, the following category setting, for example, is proposed.
(1) Service category 1: linear AV service=[Linear AV (service that can activate, as appropriate, an ordinary Audio/Video broadcast stream and an application attached to a broadcast channel],
(2) Service category 2: Linear A service=[Linear A (service that can activate, as appropriate, an ordinary Audio broadcast service (equivalent to a radio) and an application attached to a broadcast channel], and
(3) Service category 3: application-based service [App-based service (service that activates an application corresponding to a broadcast channel first).

The service category is recorded as one attribute information of the "basic attribute information per service" in each service entry in the SLT (Service List Table), whereby the receiving device (client) can determine whether or not to apply the application attached to the broadcast channel, that is, the broadcast playback application provided by the broadcast station to playback of a service (program content) planned to be received.

However, only categorization as described above causes a problem that the receiving device (client) 30 is unable to reliably select a playback application to be applied to the playback of the service (program content) planned to be received.

For example, there occur problems including a problem that the receiving device (client) is unable to determine whether or not the residential playback application such as the embedded video player or the embedded website application can be used for the playback of the program provided by the broadcast station.

Furthermore, the following problem occurs. When the receiving device (client) 30 transitions services to be received during channel switching, the playback application applied to playback of the program often changes. If the receiving device needs time to execute processes for stopping and activating the playback application during this service transition, a delay occurs in start to play back a program after the channel switching.

A setting example of service categories and a use process example for solving these problems will be described below.

In a configuration described below, service category setting is assumed to make it possible to discriminate at least which of the following playback applications is to be applied to the playback process.
(1) Residential (resident type) playback application, and
(2) Broadcast (broadcasting type) playback application.

For example, categories are set to include the following two service categories.
(1) Service category R: Linear service-residential control mode
(2) Service category B: Linear service-broadcast control mode The service categories will be described in detail.
(1) Service category R: Linear service-residential control mode is a category type that indicates that a playback process (rendering process or the like) on an AV stream provided by a broadcast station can be executed using not a playback application dedicated to a service such as the broadcast station or program but a service independent residential playback application.

It is noted that examples of the residential playback application include the embedded video player and the embedded website application.

In services classified into this service category R, the residential playback application held by the receiving device (client) in advance can be used for the playback process on a program content transmitted from the transmitting device such as the broadcast server.

While the transmitting device does not need to provide the broadcast playback application in a case of providing a service belonging to this service category R, the transmitting device often provides the other application. For example, an application attached to a service such as a display application for data displayed to be overlaid on a program content, a hidden application executed in a program background, or a viewing state monitoring application provided by the broadcast station is often provided from the transmitting device to the receiving device as, for example, the NRT content to be included in the service.

The website application attached to the service is controlled by applying the AIT (Application Information Table) transmitted by the SLS (Service Level Signaling) that is the signaling data corresponding to each service. In other words, the AIT corresponding to the application exercises controls over, for example, activation, stop, and life cycle of the application.

However, this AIT is used only for controlling the website application attached to a specific service and not used for controlling the residential playback application used in the playback process on a program content that is to be a main content of the service.

Another service category "(2) Service category B: Linear service-broadcast control mode" will be described.

(2) Service category B: Linear service-broadcast control mode is a category type that indicates that a playback process (rendering process or the like) on an AV stream provided by a broadcast station can be executed using a playback application dedicated to a service such as the broadcast station or program, that is, the broadcast playback application.

This service category indicates that the service is a service (program content) that can be played back using the broadcast playback application transmitted from the transmitting device such as the broadcast station that provides services as, for example, an NRT (Non Real Time).

The broadcast playback application is, for example, a website application executed on a browser of the receiving device (client).

It is noted that this website application often performs a control process on a plurality of applications attached to programs and executing processes other than the program content playback process.

The application attached to the program is, for example, the display application for data displayed to be overlaid on the program content, the hidden application executed in the program background, or the viewing state monitoring application provided by the broadcast station.

Yet another service category is set as follows.
(3) Service category App is set.

The service category App is application-based=[App-based service (service that activates an application corresponding to a broadcast channel first)].

In a case of using an App-based service, when transitioning a channel to a channel that provides the service, the receiving device (client) activates a website application for the service first.

The AIT (Application Information Table) transferred as the service signaling data also exercises control over this application, for example, control over the life cycle.

It is noted that this App-based service basically does not use a realtime stream that becomes a broadcast program. The App-based service uses only an NRT (Non Real Time file asynchronous delivery) or on-demand streaming.

When the receiving device (client) transitions a service to the App-based service, a transition-destination broadcasting application is responsible for grasping all processes.

In this way, as the service category types, at least three service categories are set as follows.
(1) Service category R: Linear service-residential control mode
(2) Service category B: Linear service-broadcast control mode
(3) Service category App: App-based service.

The service categories as described above are set.

The transmitting device records service category information in a basic attribute recording field per service in the SLT (Service List Table) described with reference to FIGS. 9 and 10, and provides the SLT to the receiving device.

When receiving a specific service that is a program provided by a certain broadcast station, the receiving device refers to the "basic attributes per service" in the "service entry" in the SLT to confirm a service category of the specific service.

The receiving device can appropriately select an application used for playback on the basis of a result of this confirmation.

For example, the receiving device selects the "service entry" corresponding to the service planned to be received from the SLT (Service List Table) and confirms a service category identifier in the "basic attributes per service" recorded in the selected "service entry."

If the service category identifier indicates "Service category R," that is, "Linear service-residential control mode," then the receiving device activates the residential playback application held in the receiving device, and executes the playback process on the received data (AV segments).

Furthermore, if the service category identifier indicates "Service category B," that is, "Linear service-broadcast control mode," then the receiving device acquires the broadcast playback application provided from the transmitting device such as the broadcast station, activates this playback application, and executes the playback process on the received data (AV segments).

In this case, the receiving device also acquires the AIT (Application Information Table) corresponding to the broadcast playback application, and exercises application control according to information recorded in this AIT.

Moreover, if the service category identifier indicates "Service category App," that is, "App-based service," then the receiving device acquires the application provided from the transmitting device such as the broadcast station, activates this application, and executes a process.

In this case, the receiving device also acquires the AIT (Application Information Table) corresponding to this application, and exercises application control according to information recorded in this AIT.

When the receiving device (client) changes channels, that is, executes a service transition process, the receiving device (client) executes the following control.

First, before channel change, it is assumed that the receiving device (client) receives a service (channel) the service category of which is "Service category R," that is, "Linear service-residential control mode" and is executing the playback process on the broadcast stream while applying the residential playback application to the process.

It is assumed that, in this state, channel switching takes place in the receiving device (client) and the service transitions to another service (channel).

It is assumed that the service category of the transition destination service (channel) is:

"Service category B," that is "Linear service-broadcast control mode."

In this case, the receiving device (client) stops the residential playback application that is being executed. To play back the AV stream included in the service in "Service category B," that is, "Linear service-broadcast control mode," it is essential to use a playback application dedicated to the service (channel), that is, broadcast playback application (website application).

To perform the playback process using this broadcast playback application (website application), the following processes are necessary to perform.

(S1) Acquiring a transition-destination service-enabled broadcast playback application (website application).
(S2) Acquiring the AIT (Application Information Table) recording the control information on the acquired broadcast playback application (website application).
(S3) Activating the broadcast playback application (website application) in accordance with the information recorded in the AIT (Application Information Table).

It is noted that the transition-destination service-enabled broadcast playback application (website application) and the AIT (Application Information Table) may be acquired in advance before the channel transition and stored in the storage unit of the receiving device (client).

Moreover, if the service category of the transition-destination service (channel) is "Service category App," that is, "App-based service," the receiving device (client) performs the following processes.

First, the receiving device (client) stops the residential playback application that is being executed. To execute the service in "Service category App," that is, "App-based service," it is essential to use the application (website application) dedicated to the service.

To perform an application process using this application (website application), the following processes are necessary to perform.

(S1) Acquire a transition-destination service-enabled application (website application).
(S2) Acquire the AIT (Application Information Table) recording the control information on the acquired application (website application).
(S3) Activate the application in accordance with the information recorded in the AIT (Application Information Table).

In this way, when the service transition such as channel switching occurs, it is often necessary to perform a process for switching over the application to be executed by the receiving device (client).

During such an application switching process, it is necessary to perform a plurality of processes, for example, an application activation process and a rendering resource (buffer or the like) initialization process. These processes possibly cause occurrence of interruption of video streaming playback (interruption between videos such as a black screen).

As one of methods for minimizing the video interruption (black screen) during channel switching, there is the following method.

For example, when two services before and after the channel transition are services to which the residential playback application is applicable, the residential playback application is continuously executed without performing the process for stopping the residential playback application that is being executed.

Performing such a process makes it possible to continuously execute playback of contents provided by the two different services without the need to perform processes for stopping and activating the playback application.

However, to perform such a process, it is necessary to promptly discriminate the application applied to the processes on the service after the channel switching, that is, the service after a service transition process, either before execution of the service switching or at a time of execution of the switching.

In other words, by grasping more quickly the type of the application applied to the service after the service transition, the receiving device (client) can sometimes dispense with the process for stopping the application that is being executed and that corresponds to the service before the transition and the process for activating the application corresponding to the service after the transition.

To enable confirmation of the application applied to the service after the service transition at earlier timing, the SLT (Service List Table) that is the signaling data described with reference to FIGS. 9 and 10 is used.

In other words, as one of the configuration information on the "basic attributes per service" in the service entry in the SLT (Service List Table), the three types of service category information described above are recorded.

In other words, the service category identifier that enables discrimination as to which of the following three service category types each service belongs is recorded in the "basic attributes per service" in the service entry in the SLT (Service List Table).

(1) Service category R: Linear service-residential control mode
(2) Service category B: Linear service-broadcast control mode
(3) Service category App: App-based service.

The receiving device (client) acquires the SLT (Service List Table) before receiving the signaling data corresponding to the service, that is, the service level signaling such as the S-TSID.

Therefore, the receiving device (client) can confirm the type of the application to be applied to the next transition-destination service at earlier timing.

In other words, the receiving device (client) can confirm which of the following three applications (a) to (c) is to be applied to the transition-destination service at earlier timing.
(a) Residential playback application,
(b) Broadcast playback application, and
(c) Broadcast application other than the broadcast playback application.

FIG. 11 depicts an example of service category types recorded as one attribute of the "basic attributes per service" that is the data recorded in each service entry in the SLT (Service List Table).

The example depicted in FIG. 11 is an example of service category setting in which a correspondence relationship is held between the following service category identifiers (0x00 to 0xFF) and meanings.
(1) 0x00=Not specified [Not specified]
(2) 0x01=Linear service (audio/video or audio only)-residential playback App application control service [Linear service (A/V or Audio only)-Residential Control]
(3) 0x02=Linear service (audio/video or audio only)-broadcast playback App application control service [Linear service (A/V or Audio only)-Broadcaster Control]

(4) 0x03=Application-based service-broadcast App application control service [App-based service]
(5) 0x04 to 0x0F=Reserved area [Reserved for future use]

The transmitting device sets, for example, any of the service category identifies depicted in FIG. 11 to the "basic attributes per service" that is the data recorded in each service entry in the SLT (Service List Table), and transmits the SLT.

The receiving device selects the service entry corresponding to a broadcast station program (service) planned to be received from the SLT (Service List Table), and confirms which of the service category identifiers depicted in FIG. 11 is recorded in the "basic attributes per service" that is the data recorded in the selected service entry.

This confirmation process makes it possible to discriminate the type of the application applied to the service planned to be received.

The receiving device can determine whether or not applications applied before and after the service transition, for example, the broadcast station-enabled application executed before channel switching and the application applied after the channel switching match. If the applications match, the receiving device can continue the playback application without performing the stop process and a re-activation process on the playback application that is being executed.

This application continuation process makes it possible to reduce output interruption time of the receiving device.

In the service category setting example depicted in FIG. 11, two types of services:
audio/video (A/V) and
audio only,
are set into the same category.

Alternatively, these service types may be assumed to belong to different service categories and different service category identifiers may be set to the services.

FIG. 12 depicts an example of service category setting based on this setting.

The example depicted in FIG. 12 is an example of service category setting in which a correspondence relationship is held between the following service category identifiers (0x00 to 0xFF) and meanings.
(1) 0x00=Not specified [Not specified]
(2) 0x01=Linear service (audio/video)-residential playback App application control service [Linear service (A/V)-Residential Control]
(3) 0x02=Linear service (audio/video)-broadcast playback App application control service [Linear service (A/V)-Broadcaster Control]
(4) 0x03=Linear service (audio only)-residential playback App application control service [Linear service (Audio only)-Residential Control]
(5) 0x04=Linear service (audio only)-broadcast playback App application control service [Linear service (Audio only)-Broadcaster Control]
(6) 0x05=Application-based service-broadcast App application control service [App-based service]
(7) 0x06 to 0x0F=Reserved area [Reserved for future use]

In the service category setting example depicted in FIG. 12, there are:
an audio/video providing service to which the residential playback application is applied,
an audio/video providing service to which the broadcast playback application is applied,
an audio only providing service to which the residential playback application is applied, and
an audio only providing service to which the broadcast playback application is applied.

The receiving device can confirm each service while distinguishing these services on the basis of the SLT (Service List Table).

In the examples of service category setting depicted in FIGS. 11 and 12, the following three types of service category:
a service to which the residential playback application is applied,
a service to which the broadcast playback application is applied, and
a service to which the broadcast application is applied can be basically distinguished.

However, it might be assumed, for example, that there are a plurality of different broadcast stations A, B, and C, and that the same broadcast playback application (shared App) is applied to various programs provided by the broadcast stations A, B, and C.

For example, it might be assumed that each of the broadcast stations A, B, and C provides following services (programs) (1) and (2) for or to which any of the different broadcast playback applications is selected and applied per program.
(1) Service (program) to be played back while the broadcast playback application (shared App) is applied.
(2) Service (program) to be played back while the broadcast playback application (native App) dedicated to each broadcast station or each program is applied.

FIGS. 13 and 14 are diagrams depicting examples of setting of service category identifiers in the light of the setting described above.

The example depicted in FIG. 13 is an example of service category setting in which a correspondence relationship is held between the following service category identifiers (0x00 to 0xFF) and meanings.
(1) 0x00=Not specified [Not specified]
(2) 0x01=Linear service (audio/video or audio only)-residential playback App application control service [Linear service (A/V or Audio only)-Residential Control]
(3) 0x02=Linear service (audio/video or audio only)-broadcast playback App application control service (native App) [Linear service (A/V or Audio only)-Broadcaster Control-Native]
(4) 0x03=Linear service (audio/video or audio only)-broadcast playback App application control service (shared App) [Linear service (A/V or Audio only)-Broadcaster Control-Shared]
(5) 0x04=Application-based service-broadcast App application control service [App-based service]
(6) 0x05 to 0x0F=Reserved area [Reserved for future use]

The transmitting device sets, for example, any of the service category identifies depicted in FIG. 13 to the "basic attributes per service" that is the data recorded in each service entry in the SLT (Service List Table), and transmits the SLT.

In the examples of service category setting depicted in FIG. 13, the following category included in the example of service category identifier setting depicted in FIG. 11, that is, (3) 0x02=Linear service (audio/video or audio only)-broadcast playback App application control service [Linear service (A/V or Audio only)-Broadcaster Control] is further segmented into two categories.

In the example depicted in FIG. 13, the category is divided into the two categories depending on whether the broadcast playback application is a native type dedicated to a specific service (specific broadcast station or specific program) or a shared type commonly used among a plurality of services (a plurality of broadcast stations or a plurality of programs).

The case in which the broadcast playback application is the native type dedicated to the specific service (specific broadcast station or specific program) corresponds to the following category depicted in FIG. 13.
(3) 0x02=Linear Service (Audio/Video or Audio Only)-Broadcast Playback App Application Control Service (Native App) [Linear Service (A/V or Audio Only)-Broadcaster Control-Native]

On the other hand, the case in which the broadcast playback application is the type commonly used among a plurality of services (a plurality of broadcast stations or a plurality of programs) corresponds to the following category depicted in FIG. 13.
(4) 0x03=Linear Service (Audio/Video or Audio Only)-Broadcast Playback App Application Control Service (Shared App) [Linear Service (A/V or Audio Only)-Broadcaster Control-Shared]

The receiving device selects the service entry corresponding to a broadcast station program (service) planned to be received from the SLT (Service List Table), and confirms which of the service category identifiers depicted in FIG. 13 is recorded in the "basic attributes per service" that is the data recorded in the selected service entry.

This confirmation process makes it possible to discriminate the type of the application applied to the service planned to be received.

The receiving device can determine whether or not applications applied before and after the service transition, for example, the broadcast station-enabled application executed before channel switching and the application applied after the channel switching match. If the applications match, the receiving device can continue the playback application without performing the stop process and the re-activation process on the playback application that is being executed.

If the category identifier depicted in FIG. 13 is used and even if the services before and after the service switching are both the broadcast playback application (shared), the receiving device can continue the playback application without performing the stop process and the re-activation process on the playback application that is being executed.

This application continuation process makes it possible to reduce output interruption time of the receiving device.

The example of category identifier setting depicted in FIG. 14 is an example of service category setting in which a correspondence relationship is held between the following service category identifiers (0x00 to 0xFF) and meanings.
(1) 0x00=Not specified [Not specified]
(2) 0x01=Linear service (audio/video)-residential playback App application control service [Linear service (A/V)-Residential Control]
(3) 0x02=Linear service (audio/video)-broadcast playback App application control service (native App) [Linear service (A/V)-Broadcaster Control-Native]
(4) 0x03=Linear service (audio/video)-broadcast playback App application control (shared App) [Linear service (A/V)-Broadcaster Control-Shared]
(5) 0x04=Linear service (audio only)-residential playback App application control service [Linear service (Audio only)-Residential Control]
(6) 0x05=Linear service (audio only)-broadcast playback App application control service (native App) [Linear service (Audio only)-Broadcaster Control-Native]
(7) 0x06=Linear service (audio only)-broadcast playback App application control service (shared App) [Linear service (Audio only)-Broadcaster Control-Shared]
(8) 0x07=Application-based service-broadcast App application control service [App-based service]
(9) 0x08 to 0x0F=Reserved area [Reserved for future use]

Also, in the example depicted in FIG. 14, "broadcast playback App application control service" included in the example of category identifier setting depicted in FIG. 12 is segmented into two categories.

In the example depicted in FIG. 14, as for the category identifier of the broadcast playback application depicted in FIG. 12,
the category is divided into the two categories depending on whether the broadcast playback application is a native type dedicated to a specific service (specific broadcast station or specific program), or
a shared type commonly used among a plurality of services (a plurality of broadcast stations or a plurality of programs).

The receiving device selects the service entry corresponding to a broadcast station program (service) planned to be received from the SLT (Service List Table), and confirms which of the service category identifiers depicted in FIG. 14 is recorded in the "basic attributes per service" that is the data recorded in the selected service entry.

This confirmation process makes it possible to discriminate the type of the application applied to the service planned to be received.

The receiving device can determine whether or not applications applied before and after the service transition, for example, the broadcast station-enabled application executed before channel switching and the application applied after the channel switching match. If the applications match, the receiving device can continue the playback application without performing the stop process and the re-activation process on the playback application that is being executed.

If the setting of the category identifier depicted in FIG. 14 is used and even if the services before and after the service switching are both the broadcast playback application (shared), the receiving device can continue the playback application without performing the stop process and the re-activation process on the playback application that is being executed.

This application continuation process makes it possible to reduce output interruption time of the receiving device.

A flowchart depicted in FIG. 15 is one for describing a sequence in which the receiving device 30 receives the SLT (Service List Table) that is the signaling data, acquires a service category identifier from the SLT, and executes application control.

A process according to the flowchart depicted in FIG. 15 is executed in the data processing unit (playback processing unit or the like) of the receiving device. For example, a playback control program recording the process sequence in advance is read from the storage unit and the process is executed as a process according to the program.

The process in each step will be described.
(Step S11)

First, the receiving device receives the SLT (Service List Table) that is the signaling data for notification of the control information and the attribute information per service such as broadcast station or program.

As described with reference to FIGS. 9 and 10, the SLT (Service List Table) records the following data as information per service entry,
(p) basic attribute information per service, and
(q) service signaling boot strap address.

In the (p) basic attribute information per service, category identifier information of any of the types described with reference to FIGS. 11 to 14 is recorded. It is noted that the receiving device acquires the SLT (Service List Table) in advance before executing a service, that is, before starting playback of a program provided by the broadcast station.
(Step S12)

The receiving device determines whether or not service transition occurs in Step S12. Specifically, the receiving device detects whether or not channel change, transition between different programs set to different services or the like occurs.

When the service transition does not occur, the process goes to Step S14.

On the other hand, when the service transition occurs, the process goes to Step S13.
(Step S13)

When detecting that the service transition occurs in Step S12, the data processing unit of the receiving device determines whether or not service category identifiers before and after the service transition match while referring to the SLT in Step S13.

When it is confirmed that the service category identifiers match, the process goes to Step S14.

When it is confirmed that the service category identifiers are not match, the process goes to Step S15.
(Step S14)

(a) When it is confirmed in Step S12 that the service transition does not occur, or (b) when it is confirmed in Step S12 that the service transition occurs and it is confirmed in Step S13 that the service category identifiers before and after the service transition match, that is, when a determination result is either (a) or (b) above, the process goes to Step S14, and the currently-executed application is continued without being stopped in Step S14.

In other words, the receiving device applies the application applied to the service before the service transition to the service after the service transition and executes the process.

This application continuation process makes it possible to prevent, for example, the occurrence of screen interruption due to stop, activation or the like of the application and to smoothly switch services (switch channels) before and after the channel switching.
(Step S15)

On the other hand, when it is confirmed in Step S12 that the service transition occurs and it is confirmed in Step S13 that the service category identifiers before and after the service transition do not match, the process goes to Step S15.

In Step S15, the receiving device stops the currently-executed application, activates a new application in response to the service category identifier of the service after the transition, and execute a process on the service after the transition while applying the newly activated application to the process.

In this way, the receiving device can determine in advance whether or not the applications applied to the services before and after the service switching match on the basis of the SLT that serves as the signaling data, for example, on the basis of the service category identifiers depicted in FIGS. 11 to 14, and can continue to execute the currently-executed application without stopping the application when the applications match. It is thereby possible to minimize screen stop or the like at the time of, for example, the channel switching and achieve smooth service transition.

8. Configuration in which Information on Application of Broadcast Playback Application is Recorded in AIT (Application Information Table)

A configuration in which information on application of the broadcast playback application to the AIT (Application Information Table) will next be described.

The AIT (Application Information Table) serving as the signaling data recording the attribute information and the control information on the application provided from the transmitting device 20 such as the broadcast station to the receiving device 30 and executed by the receiving device 30 is provided to be associated with the application.

The receiving device 30 executes the activation and stop processes on the application received from the transmitting device 20, acquires the control information such as the life cycle from the AIT (Application Information Table) received from the transmitting device 20 as the signaling data, and executes the application in accordance with description of the AIT.

As for the applications provided from the transmitting device 20 to the receiving device 30 such as the broadcast playback application described above and other applications, the AIT corresponding to each of basically all the applications is provided from the transmitting device 20 to the receiving device 30.

The configuration described below is a configuration such that a flag indicating whether or not the application transmitted by the transmitting device 20 such as the broadcast station and to be controlled by the AIT (Application Information Table) that is the signaling data corresponding to the application is applicable to the playback process such as rendering on the provided service such as the program provided by the transmitting device is set to the AIT.

It is noted that this flag is referred to as "delivery application identification flag (Continuous Component Supportable flag)."

An example of specific setting of the delivery application identification flag is as follows.

(a) To the AIT corresponding to the broadcast playback application applicable to the playback process such as rendering on the service (program content) provided by the broadcast station, delivery application identification flag=true is set.

(b) To the AIT corresponding to the application other than the broadcast playback application applicable to the playback process such as rendering on the service (program content) provided by the broadcast station, delivery application identification flag=false is set.

When receiving and executing the application provided from the transmitting device 20 such as the broadcast station, for example, the broadcast playback application applied to the playback process on the broadcast program or the other application, the receiving device receives and refers to the AIT that is the control metadata (signaling data) on the application, whereby the receiving device can promptly discriminate whether or not the application planned to be executed is applicable to playback of the program.

Specifically, before execution of the application to be executed, for example, after the channel switching, it is possible to discriminate whether or not the application is applicable to the playback of the program.

Therefore, it is possible to determine whether the application that is being executed, for example, before the channel switching is to be stopped or does not need to be stopped before timing of the channel switching, dispense with the unnecessary stop process or activation process on the application, and prevent occurrence of screen interruption and the like.

Figure 16:
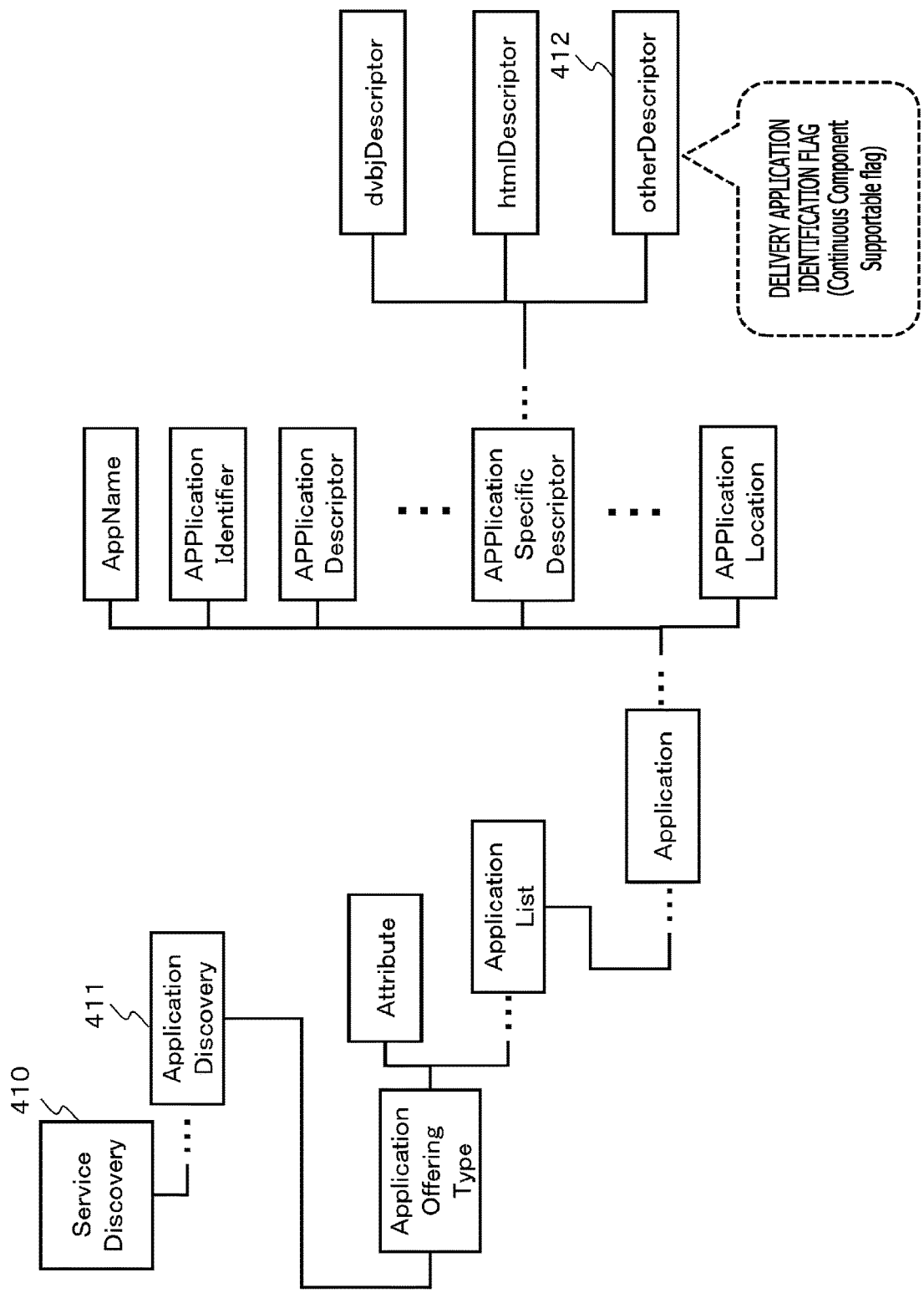
FIG. 16 is an explanatory diagram of a configuration of setting a delivery application identification flags in an AIT (Application Information Table).

FIG. 16 is an explanatory diagram of a set position of the delivery application identification flag within the AIT (Application Information Table).

The AIT (Application Information Table) is one constituent element of the signaling data, and is transmitted from the transmitting device 20 to the receiving device 30 as, for example, an XML document having a service discovery (ServiceDiscovery) element 410 depicted in FIG. 16 as a root element.

The attribute information and the control information on the application are recorded below an application discovery element 411 set as a lower-level element than the service discovery (ServiceDiscovery) element 410.

As depicted in FIG. 16, for example, the delivery application identification flag (Continuous Component Supportable flag) is set below the other identification flag (otherDescriptor) element 412.

In other words, the flag is set to be recorded in the following set position.

A Boolean element of atsc: ContinuousComponentSupportable, that is, an element to which binary of true or false can be set to an element is newly introduced below ServiceDescovery/mhp:ApplicationDescovery/mhp:ApplicationList/mhp:Application/mhp:ApplicationSpecificDescriptor/mhp:otherDescriptor.

In this way, the AIT (Application Information Table) to which the delivery application identification flag (Continuous Component Supportable flag) is set is provided to the receiving device as XML data.

An example of data encoded as the XML data is depicted below as well as in FIG. 17.

This is an example of the data when the delivery application identification flag (Continuous Component Supportable flag)=true.

<ServiceDescovery . . . > . . .
<mhp:ApplicationDescovery . . . > . . .
<mhp:ApplicationList . . . > . . .
<mhp:Application . . . > . . .
<mhp:applicationSpecificDescriptor . . . > . . .
<mhp:otherDescriptor . . . > . . .
<atsc:ContinuousComponentSupportable>true</atsc:ContinuousComponentSupportable> . . .
</mhp:otherDescriptor> . . .
</mhp:applicationSpecificDescriptor> . . .
</mhp:Application> . . .
</mhp:ApplicationList> . . .
</mhp:ApplicationDescovery> . . .
</ServiceDescovery>

When receiving and executing the application provided from the transmitting device 20 such as the broadcast station, for example, the broadcast playback application applied to the playback process on the broadcast program or the other application, the receiving device receives the AIT recording the delivery application identification flag described above as the control metadata (signaling data) on the application.

By referring to the delivery application identification flag in the AIT, the receiving device can promptly discriminate whether or not the application planned to be executed is applicable to the playback of the program.

A flowchart depicted in FIG. 18 is one for describing a sequence in which the receiving device 30 receives delivery application provided from the transmitting device such as the broadcast station and the AIT (Application Information Table) that is the signaling data recording the control information corresponding to the delivery application, acquires the delivery application identification flag from the AIT, and executes application control according to the flag.

A process according to the flowchart depicted in FIG. 18 is executed in the data processing unit (playback processing unit or the like) of the receiving device. For example, a playback control program recording the process sequence in advance is read from the storage unit and the process is executed as a process according to the program. The process in each step will be described.

(Step S21)

First, the receiving device receives the delivery application provided from the transmitting device such as the broadcast station and the AIT (Application Information Table) that is the signaling data recording the control information corresponding to the delivery application.

Types of the delivery application vary widely and include, for example, the broadcast playback application applied to the playback of a main content of a service such as a program provided by the broadcast station and an attached application that is not used for the playback of the program.

The AIT (Application Information Table) is the signaling data (metadata) recording the attribute information and the control information on each delivery application. As described with reference to FIGS. 16 and 17, the delivery application identification flag, that is, the delivery application identification flag indicating whether the application is the broadcast playback application applied to the playback of the main content of the service such as the program provided by the broadcast station (flag=true) or the other application (flag=false) is recorded in the AIT.

(Step S22)

The receiving device refers to the AIT (Application Information Table) corresponding to the delivery application received or planned to be received, and confirms a value of the delivery application identification flag recorded in the AIT (Application Information Table) in Step S22.

When the delivery application identification flag=true, the process goes to Step S23.

On the other hand, when the delivery application identification flag=false, the process goes to Step S24.

(Step S23)

When the delivery application identification flag=true as a result of a confirmation process on the value of the delivery application identification flag recorded in the AIT (Application Information Table) in Step S22, the process goes to step S23.

In this case, the receiving device determines that the delivery application planned to be executed is the broadcast playback application, activates the broadcast playback application that is the delivery application, and executes the playback of the main content (program content) of the service in Step S23.

(Step S24)

On the other hand, when the delivery application identification flag=false as a result of the confirmation process on the value of the delivery application identification flag recorded in the AIT (Application Information Table) in Step S22, the process goes to step S24.

In this case, the receiving device determines that the delivery application planned to be executed as not the broadcast playback application but the other broadcast application, continues the currently-executed playback application (residential playback application or broadcast playback application) as it is, and further executes the delivery application (broadcast application) in Step S24.

In other words, the receiving device performs processes, for example, for continuing the currently-executed playback application (residential playback application or broadcast playback application) as it is to continue to play back the main content (program content) of the service, furthermore executing the broadcast application in parallel, and outputting an execution result of the broadcast application in parallel.

In this way, the receiving device can confirm whether the delivery application provided from the broadcast station is the broadcast playback application (flag=true) applied to the playback of the main content of the service such as the program provided by the broadcast station or the other application (flag=false),
on the basis of the delivery application identification flag recorded in the AIT (Application Information Table) that is the signaling data corresponding to the delivery application.

The receiving device can determine whether to perform processes such as processes for activating, stopping, continuing the application on the basis of this flag confirmation result.

9. Process Sequences of Processes Executed by Transmitting Device and Receiving Device Process sequences of processes executed by the transmitting device and the receiving device will next be described with reference to a sequence diagram depicted in FIG. 19.

A plurality of process examples below will be described in succession.
(Process example 1) Process example of executing residential playback application and then also executing broadcast application in receiving device
(Process example 2) Process example of executing residential playback application, then executing broadcast playback application based on AIT description, and further executing residential playback application on the basis of next AIT description in receiving device
(Process example 3) Process example of executing broadcast playback application based on AIT description in receiving device
(Process example 4) Process example of executing broadcast application based on AIT description in receiving device
9-1. (Process Example 1) Process Example of Executing Residential Playback Application and then Also Executing Broadcast Application in Receiving Device
(Process example 1) A process example of executing a residential playback application and then executing a broadcast application (not a broadcast playback application) in conjunction with execution of the residential playback application in the receiving device will first be described with reference to FIGS. 19 and 20.

Figure 19:
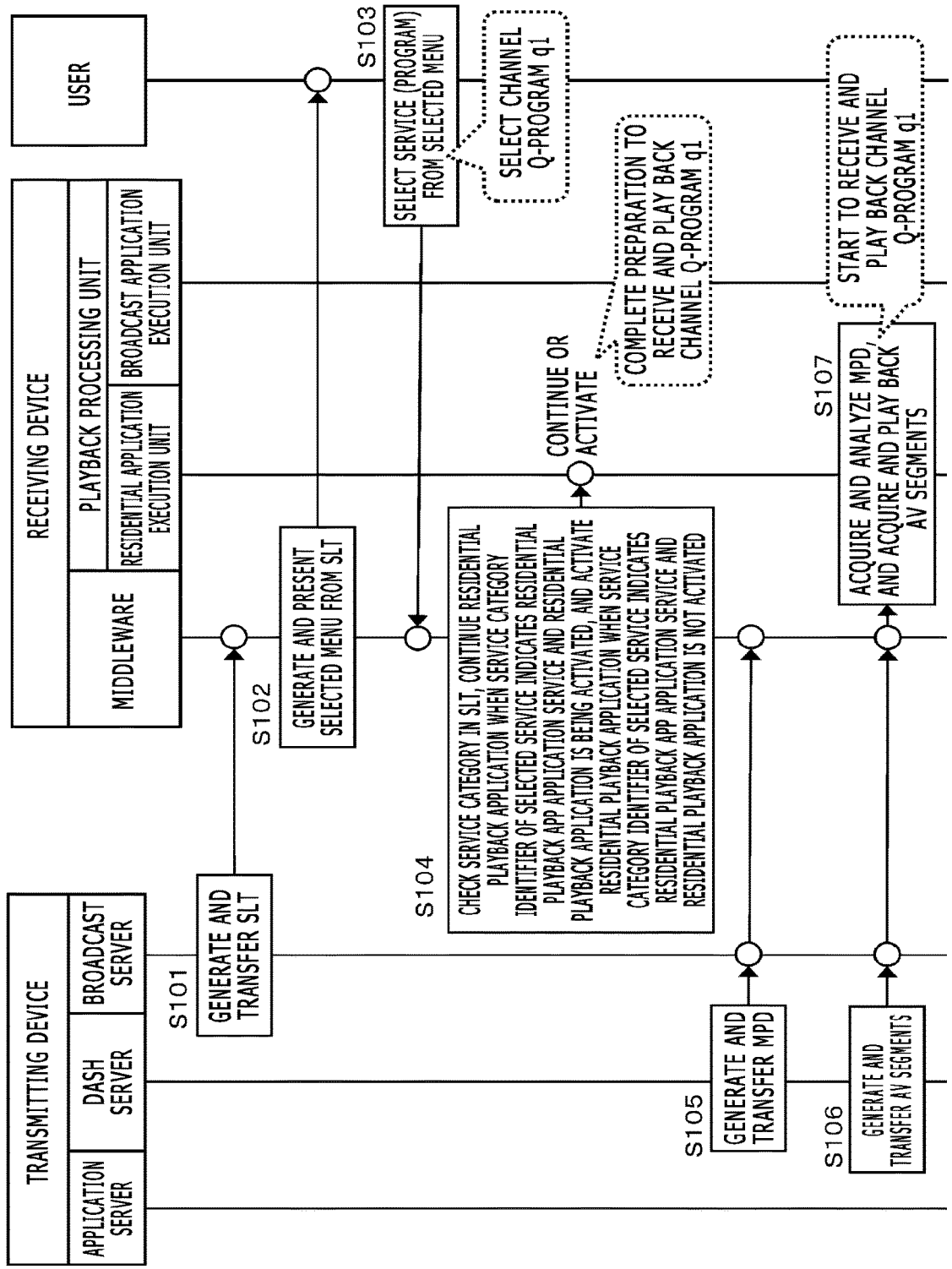
FIG. 19 is an explanatory diagram of an example of an execution sequence of a process for transmitting data from the transmitting device to the receiving device and a process for applying an application in the receiving device.
Figure 20:
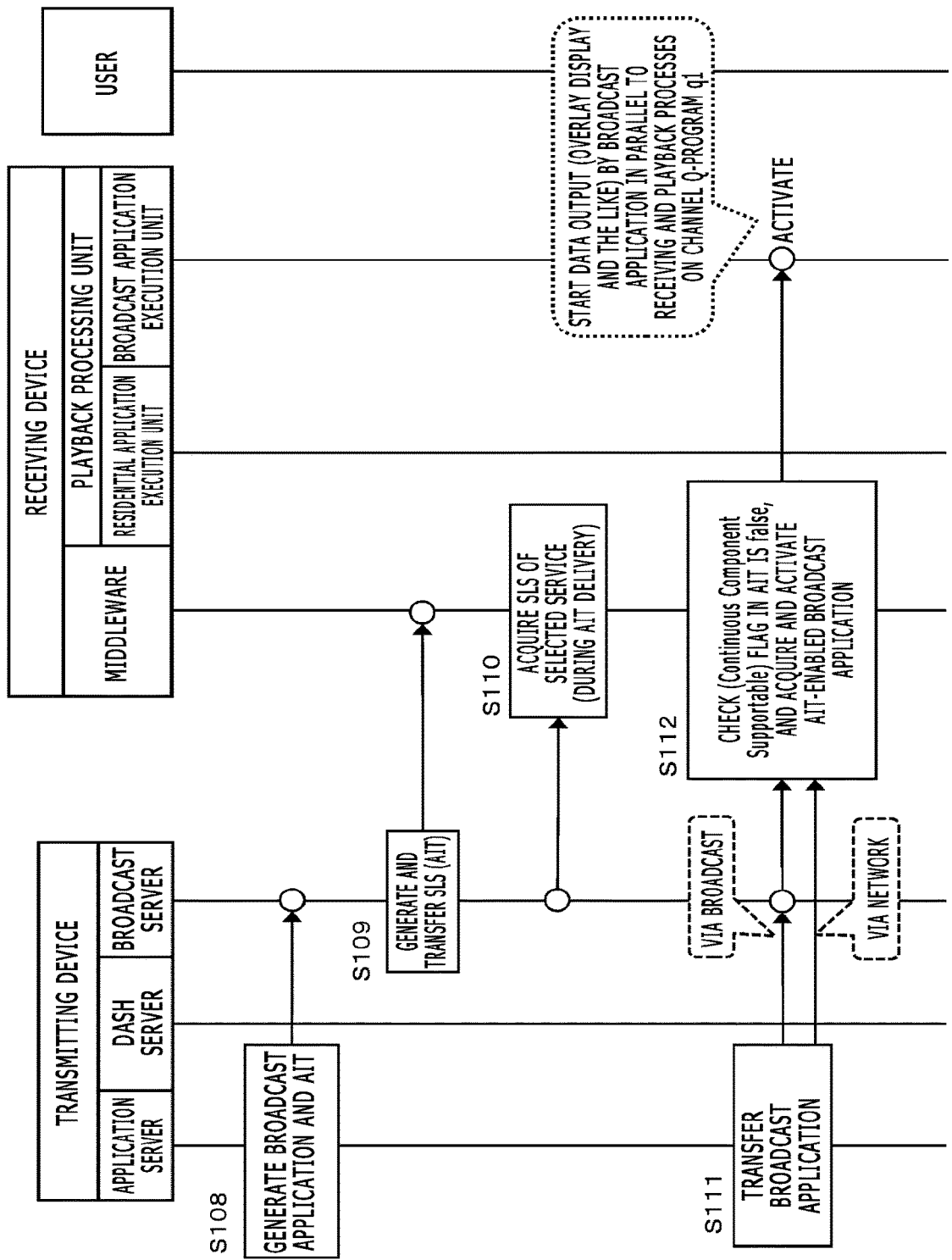
FIG. 20 is an explanatory diagram of an example of an execution sequence of a process for transmitting data from the transmitting device to the receiving device and a process for applying an application in the receiving device.

FIGS. 19 and 20 depict the following devices or constituent elements in order starting from the left.
(a) Application server that is a constituent element of the transmitting device,
(b) DASH server that is a constituent element of the transmitting device,
(c) Broadcast server that is a constituent element of the transmitting device,
(d) Middleware that is a constituent element of the receiving device,
(e) Residential application execution unit in the playback processing unit that is a constituent element of the receiving device,
(f) Broadcast application execution unit in the playback processing unit that is a constituent element of the receiving device, and
(g) User of the receiving device (service receiving party such as a program audience).

It is noted that "(a) Application server that is a constituent element of the transmitting device" executes a generation process and a transmission process for, for example, the broadcast playback application or the other application, and further for the AIT (Application Information Table) that is the signaling data recording the control information and the like on each application. Furthermore, "(b) DASH server that is a constituent element of the transmitting device" executes generation and transmission of, for example, AV segments constituting a program content and further executes a generation process and a transmission process for the MPD (Media Presentation Description) serving as the signaling data recording the control information and the like necessary for acquisition and playback processes on the AV segments, and the like.

Moreover, "(c) Broadcast server that is a constituent element of the transmitting device" executes generation, transmission, and the like of the SLT (Service List Table) and the SLS (Service Level Signaling) each of which is the signaling data for notification of the control information and the attribute information per service.

It is noted that the AIT (Application Information Table) that is the signaling data recording the control information and the like on each application is often stored in the SLS and transmitted.

It is noted that the following constituent elements of the transmitting device, that is,
(a) Application server that is a constituent element of the transmitting device,
(b) DASH server that is a constituent element of the transmitting device, and
(c) Broadcast server that is a constituent element of the transmitting device
may be configured as independent servers or configured as one server that executes all the functions.

(d) Middleware that is a constituent element of the receiving device executes reception of data from the transmitting device, and mainly executes analysis and the like of the signaling data.

(e) Residential application execution unit in the execution processing unit that is a constituent element of the receiving device executes the playback application embedded in the receiving device such as the residential playback application and other embedded applications. Furthermore, the residential application execution unit executes analysis (parsing) of the MPD that is the signaling data and executes the playback process involving the rendering on the broadcast service.

It is noted that there are various types of residential playback applications such as the website application executed on the browser and the embedded video player that can be executed independently of the browser.

(f) Broadcast application execution unit that is a constituent element of the receiving device executes the broadcast playback application provided from the transmitting device and other applications. Furthermore, the broadcast application execution unit executes analysis (parsing) of the MPD that is the signaling data and executes the playback process involving the rendering on the broadcast service.

A process in each step depicted in FIGS. 19 and 20 will be described below in succession.

(Step S101)

In Step S101, the broadcast server transmits the SLT (Service List Table) that is the signaling data.

As previously described with reference to FIGS. 9 and 10, the SLT (Service List Table) is a table that records the control information per service such as each broadcast station or each program.

As depicted in FIG. 10, the SLT (Service List Table) includes the service entries corresponding to the services, and the following data is recorded in each service entry:
(p) basic attribute information per service, and
(q) service signaling boot strap address.

The service signaling boot strap address corresponds to an address for acquiring the service level signaling such as the S-TSID that is the metadata (signaling data) per service.

When setting a channel to a certain channel and determining a service to be received (broadcast station, program or the like), the receiving device (client) 30 first acquires the SLT (Service List Table) that is the signaling data.

Furthermore, the receiving device 30 selects the service entry corresponding to the service recorded in the acquired SLT (Service List Table) and determined to be received, and acquires the information recorded in the selected service entry. That is, the receiving device 30 acquires:
(p) basic attribute information per service, and
(q) service signaling boot strap address.

In (p) basic attribute information per service, the service category identifier described with reference to FIGS. 11 to 14 is recorded.

In other words, the service category identifier that makes it possible to confirm whether the application applied to the processes on the data corresponding to the service is at least one of:
the residential playback application,
the broadcast playback application, and
the other broadcast application
is recorded in (p) basic attribute information per service.

When the service category identifier described with reference to FIGS. 13 and 14 is used, it is also possible to distinguish whether the application is the broadcast playback application (native type) or the broadcast playback application (shared type).

Furthermore, address information or the like for acquiring the SLS (Service Level Signaling) that is the signaling data corresponding to each service is recorded in the (q) service signaling boot strap address per service recorded in the SLT (Service List Table).

The receiving device (client) acquires the SLS (Service Level Signaling) such as the S-TSID that is the metadata (signaling data) per service using this address.

The service attribute information and control information such as the information for acquiring the data belonging to each service, for example, the following data depicted in FIG. 9:
(b) A/V/CC-DASH file that serves as configuration data on a program content or the like, and
(c) NRT file configured with the non-realtime data such as the playback application, the index file, and other applications,
and the information necessary for the playback is recorded in the SLS (Service Level Signaling).

The receiving device (client) can receive the data (AV content and application) provided per service using the data recorded in the SLS (Service Level Signaling) such as the S-TSID that is the metadata (signaling data) per service, and execute the playback process.

(Step S102)

Next, the middleware of the receiving device displays a list of services, for example, a program list provided by the transmitting device on the display unit on the basis of the SLT received from the transmitting device.

(Step S103)

In Step S103, the user of the receiving device selects a program desired to be viewed from the service list (program list) displayed on the display unit of the receiving device. In other words, the user determines a service to be received.

Determination information is input to the middleware of the receiving device.

In the present process example, it is assumed that the user selects Program q1 on Channel Q.

(Step S104)

In Step S104, the middleware of the receiving device checks the service category of the user's selected service (for example, service=Channel Q or service=Program q1 on Channel Q) while referring to the SLT (Service List Table) received in Step S102.

As described above, the following information of each service is recorded in the SLT (Service List Table):
(p) basic attribute information per service, and
(q) service signaling boot strap address.

Furthermore, as (p) basic attribute information per service, the service category identifier previously described with reference to FIGS. 11 to 14 is recorded.

In Step S104, the middleware of the receiving device checks the service category identifier of the user's selected service, and confirms which of the following applications is the application applied to the processes on the data corresponding to the user's selected service:
the residential playback application,
the broadcast playback application, and
the other broadcast application.

In the present process example, it is assumed that the service category identifier of the user's selected service (Channel Q or Program q1 on Channel Q) indicates that the residential playback application is applied to the service.

In this case, the receiving device confirms the application that is being executed in the playback processing unit. When the residential playback application is being activated in the playback processing unit, the receiving device continues to execute the residential playback application.

On the other hand, when the residential playback application is not activated in the playback processing unit, the receiving device executes a process for activating the residential playback application.

For example, when the residential playback application is being activated, for example, when Program p1 on set Channel P before Channel Q is set is played back by the residential playback application, the receiving device continues to execute the residential playback application as it is.

(Step S105)

Step S105 is a process by the DASH server of the transmitting device.

In Step S105, the DASH server generates and transmits the MPD (Media Presentation Description) that is the signaling data.

The MPD is the signaling data recording the control information on various services (program contents). For example, the access information and the like on the segmented files of the AV content constituting each service (program content) are recorded in the MPD.

(Step S106)

Step S106 is a process by the DASH server of the transmitting device.

In Step S106, the DASH server generates and transmits the AV segments that are contents constituting the service (program).

(Step S107)

Step S107 is a process by the residential application execution unit in the playback processing unit of the receiving device.

The playback processing unit analyzes the MPD received from the transmitting device, acquires the AV segments while applying the access information on the AV segments recorded in the MPD, and executes the playback process including the rendering process on the content of the service (program) while applying the residential playback application.

In other words, the playback processing unit executes the playback of Program q1 on Channel Q that is the user's selected service while applying the residential playback application.

It is noted that the service to be subjected to the playback process in this Step S107 is the service the service category identifier of which has been checked in preceding Step S104.

In other words, checking the data in the SLT (Service List Table) indicates that the service (program) for which it has been confirmed that the application applied to the processes on the data corresponding to the user's selected service is the residential playback application.

(Step S108)

Step S108 is a process by the application server of the transmitting device.

In Step S108, the application server generates the broadcast application and the AIT (Application Information Table) that is the signaling data recording the control information on the broadcast application.

In the present process example, it is assumed that the application generated in Step S108 is not the playback application applied to the playback process on the AV segments constituting the program itself that is the main content constituting the service but the broadcast application serving as the attached application that can be executed in conjunction with the execution of the playback application.

(Step S109)

Step S109 is a process by the broadcast server of the transmitting device.

The broadcast server generates and transmits the SLS (Service Level Signaling) that stores the AIT (Application Information Table) generated by the application server in Step S108.

The SLS (Service Level Signaling) is the signaling data recording the control information and the attribute information per service.

As previously described with reference to FIGS. 9 and 10, the receiving device can acquire the SLS on the basis of the recorded information in the service entry recorded in the SLT (Service List Table) received previously.

(Step S110)

Step S110 is a process by the middleware of the receiving device.

In Step S110, the middleware of the receiving device acquires the SLS (Service Level Signaling) transmitted by the broadcast server as the transmitting device in Step S109 and storing the AIT (Application Information Table).

This is the SLS transmitted from the transmitting device as the signaling data associated with the service (program) that is currently played back in the playback processing unit of the receiving device, belonging to the same service, and corresponding to the service.

(Step S111)

Step S111 is a process by the application server of the transmitting device.

In Step S111, the application server of the transmitting device generates and transmits a broadcast application. A transmission process is executed via the broadcast wave or the network.

It is noted that the application transmitted in Step S111 is, for example, the application for executing an output process and the like on the data output in conjunction with the service (program) that is currently played back in the receiving device.

Specifically, if the service (Program q1 on Channel Q) to which the receiving device applies the residential playback application in Step S107 is, for example, a televised baseball game, the application generated and provided to the receiving device in this Step S111 is the application for outputting data such as baseball player information to the display unit of the receiving device.

In other words, the application is not the playback application applied to the playback process on the AV segments constituting the program itself that is the main content constituting the service but the other broadcast application.

(Step S112)

Step S112 is a process by the middleware of the receiving device and the broadcast application execution unit in the playback processing unit of the receiving device. The middleware of the receiving device acquires the AIT (Application Information Table) from the SLS (Service Level Signaling) received in Step S110.

The AIT included in this SLS is an AIT recording attribute and control information on the broadcast application transmitted by the application server of the transmitting device in Step S111.

The middleware of the receiving device checks the value (true or false) of the delivery application identification flag (Continuous Component Supportable flag) recorded in the acquired AIT.

In the present process example, the application transmitted by the application server of the transmitting device in Step S111 is not the playback application for the AV segments of the main content (program) of the service but the application attached to the program. Therefore, the value of the delivery application identification flag is set to false. In other words, it is confirmed that the application associated with this AIT (application transmitted by the application server of the transmitting device in Step S111) is not the playback application for the AV segments of the main content (program) of the service.

The middleware of the receiving device causes the broadcast application execution unit in the playback processing unit of the receiving device to activate and execute the application transmitted by the application server of the transmitting device in Step S111 on the basis of this check of the delivery application identification flag.

In other words, the playback processing unit of the receiving device executes the playback of the program (Program q1 on Channel Q) while applying the residential playback application, and the broadcast application execution unit executes the application attached to the program in conjunction with the execution of the playback of the program.

As a result of this process, the televised baseball game is played back while applying, for example, the residential playback application, and the data such as the player information generated while applying the broadcast application is output to be overlaid on a televised baseball game screen.

While various pieces of signaling data (such as the SLT, the SLS, the AIT, and the MPD) are transmitted from the transmitting device and received by the receiving device in the sequence described with reference to FIGS. 19 and 20, transmission timing and reception timing of the signaling data described with reference to FIGS. 19 and 20 are given as an example.

The signaling data is continuously and repeatedly transmitted from the transmitting device and the receiving device can receive the signaling data at various timing. Therefore, it is possible to execute signaling data transmission and reception processes at timing different from the transmission and reception timing described with reference to FIGS. 19 and 20.

The broadcast playback application and the broadcast application that are the NRT (non-realtime) contents can be repeatedly transmitted by the transmitting device as needed, and transmission and reception timing of these data can also be set to differ from the transmission and reception timing described with reference to FIGS. 19 and 20.

Moreover, the signaling data transmitted by the transmitting device is updated as appropriate, and is configured such that whether the signaling data has been updated can be confirmed by a version number or the like. The receiving device checks a version of the received signaling data. When confirming reception of newer signaling data than the previously-received signaling data, the receiving device abandons the previously-received signaling data, stores the updated signaling data in the storage unit, and executes the processes to which the updated signaling data is applied.

Through such a process, the receiving device executes the processes according to the new signaling data as needed.

9-2. (Process Example 2) Process Example of Executing Residential Playback Application, then Executing Broadcast Playback Application Based on AIT Description, and Further Executing Residential Playback Application Based on Next AIT Description in Receiving Device (Process Example 2) A process example of executing a residential playback application, then executing a broadcast playback application based on an AIT description, and further executing a residential playback application based on a next AIT description in the receiving device will next be described with reference to FIGS. 21 to 23.

Similarly to FIGS. 19 and 20, FIGS. 21 to 23 depict the following devices or constituent elements in order starting from the left.

(a) Application server that is a constituent element of the transmitting device,
(b) DASH server that is a constituent element of the transmitting device,
(c) Broadcast server that is a constituent element of the transmitting device,
(d) Middleware that is a constituent element of the receiving device,
(e) Residential application execution unit in the playback processing unit that is a constituent element of the receiving device,
(f) Broadcast application execution unit in the playback processing unit that is a constituent element of the receiving device, and
(g) User of the receiving device (service receiving party such as a program audience).

These constituent elements execute processes similar to the processes described previously with reference to FIGS. 19 and 20.

Furthermore, the following constituent elements of the transmitting device, that is,
(a) Application server that is a constituent element of the transmitting device,
(b) DASH server that is a constituent element of the transmitting device, and
(c) Broadcast server that is a constituent element of the transmitting device may be configured as independent servers or configured as one server that executes all the functions.

A process in each step depicted in FIGS. 21 to 23 will be described below in succession.

(Step S151)

In Step S151, the broadcast server transmits the SLT (Service List Table) that is the signaling data.

As previously described with reference to FIGS. 9 and 10, the SLT (Service List Table) is a table that records the control information per service such as each broadcast station or each program.

As depicted in FIG. 10, the SLT (Service List Table) includes the service entries corresponding to the services, and the following data is recorded in each service entry:
(p) basic attribute information per service, and
(q) service signaling boot strap address.

In (p) basic attribute information per service, the service category identifier described with reference to FIGS. 11 to 14 is recorded.

In other words, the service category identifier that makes it possible to confirm whether the application applied to the processes on the data corresponding to the service is at least one of:
the residential playback application,
the broadcast playback application, and
the other broadcast application
is recorded in (p) basic attribute information per service.

When the service category identifier described with reference to FIGS. 13 and 14 is used, it is also possible to distinguish whether the application is the broadcast playback application (native type) or the broadcast playback application (shared type).

(Step S152)

Next, the middleware of the receiving device displays a list of services, for example, a program list provided by the transmitting device on the display unit on the basis of the SLT received from the transmitting device.

(Step S153)

In Step S153, the user of the receiving device selects a program desired to be viewed from the service list (program list) displayed on the display unit of the receiving device. In other words, the user determines a service to be received.

Determination information is input to the middleware of the receiving device.

In the present process example, it is assumed that the user selects Program q1 on Channel Q.

(Step S154)

In Step S154, the middleware of the receiving device checks the service category of the user's selected service (for example, service=Channel Q or service=Program q1 on Channel Q) while referring to the SLT (Service List Table) received in Step S152.

As described above, the following information of each service is recorded in the SLT (Service List Table):
(p) basic attribute information per service, and
(q) service signaling boot strap address.

Furthermore, as (p) basic attribute information per service, the service category identifier previously described with reference to FIGS. 11 and 12 is recorded.

In Step S154, the middleware of the receiving device checks the service category identifier of the user's selected service, and confirms which of the following applications is the application applied to the processes on the data corresponding to the user's selected service:
the residential playback application,
the broadcast playback application, and
the other broadcast application.

In the present process example, it is assumed that the service category identifier of the user's selected service (Channel Q or Program q1 on Channel Q) indicates that the residential playback application is applied to the service.

In this case, the receiving device confirms the application that is being executed in the playback processing unit. When the residential playback application is being activated in the playback processing unit, the receiving device continues to execute the residential playback application.

On the other hand, when the residential playback application is not activated in the playback processing unit, the receiving device executes a process for activating the residential playback application.

For example, when the residential playback application is being activated, for example, when Program p1 on set Channel P before Channel Q is set is played back by the residential playback application, the receiving device continues to execute the residential playback application as it is.
(Step S155)

Step S155 is a process by the DASH server of the transmitting device.

In Step S155, the DASH server generates and transmits the MPD (Media Presentation Description) that is the signaling data.

The MPD is the signaling data recording the control information on various services (program contents). For example, the access information and the like on the segmented files of the AV content constituting each service (program content) are recorded in the MPD.
(Step S156)

Step S156 is a process by the DASH server of the transmitting device.

In Step S156, the DASH server generates and transmits the AV segments that are contents constituting the service (program).
(Step S157)

Step S157 is a process by the residential application execution unit in the playback processing unit of the receiving device.

The playback processing unit analyzes the MPD received from the transmitting device, acquires the AV segments while applying the access information on the AV segments recorded in the MPD, and executes the playback process including the rendering process on the content of the service (program) while applying the residential playback application.

In other words, the playback processing unit executes the playback of Program q1 on Channel Q that is the user's selected service while applying the residential playback application.

It is noted that the service to be subjected to the playback process in this Step S157 is the service the service category identifier of which has been checked in preceding Step S154.

In other words, checking the data in the SLT (Service List Table) indicates that the service (program) for which it has been confirmed that the application applied to the processes on the data corresponding to the user's selected service is the residential playback application.
(Step S158)

Step S158 is a process by the application server of the transmitting device.

In Step S158, the application server generates the broadcast playback application and the AIT (Application Information Table) that is the signaling data recording the control information on the broadcast playback application.

In the present process example, the application generated in Step S158 is the playback application applied to the playback process on the AV segments constituting the program itself that is the main content constituting the service. In other words, it is assumed that the application is the broadcast playback application.
(Step S159)

Step S159 is a process by the broadcast server of the transmitting device.

The broadcast server generates and transmits the SLS (Service Level Signaling) that stores the AIT (Application Information Table) generated by the application server in Step S158.

The SLS (Service Level Signaling) is the signaling data recording the control information and the attribute information per service.

As previously described with reference to FIGS. 9 and 10, the receiving device can acquire the SLS on the basis of the recorded information in the service entry recorded in the SLT (Service List Table) received previously.
(Step S160)

Step S160 is a process by the middleware of the receiving device.

In Step S160, the middleware of the receiving device acquires the SLS (Service Level Signaling) transmitted by the broadcast server of the transmitting device in Step S159 and storing the AIT (Application Information Table).

This is the SLS transmitted from the transmitting device as the signaling data associated with the service (Channel Q or Program q1 on Channel Q) that is currently played back in the playback processing unit of the receiving device, belonging to the same service (Channel Q or Program q1 on Channel Q), and corresponding to the service.
(Step S161)

Step S161 is a process by the application server of the transmitting device.

In Step S161, the application server of the transmitting device generates and transmits a broadcast playback application.

A transmission process is executed via the broadcast wave or the network.

It is noted that the application transmitted in Step S161 is the broadcast playback application applicable to the playback process on the service (Channel Q or Program q1 on Channel Q) that is currently played back in the receiving device.

The application is the broadcast playback application applicable to the playback of the service (Channel Q or Program q1 on Channel Q) that is played back by the receiving device while applying the residential playback application in Step S157.
(Step S162)

Step S162 is a process by the middleware of the receiving device and the broadcast application execution unit in the playback processing unit of the receiving device. The middleware of the receiving device acquires the AIT (Application Information Table) from the SLS (Service Level Signaling) received in Step S160.

The AIT included in this SLS is an AIT recording attribute and control information on the broadcast playback application transmitted by the application server of the transmitting device in Step S161.

The middleware of the receiving device checks the value (true or false) of the delivery application identification flag (Continuous Component Supportable flag) recorded in the acquired AIT.

In the present process example, the application transmitted by the application server of the transmitting device in Step S161 is the playback application for the AV segments of the main content (program) of the service. Therefore, the value of the delivery application identification flag is set to true. In other words, it is confirmed that the application associated with this AIT (application transmitted by the application server of the transmitting device in Step S161) is applicable as the playback application for the AV segments of the main content (Program q1 on Channel Q) of the service.

The middleware of the receiving device causes the broadcast application execution unit in the playback processing unit of the receiving device to activate and execute the broadcast playback application transmitted by the application server of the transmitting device in Step S161 on the basis of this check of the delivery application identification flag.

The residential playback application currently applied to the playback of the main content in the residential application execution unit is stopped in conjunction with activation of this broadcast playback application.

In this way, the receiving device executes a process for switching the playback application applied to the playback of the service (Channel Q or Program q1 on Channel Q) from the residential playback application to the broadcast playback application on the basis of the check of the delivery application identification flag in the AIT.

(Step S163)

Step S163 is a process by the DASH server of the transmitting device.

In Step S163, the DASH server generates and transmits the AV segments that are contents constituting the service (for example, Program q1 on Channel Q).

(Step S164)

Step S164 is a process by the broadcast application execution unit in the playback processing unit of the receiving device.

The broadcast application execution unit in the playback processing unit analyzes the MPD received from the transmitting device, acquires the AV segments while applying the access information on the AV segments recorded in the MPD, and executes the playback process including the rendering process on the content of the service (for example, Program q1 on Channel Q) while applying the broadcast playback application.

(Step S165)

Step S165 is a process by the middleware of the receiving device.

In Step S165, the middleware of the receiving device acquires the SLS (Service Level Signaling) transmitted by the broadcast server and storing the AIT (Application Information Table).

This is the SLS transmitted from the transmitting device as the signaling data associated with the service (Program q1 on Channel Q) that is currently played back in the playback processing unit of the receiving device, belonging to the same service, and corresponding to the service.

(Step S166)

Step S166 is a process by the middleware of the receiving device and the broadcast application execution unit in the playback processing unit of the receiving device. The middleware of the receiving device acquires the AIT (Application Information Table) from the SLS (Service Level Signaling) received in Step S165.

When it is confirmed that this AIT included in the SLS is an AIT recording attribute and control information on the broadcast playback application transmitted by the application server of the transmitting device in Step S161, the middleware of the receiving device checks a description content of the AIT.

When it is confirmed that this AIT is an AIT that describes an instruction to stop the broadcast playback application that is being currently executed in the playback processing unit, the middleware of the receiving device stops the broadcast playback application that is being executed and executes a process for activating the residential playback application.

In this way, the receiving device executes a process for switching the playback application applied to the playback of the service from the broadcast playback application to the residential playback application on the basis of the data recorded in the AIT.

(Step S167)

Step S167 is a process by the middleware of the receiving device.

In Step S167, the middleware of the receiving device acquires the SLS (Service Level Signaling) transmitted by the broadcast server in Step S167 and storing the AIT (Application Information Table).

This is the SLS transmitted from the transmitting device as the signaling data associated with the service (Program q1 on Channel Q) that is currently played back in the playback processing unit of the receiving device, belonging to the same service, and corresponding to the service.

(Step S168)

Step S168 is a process by the application server of the transmitting device.

In Step S168, the application server of the transmitting device generates and transmits a broadcast application. A transmission process is executed via the broadcast wave or the network.

It is noted that the application transmitted in Step S168 is, for example, the application for executing an output process and the like on the data output in conjunction with the service (Program q1 on Channel Q) that is currently played back in the receiving device.

Specifically, if the service (Program q1 on Channel Q) to which the receiving device applies the residential playback application in Step S166 is, for example, a televised baseball game, the application generated and provided to the receiving device in this Step S168 is the application for outputting data such as baseball player information to the display unit of the receiving device.

In other words, the application is not the playback application applied to the playback process on the AV segments constituting the program itself that is the main content constituting the service but the other broadcast application.

(Step S169)

Step S169 is a process by the middleware of the receiving device and the broadcast application execution unit in the playback processing unit of the receiving device. The middleware of the receiving device acquires the AIT (Application Information Table) from the SLS (Service Level Signaling) received in Step S167.

The AIT included in this SLS is an AIT recording attribute and control information on the broadcast application transmitted by the application server of the transmitting device in Step S168.

The middleware of the receiving device checks the value (true or false) of the delivery application identification flag (Continuous Component Supportable flag) recorded in the acquired AIT.

In the present process example, the application transmitted by the application server of the transmitting device in Step S168 is not the playback application for the AV segments of the main content (program) of the service but the application attached to the program. Therefore, the value of the delivery application identification flag is set to false. In other words, it is confirmed that the application associated with this AIT (application transmitted by the application server of the transmitting device in Step S168) is not the playback application for the AV segments of the main content (program) of the service.

The middleware of the receiving device causes the broadcast application execution unit in the playback processing unit of the receiving device to activate and execute the application transmitted by the application server of the transmitting device in Step S168 on the basis of this check of the delivery application identification flag.

In other words, the playback processing unit of the receiving device executes the playback of the program while applying the residential playback application, and the broadcast application execution unit executes the application attached to the program in conjunction with the execution of the playback of the program.

As a result of this process, the televised baseball game is played back while applying, for example, the residential playback application, and the data such as the player information generated while applying the broadcast application is output to be overlaid on a televised baseball game screen.

Figure 21:
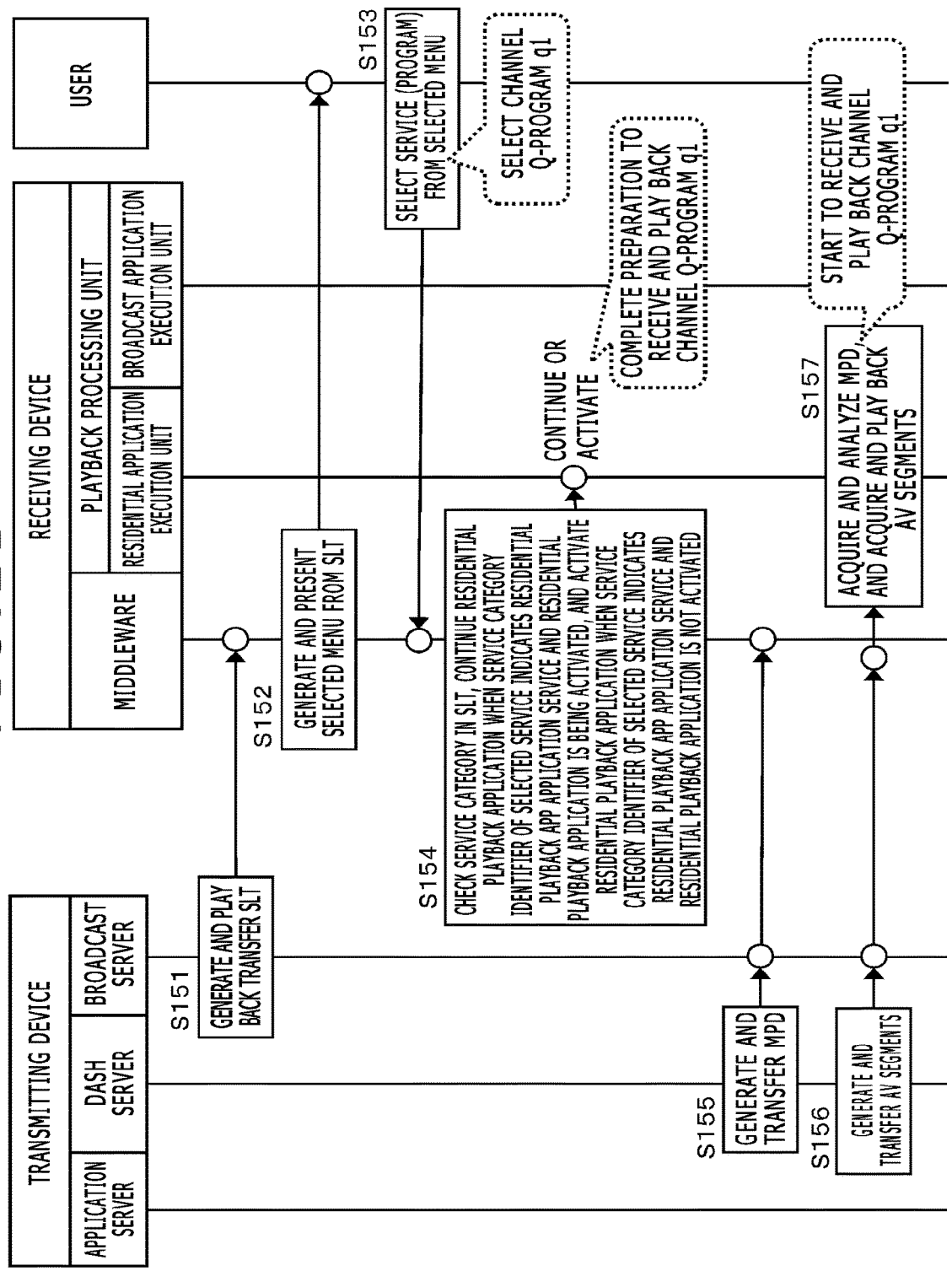
FIG. 21 is an explanatory diagram of an example of an execution sequence of a process for transmitting data from the transmitting device to the receiving device and a process for applying an application in the receiving device.
Figure 22:
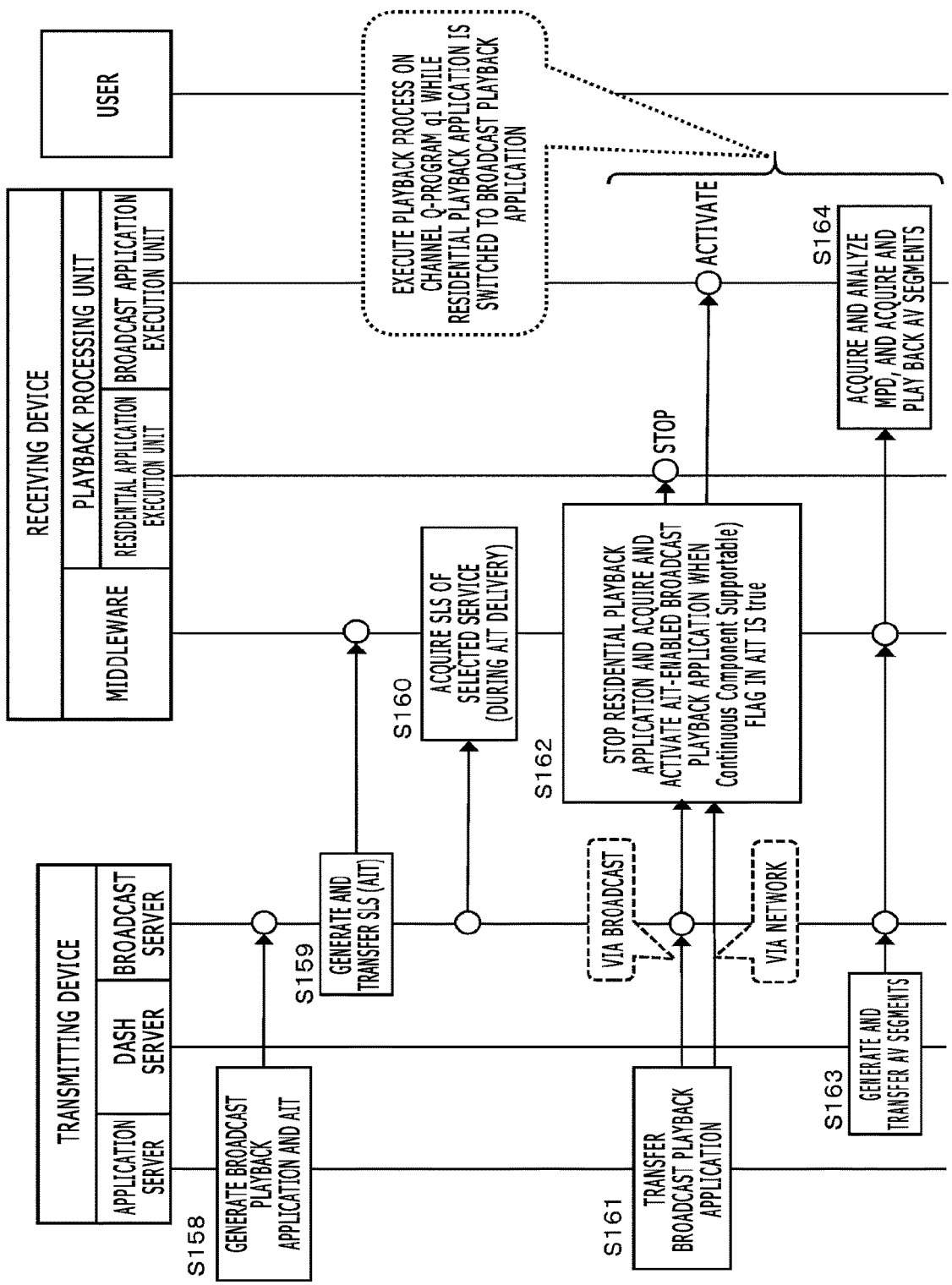
FIG. 22 is an explanatory diagram of an example of an execution sequence of a process for transmitting data from the transmitting device to the receiving device and a process for applying an application in the receiving device.
Figure 23:
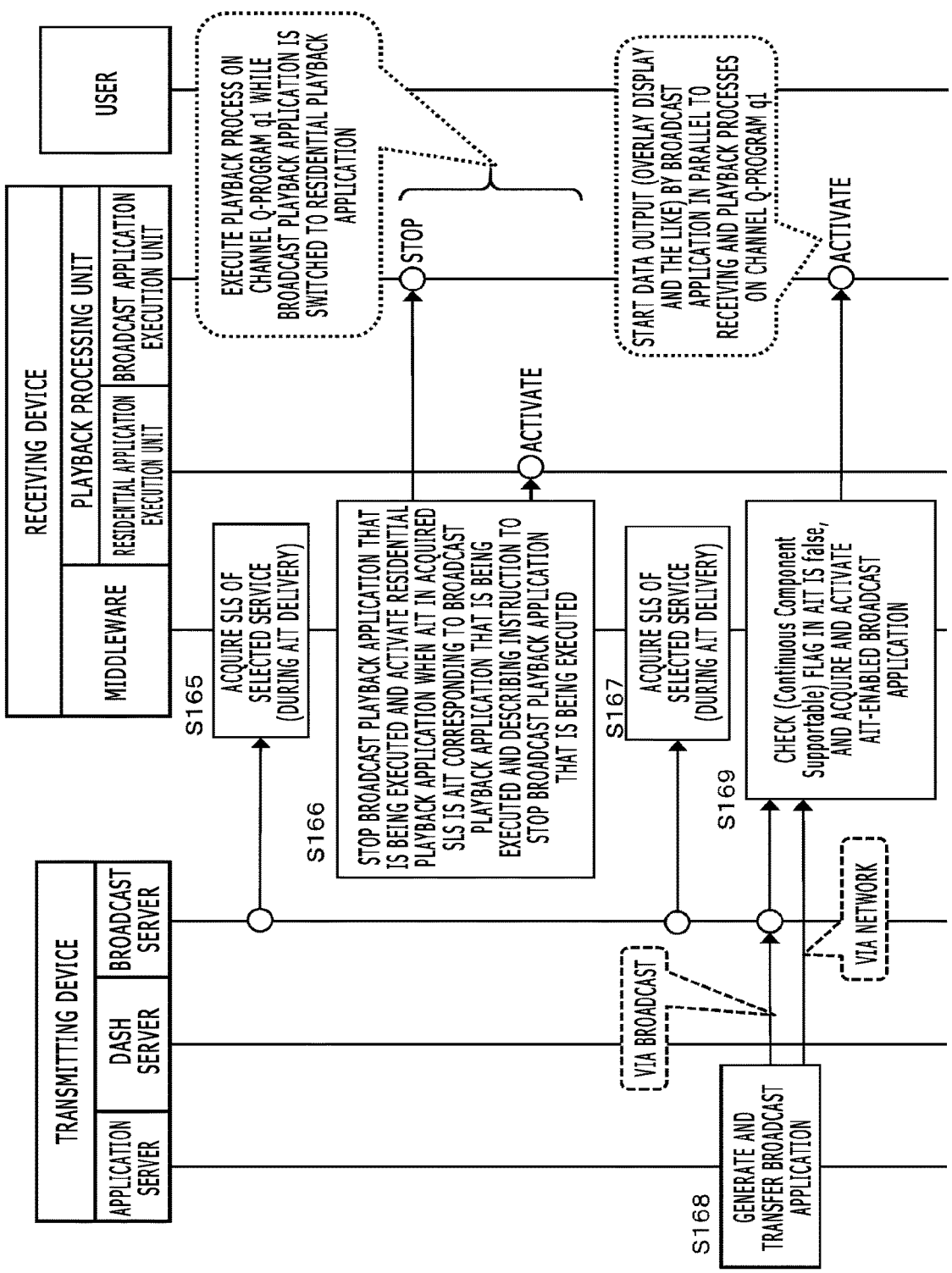
FIG. 23 is an explanatory diagram of an example of an execution sequence of a process for transmitting data from the transmitting device to the receiving device and a process for applying an application in the receiving device.

It is noted that, while various pieces of signaling data (such as the SLT, the SLS, the AIT, and the MPD) are transmitted from the transmitting device and received by the receiving device in the sequence described with reference to FIGS. 21 to 23, transmission timing and reception timing of the signaling data described with reference to FIGS. 21 to 23 are given as an example. The signaling data is continuously and repeatedly transmitted from the transmitting device and the receiving device can receive the signaling data at various timing. Therefore, it is possible to execute signaling data transmission and reception processes at timing different from the transmission and reception timing described with reference to FIGS. 21 to 23.

The broadcast playback application and the broadcast application that are the NRT (non-realtime) contents can be repeatedly transmitted by the transmitting device as needed, and transmission and reception timing of these data can also be set to differ from the transmission and reception timing described with reference to FIGS. 21 to 23.

Moreover, the signaling data transmitted by the transmitting device is updated as appropriate, and is configured such that whether the signaling data has been updated can be confirmed by a version number or the like. The receiving device checks a version of the received signaling data. When confirming reception of newer signaling data than the previously-received signaling data, the receiving device abandons the previously-received signaling data, stores the updated signaling data in the storage unit, and executes the processes to which the updated signaling data is applied.

Through such a process, the receiving device executes the processes according to the new signaling data as needed.

9-3. (Process Example 3) Process Example of Executing Broadcast Playback Application Based on AIT Description in Receiving Device (Process Example 3) A process example of executing a broadcast playback application based on an AIT description in the receiving device will next be described with reference to FIGS. 24 and 25.

A process in each step depicted in FIGS. 24 and 25 will be described below in succession.

(Step S201)

In Step S201, the broadcast server transmits the SLT (Service List Table) that is the signaling data.

As previously described with reference to FIGS. 9 and 10, the SLT (Service List Table) is a table that records the control information per service such as each broadcast station or each program.

As depicted in FIG. 10, the SLT (Service List Table) includes the service entries corresponding to the services, and the following data is recorded in each service entry:
(p) basic attribute information per service, and
(q) service signaling boot strap address.

Furthermore, in (p) basic attribute information per service, the service category identifier previously described with reference to FIGS. 11 to 14 is recorded. In other words, the service category identifier that makes it possible to confirm whether the application applied to the processes on the data corresponding to the service is at least one of:
the residential playback application,
the broadcast playback application, and
the other broadcast application
is recorded in (p) basic attribute information per service.

When the service category identifier described with reference to FIGS. 13 and 14 is used, it is also possible to distinguish whether the application is the broadcast playback application (native type) or the broadcast playback application (shared type).

(Step S202)

Next, the middleware of the receiving device displays a list of services, for example, a program list provided by the transmitting device on the display unit on the basis of the SLT received from the transmitting device.

(Step S203)

In Step S203, the user of the receiving device selects a program desired to be viewed from the service list (program list) displayed on the display unit of the receiving device. In other words, the user determines a service to be received.

Determination information is input to the middleware of the receiving device.

In the present process example, it is assumed that the user has changed Program q1 on Channel Q that is currently viewed to select Program r1 on Channel R.

(Step S204)

In Step S204, the middleware of the receiving device checks the service category of the user's selected service (for example, service=Channel R or service=Program r1 on Channel R) while referring to the SLT (Service List Table) received in Step S202.

As described above, the following information of each service is recorded in the SLT (Service List Table):
(p) basic attribute information per service, and
(q) service signaling boot strap address.

Furthermore, as (p) basic attribute information per service, the service category identifier previously described with reference to FIGS. 11 to 14 is recorded.

In Step S204, the middleware of the receiving device checks the service category identifier of the user's selected service (Channel R or Program r1 on Channel R), and confirms which of the following applications is the application applied to the processes on the data corresponding to the user's selected service:
the residential playback application,
the broadcast playback application, and
the other broadcast application.

In the present process example, it is assumed that the service category identifier of the user's selected service (Channel R or Program r1 on Channel R) indicates that the broadcast playback application is applied to the service.

In this case, the receiving device confirms the application that is being executed in the playback processing unit. When the residential playback application is being activated in the playback processing unit, the receiving device stops the residential playback application.

For example, when the residential playback application is being activated, for example, when Program q1 on set Channel Q before Channel R is set is played back by the residential playback application, the receiving device stops the residential playback application.

(Step S205)

Step S205 is a process by the application server of the transmitting device.

In Step S205, the application server generates the broadcast playback application and the AIT (Application Information Table) that is the signaling data recording the control information on the broadcast playback application.

It is noted that, in the present process example, the application generated in Step S205 is the playback application applied to the playback process on the AV segments constituting the program itself that is the main content constituting the service. In other words, it is assumed that the application is the broadcast playback application.

(Step S206)

Step S206 is a process by the broadcast server of the transmitting device.

The broadcast server generates and transmits the SLS (Service Level Signaling) that stores the AIT (Application Information Table) generated by the application server in Step S206.

The SLS (Service Level Signaling) is the signaling data recording the control information and the attribute information per service.

As previously described with reference to FIGS. 9 and 10, the receiving device can acquire the SLS on the basis of the recorded information in the service entry recorded in the SLT (Service List Table) received previously.

(Step S207)

Step S207 is a process by the middleware of the receiving device.

In Step S207, the middleware of the receiving device acquires the SLS (Service Level Signaling) transmitted by the broadcast server of the transmitting device in Step S206 and storing the AIT (Application Information Table).

This is the SLS transmitted from the transmitting device as the signaling data associated with the user's selected service (Channel R or Program r1 on Channel R), belonging to the same service (Channel R or Program r1 on Channel R), and corresponding to the service.

(Step S208)

Step S208 is a process by the application server of the transmitting device.

In Step S208, the application server of the transmitting device generates and transmits a broadcast playback application.

A transmission process is executed via the broadcast wave or the network.

It is noted that the application transmitted in Step S208 is the broadcast playback application applicable to the playback process on the user's selected service (Program r1 on Channel R).

(Step S209)

Step S209 is a process by the middleware of the receiving device and the broadcast application execution unit in the playback processing unit of the receiving device. The middleware of the receiving device acquires the AIT (Application Information Table) from the SLS (Service Level Signaling) received in Step S207.

The AIT included in this SLS is an AIT recording attribute and control information on the broadcast application transmitted by the application server of the transmitting device in Step S208.

The middleware of the receiving device checks the value (true or false) of the delivery application identification flag (Continuous Component Supportable flag) recorded in the acquired AIT.

In the present process example, the application transmitted by the application server of the transmitting device in Step S208 is the broadcast playback application serving as the playback application for the AV segments of the main content (program) of the service.

Therefore, the value of the delivery application identification flag is set to true. In other words, it is confirmed that the application associated with this AIT (application transmitted by the application server of the transmitting device in Step S208) is the playback application for the AV segments of the main content (program) of the service.

The middleware of the receiving device causes the broadcast application execution unit in the playback processing unit of the receiving device to activate and execute the broadcast playback application transmitted by the application server of the transmitting device in Step S208 on the basis of this check of the delivery application identification flag.

Preparation for reception and playback of the user's selected service (Program r1 on Channel R) is thereby completed.

(Step S210)

Step S210 is a process by the DASH server of the transmitting device.

In Step S210, the DASH server generates and transmits the MPD (Media Presentation Description) that is the signaling data.

The MPD is the signaling data recording the control information on various services (program contents). For example, the access information and the like on the segmented files of the AV content constituting each service (program content) are recorded in the MPD.

(Step S211)

Step S211 is a process by the DASH server of the transmitting device.

In Step S211, the DASH server generates and transmits the AV segments that are contents constituting the service (Program r1 on Channel R).

(Step S212)

Step S212 is a process by the broadcast application execution unit in the playback processing unit of the receiving device.

The playback processing unit analyzes the MPD received from the transmitting device, acquires the AV segments while applying the access information on the AV segments recorded in the MPD, and executes the playback process including the rendering process on the content of the service (Program r1 on Channel R) while applying the broadcast playback application.

In other words, the playback processing unit executes the playback of Program q1 on Channel Q that is the user's selected service while applying the residential playback application.

It is noted that the service to be subjected to the playback process in this Step S210 is the service the service category identifier of which has been checked in preceding Step S204.

In other words, checking the data in the SLT (Service List Table) indicates that the service (program) for which it has been confirmed that the application applied to the processes on the data corresponding to the user's selected service (Program r1 on Channel R) is the broadcast playback application.

Through these processes, the service (Program q1 on Channel Q) that has been played back before transition while, for example, the residential playback application is applied to the playback is stopped, and the user's selected transition-destination service (Program r1 on Channel R) is played back while the broadcast playback application is applied to the playback.

Figure 24:
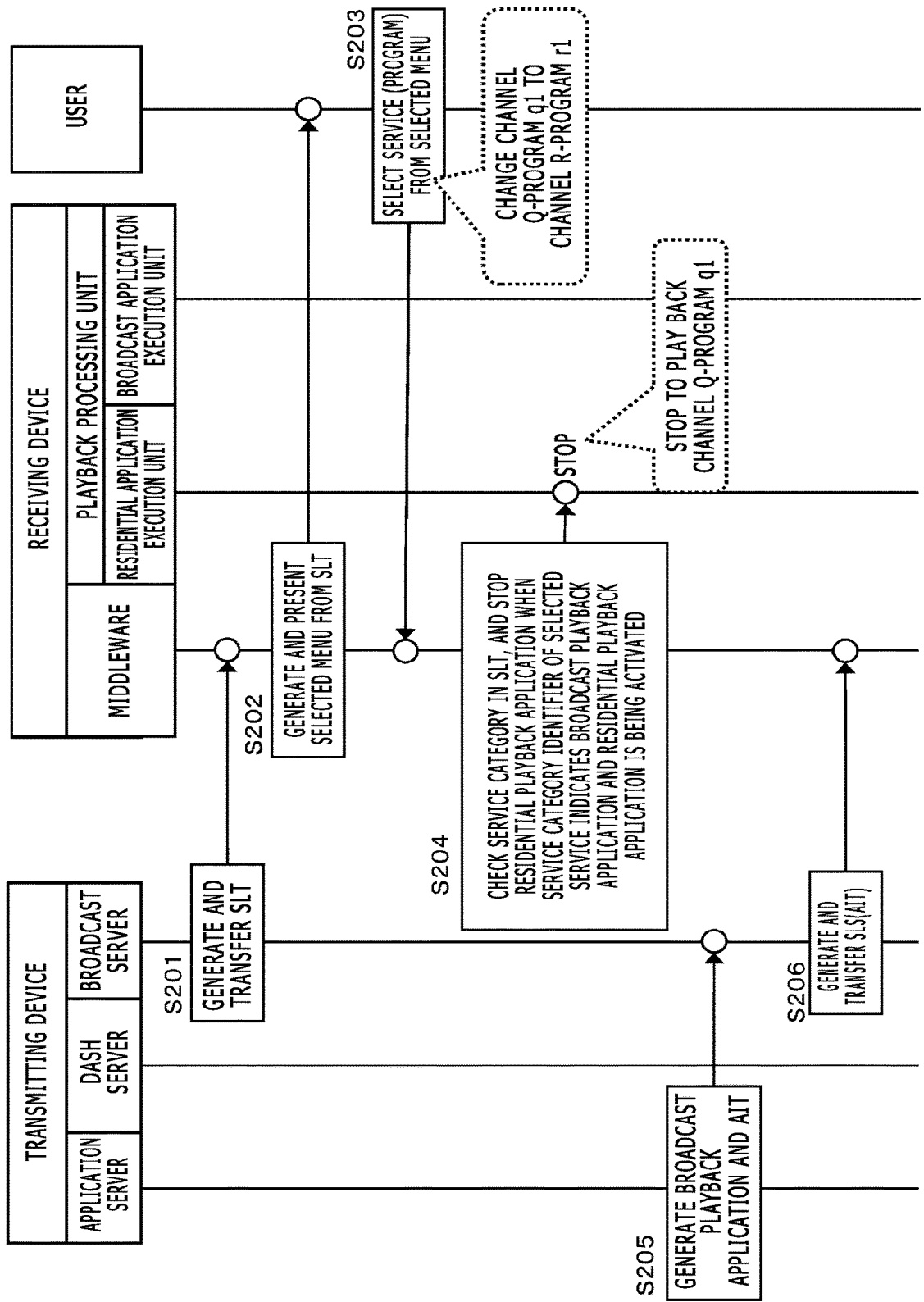
FIG. 24 is an explanatory diagram of an example of an execution sequence of a process for transmitting data from the transmitting device to the receiving device and a process for applying an application in the receiving device.
Figure 25:
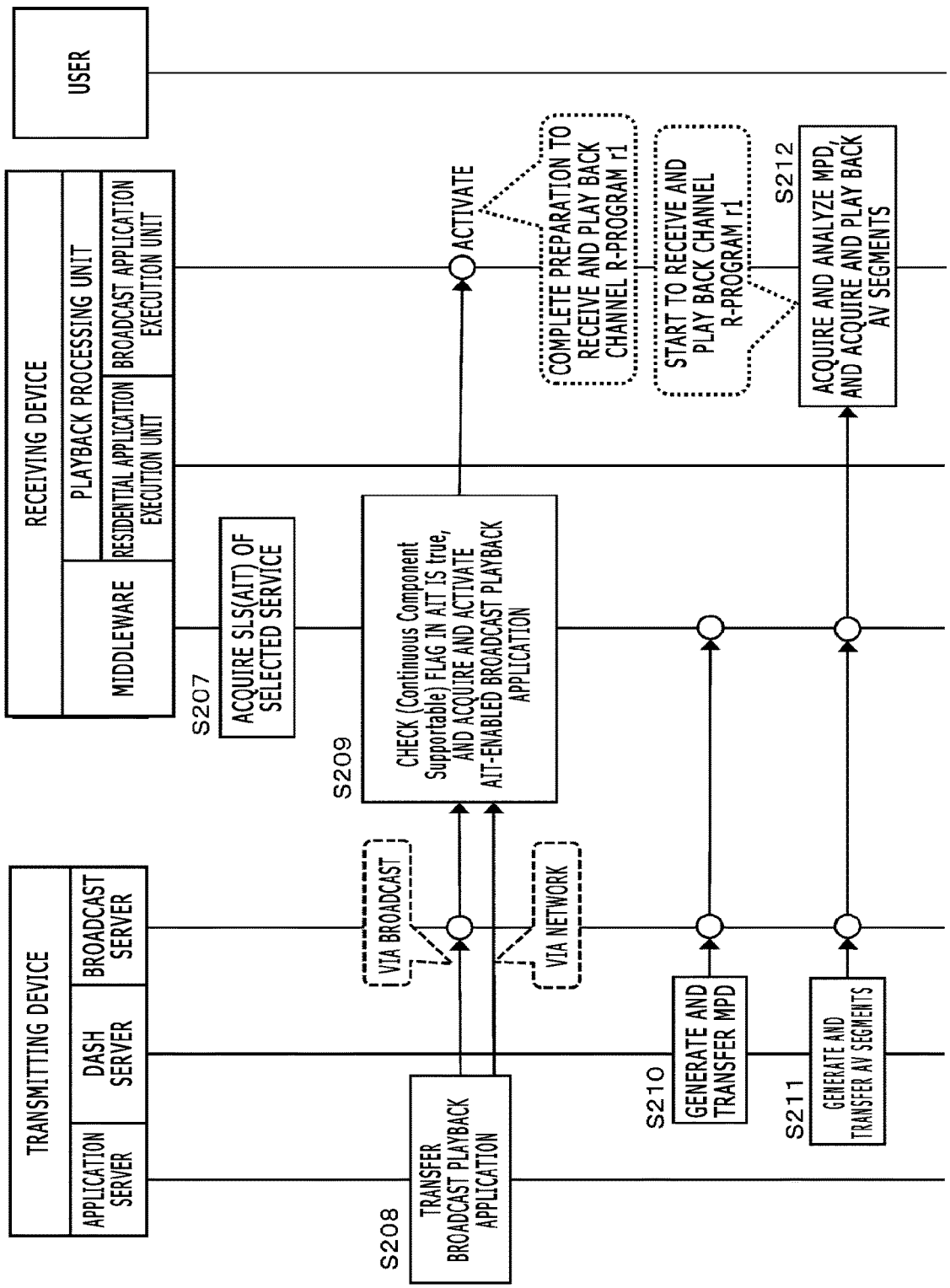
FIG. 25 is an explanatory diagram of an example of an execution sequence of a process for transmitting data from the transmitting device to the receiving device and a process for applying an application in the receiving device.

It is noted that, while various pieces of signaling data (such as the SLT, the SLS, the AIT, and the MPD) are transmitted from the transmitting device and received by the receiving device in the sequence described with reference to FIGS. 24 and 25, transmission timing and reception timing of the signaling data described with reference to FIGS. 24 and 25 are given as an example. The signaling data is continuously and repeatedly transmitted from the transmitting device and the receiving device can receive the signaling data at various timing. Therefore, it is possible to execute signaling data transmission and reception processes at timing different from the transmission and reception timing described with reference to FIGS. 24 and 25.

The broadcast playback application and the broadcast application that are the NRT (non-realtime) contents can be repeatedly transmitted by the transmitting device as needed, and transmission and reception timing of these data can also be set to differ from the transmission and reception timing described with reference to FIGS. 24 and 25.

Moreover, the signaling data transmitted by the transmitting device is updated as appropriate, and is configured such that whether the signaling data has been updated can be confirmed by a version number or the like. The receiving device checks a version of the received signaling data. When confirming reception of newer signaling data than the previously-received signaling data, the receiving device abandons the previously-received signaling data, stores the updated signaling data in the storage unit, and executes the processes to which the updated signaling data is applied.

Through such a process, the receiving device executes the processes according to the new signaling data as needed.

9-4. (Process Example 4) Process Example of Executing Broadcast Application Based on AIT Description in Receiving Device (Process Example 4) A process example of executing a broadcast application (not a broadcast playback application) based on an AIT description in the receiving device will next be described with reference to FIGS. 26 and 27.

A process in each step depicted in FIGS. 26 and 27 will be described below in succession.

(Step S301)

In Step S301, the broadcast server transmits the SLT (Service List Table) that is the signaling data.

As previously described with reference to FIGS. 9 and 10, the SLT (Service List Table) is a table that records the control information per service such as each broadcast station or each program.

As depicted in FIG. 10, the SLT (Service List Table) includes the service entries corresponding to the services, and (p) basic attribute information per service, and (q) service signaling boot strap address are recorded in each service entry.

Furthermore, in (p) basic attribute information per service, the service category identifier previously described with reference to FIGS. 11 to 14 is recorded. In other words, the service category identifier that makes it possible to confirm whether the application applied to the processes on the data corresponding to the service is at least one of:

the residential playback application, the broadcast playback application, and the other broadcast application is recorded in (p) basic attribute information per service.

When the service category identifier described with reference to FIGS. 13 and 14 is used, it is also possible to distinguish whether the application is the broadcast playback application (native type) or the broadcast playback application (shared type).

(Step S302)

Next, the middleware of the receiving device displays a list of services, for example, a program list provided by the transmitting device on the display unit on the basis of the SLT received from the transmitting device.

(Step S303)

In Step S303, the user of the receiving device selects a program desired to be viewed from the service list (program list) displayed on the display unit of the receiving device. In other words, the user determines a service to be received.

Determination information is input to the middleware of the receiving device.

In the present process example, it is assumed that the user has changed Program q1 on Channel Q that is currently viewed to select an application-based service.

(Step S304)

In Step S304, the middleware of the receiving device checks the service category of the user's selected service (for example, service=application-based service) while referring to the SLT (Service List Table) received in Step S302.

As described above, the following information of each service is recorded in the SLT (Service List Table):

(p) basic attribute information per service, and (q) service signaling boot strap address.

Furthermore, as (p) basic attribute information per service, the service category identifier previously described with reference to FIGS. 11 to 14 is recorded.

In Step S304, the middleware of the receiving device checks the service category identifier of the user's selected service (application-based service), and confirms which of the following applications is the application applied to the processes on the data corresponding to the user's selected service:

the residential playback application, the broadcast playback application, and the other broadcast application.

In the present process example, it is assumed that the service category identifier of the user's selected service (application-based service) indicates that the other broadcast application, that is, the broadcast application is applied to the service.

In this case, the receiving device confirms the application that is being executed in the playback processing unit. When the residential playback application is being activated in the playback processing unit, the receiving device stops the residential playback application.

For example, when the residential playback application is being activated, for example, when Program q1 on set Channel Q before service transition is played back by the residential playback application, the receiving device stops the residential playback application.

(Step S305)

Step S305 is a process by the application server of the transmitting device.

In Step S305, the application server of the transmitting device generates the broadcast application applied to execution of the user's selected application-based service and the AIT (Application Information Table) that is the signaling data recording the control information on the broadcast application.

It is noted that, in the present process example, the application generated in Step S305 is not the playback application applied to the playback process on the AV segments constituting the program itself that is the main content constituting the service. In other words, it is assumed that the application is the broadcast application different from the broadcast playback application and applied to execution of the application-based service.

(Step S306)

Step S306 is a process by the broadcast server of the transmitting device.

The broadcast server generates and transmits the SLS (Service Level Signaling) that stores the AIT (Application Information Table) generated by the application server in Step S306.

The SLS (Service Level Signaling) is the signaling data recording the control information and the attribute information per service.

As previously described with reference to FIGS. 9 and 10, the receiving device can acquire the SLS on the basis of the recorded information in the service entry recorded in the SLT (Service List Table) received previously.

(Step S307)

Step S307 is a process by the middleware of the receiving device.

In Step S307, the middleware of the receiving device acquires the SLS (Service Level Signaling) transmitted by the broadcast server of the transmitting device in Step S306 and storing the AIT (Application Information Table).

This is the SLS transmitted from the transmitting device as the signaling data associated with the user's selected service (application-based service) and corresponding to the service.

(Step S308)

Step S308 is a process by the application server of the transmitting device.

In Step S308, the application server of the transmitting device generates and transmits a broadcast application. A transmission process is executed via the broadcast wave or the network.

It is noted that the application transmitted in Step S308 is the broadcast application applicable to the execution of the user's selected service (application-based service).

(Step S309)

Step S309 is a process by the middleware of the receiving device and the broadcast application execution unit in the playback processing unit of the receiving device. The middleware of the receiving device acquires the AIT (Application Information Table) from the SLS (Service Level Signaling) received in Step S307.

The AIT included in this SLS is an AIT recording attribute and control information on the broadcast application transmitted by the application server of the transmitting device in Step S308.

The middleware of the receiving device checks the value (true or false) of the delivery application identification flag (Continuous Component Supportable flag) recorded in the acquired AIT.

In the present process example, the application transmitted by the application server of the transmitting device in Step S308 is not the broadcast playback application serving as the playback application for the AV segments of the main content (program) of the service but the broadcast application executing the other process. Therefore, the value of the delivery application identification flag is set to false. In other words, it is confirmed that the application associated with this AIT (application transmitted by the application server of the transmitting device in Step S308) is not the playback application for the AV segments of the main content (program) of the service.

The middleware of the receiving device causes the broadcast application execution unit in the playback processing unit of the receiving device to activate and execute the broadcast application transmitted by the application server of the transmitting device in Step S308 on the basis of this check of the delivery application identification flag.

Reception and execution of the user's selected service (application-based service) is thereby started.

Through these processes, the service (Program q1 on Channel Q) that has been played back before transition while, for example, the residential playback application is applied to the playback is stopped, and the user's selected transition-destination service (application-based service) is executed while the broadcast application is applied to the execution.

Figure 26:
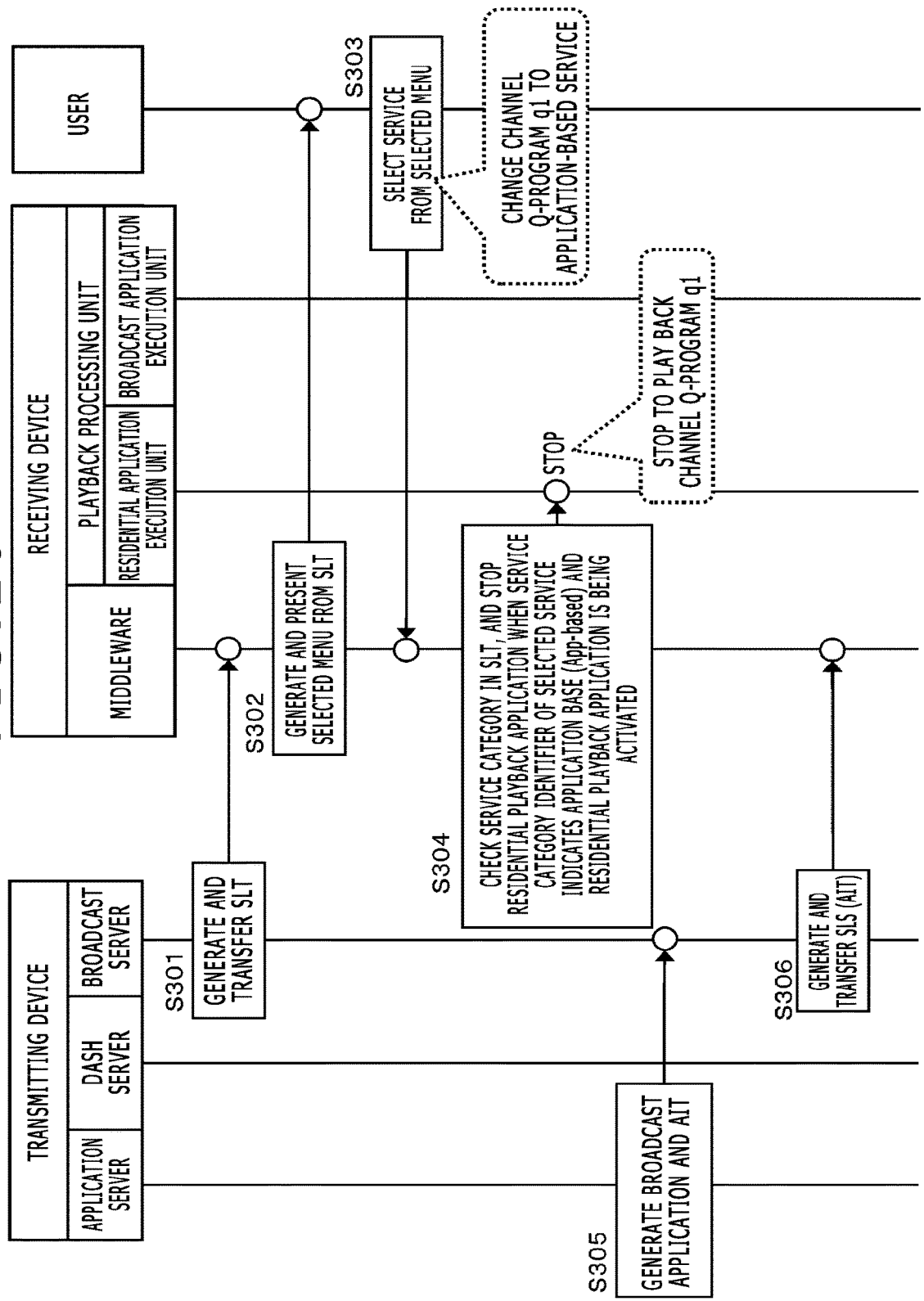
FIG. 26 is an explanatory diagram of an example of an execution sequence of a process for transmitting data from the transmitting device to the receiving device and a process for applying an application in the receiving device.
Figure 27:
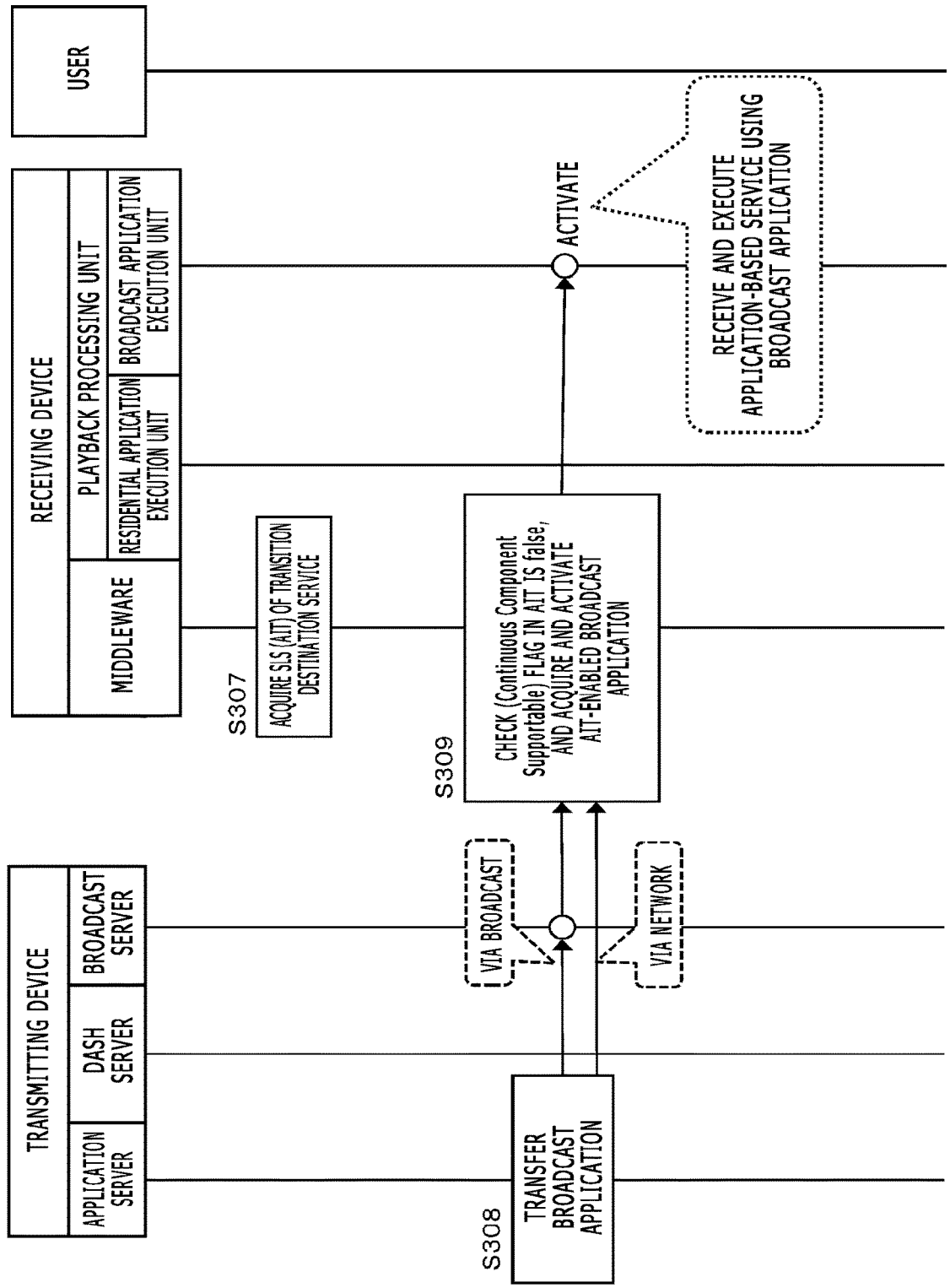
FIG. 27 is an explanatory diagram of an example of an execution sequence of a process for transmitting data from the transmitting device to the receiving device and a process for applying an application in the receiving device.

It is noted that, while various pieces of signaling data (such as the SLT, the SLS, the AIT, and the MPD) are transmitted from the transmitting device and received by the receiving device in the sequence described with reference to FIGS. 26 and 27, transmission timing and reception timing of the signaling data described with reference to FIGS. 26 and 27 are given as an example. The signaling data is continuously and repeatedly transmitted from the transmitting device and the receiving device can receive the signaling data at various timing. Therefore, it is possible to execute signaling data transmission and reception processes at timing different from the transmission and reception timing described with reference to FIGS. 26 and 27.

The broadcast playback application and the broadcast application that are the NRT (non-realtime) contents can be repeatedly transmitted by the transmitting device as needed, and transmission and reception timing of these data can also be set to differ from the transmission and reception timing described with reference to FIGS. 24 and 25.

Moreover, the signaling data transmitted by the transmitting device is updated as appropriate, and is configured such that whether the signaling data has been updated can be confirmed by a version number or the like. The receiving device checks a version of the received signaling data. When confirming reception of newer signaling data than the previously-received signaling data, the receiving device abandons the previously-received signaling data, stores the updated signaling data in the storage unit, and executes the processes to which the updated signaling data is applied.

Through such a process, the receiving device executes the processes according to the new signaling data as needed.

10. Configuration Example of Transmitting Device and Receiving Device

Next, a device configuration example of the transmitting device (server) 20 and the receiving device (client) 30 that are communication devices will next be described with reference to FIGS. 28 and 29.

Figure 28:
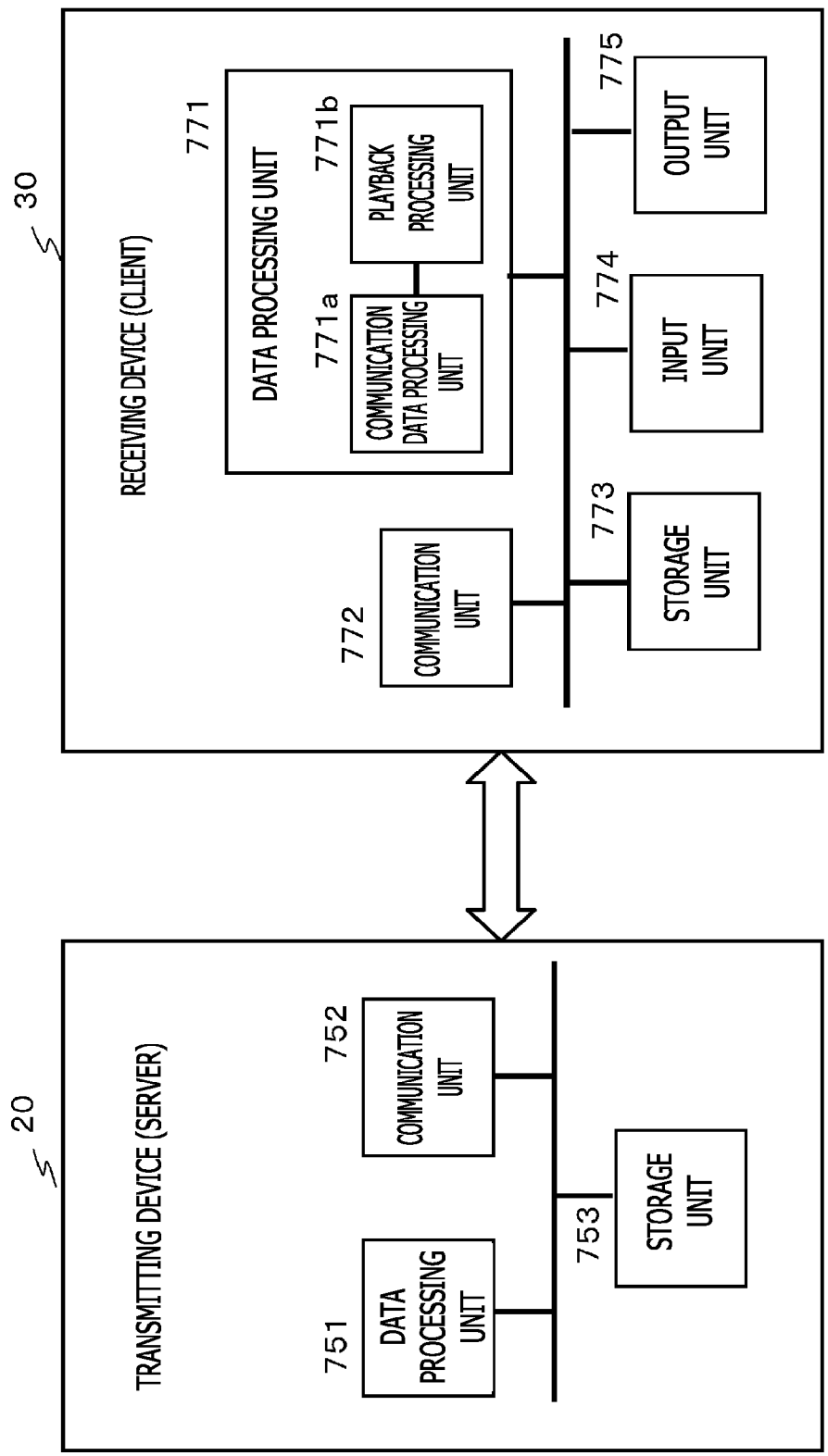
FIG. 28 is an explanatory diagram of an example of configurations of the transmitting device and the receiving device that are communication devices.

FIG. 28 depicts a configuration example of the transmitting device (server) 20 and the receiving device (client) 30.

The transmitting device (server) 20 includes a data processing unit 751, a communication unit 752, and a storage unit 753.

The receiving device (client) 30 includes a data processing unit 771, a communication unit 772, a storage unit 773, an input unit 774, and an output unit 775. The data processing unit 771 includes a communication data processing unit 771*a* and a playback processing unit 771*b*.

The data processing unit 751 of the transmitting device (service) 20 executes various data processes for executing a data delivery service. For example, the data processing unit 751 exercises a generation control over configuration data on a data delivery service and a transmission control over the data delivery service. Furthermore, the data processing unit 751 performs generation and transmission processes on the AV segments that constitute the program data or the like, the applications, the various other data, the signaling data, and the like provided to the receiving device (client) 30.

The communication unit 752 performs a communication process such as a delivery process on the AV segments that constitute the program data or the like, the applications, the various other data, the signaling data, and the like.

The storage unit 753 stores the AV segments that constitute the program data or the like, the applications, the various other data, the signaling data, and the like to be delivered.

Furthermore, the storage unit 753 is used as a work area for data processes executed by the data processing unit 751 and also used as a storage region for various parameters.

Meanwhile, the receiving device (client) 30 includes the data processing unit 771, the communication unit 772, the storage unit 773, the input unit 774, and the output unit 775.

The communication unit 772 receives data delivered from the transmitting device (server) 20, for example, the AV segments that constitute the program data or the like, the applications, the various other data, and the signaling data.

The data processing unit 771 includes the communication data processing unit 771*a* and the playback processing unit 771*b*, and executes, for example, processes and the like according to the embodiments described above. Specifically, the data processing unit 771 executes the data process and the like using the AV segments, the applications, the various other data, the signaling data, and the like.

Various commands such as user's instruction commands, for example, a channel selection command, an application activation command, and an installation command are input to the receiving device (client) 30 via the input unit 774.

Playback data is output to the output unit 775 such as a display unit and a loudspeaker.

The storage unit 773 stores the AV segments that constitute the program data or the like, the applications, the various other data, the signaling data, and the like. Furthermore, the storage unit 773 is used as a work area for data processes executed by the data processing unit 771 and also used as a storage region for various parameters.

FIG. 29 depicts a hardware configuration example of a communication device applicable to each of the transmitting device 20 and the receiving device 30.

A CPU (Central Processing Unit) 801 functions as a data processing unit that executes various processes in accordance with a program stored in a ROM (Read Only Memory) 802 or a storage unit 808. For example, the CPU 801 executes processes according to the sequences described in the embodiments described above. A RAM (Random Access Memory) 803 stores the program executed by the CPU 801, data, and the like. The CPU 801, the ROM 802, and the RAM 803 are mutually connected by a bus 804.

The CPU 801 is connected to an input/output interface 805 via the bus 804, and an input unit 806 configured with various switches, a keyboard, a mouse, a microphone, and the like and an output unit 807 configured with a display, a loudspeaker, and the like are connected to the input/output interface 805. The CPU 801 executes various processes in response to commands input from the input unit 806, and outputs process results to, for example, the output unit 807.

A storage unit 808 connected to the input/output interface 805 is configured with, for example, a hard disk and stores the program executed by the CPU 801 and various pieces of data. A communication unit 809 functions as a transmitting and receiving unit for data communication via a network such as the Internet or a local area network, also functions as a transmitting and receiving unit for a broadcast wave, and communicates with external devices.

A drive 810 connected to the input/output interface 805 drives a removable medium 811 such as a magnetic disk, an optical disk, a magneto-optical disk or a semiconductor memory, for example, a memory card, and executes recording or reading of data.

While data encoding or decoding can be executed as a process performed by the CPU 801 that serves as a data processing unit, the communication device may be alternatively configured to include a codec that serves as dedicated hardware for executing an encoding process or a decoding process.

11. General Overview of Configuration of Present Disclosure

The embodiments of the present disclosure have been described so far in detail while referring to the specific embodiments. Nevertheless, it is obvious that a person ordinary skilled in the art could make revision of the embodiments or find replacements therefor within the scope of the present disclosure. That is, the present invention has been disclosed in an illustrative form and should not be interpreted exclusively. Reference should be made to claims for the assessment of the scope of the present disclosure.

The technique disclosed in the present specification can be configured as follows.

(1) A receiving device including:

a communication unit receiving a service category identifier that can identify an application applied to a service provided by a transmitting device; and a data processing unit configured to determine an application applied to the service in response to the service category identifier, and perform a continuation process on an application applied before service transition when the service transition occurs and when applications applied to services before and after the transition are same.

(2) The receiving device according to (1), in which the application is a playback application applied to a playback process on a content provided by the transmitting device, and the service category identifier is an identifier capable of identifying the service by determining whether to apply a playback application (a) or a playback application (b) for playback of the service, the playback application (a) being a residential playback application that is a receiving-device resident type playback application, the playback application (b) being a broadcast playback application that is provided by the transmitting device as a playback application for the service provided by the transmitting device.

(3) The receiving device according to (2), in which the data processing unit performs the continuation process on the application applied before the service transition when the service transition occurs and when each of the applications applied to the services before and after the service transition is the residential playback application.

(4) The receiving device according to any one of (1) to (3), in which the application is a playback application applied to a playback process on a content provided by the transmitting device, and the service category identifier is an identifier capable of identifying the service by determining whether to apply a playback application (b1) or a playback application (b2) for the playback of the service, the playback application (b1) being a shared broadcast playback application that is the playback application dedicated to the service provided by the transmitting device and that is applicable to the playback process on a plurality of different services, the playback application (b2) being a native broadcast playback application that is the playback application dedicated to the service provided by the transmitting device and that is applicable only to the playback process on one service.

(5) The receiving device according to (4), in which the data processing unit performs the continuation process on the application applied before the service transition when the service transition occurs and when each of the applications applied to the services before and after the service transition is the shared broadcast playback application.

(6) The receiving device according to any one of (1) to (5), in which the communication unit receives the service category identifier as signaling data transmitted by the transmitting device.

(7) The receiving device according to (6), in which the signaling data is an SLT (Service List Table) storing a service entry that records information per service.

(8) The receiving device according to any one of (1) to (7), in which the service category identifier is an identifier set to be associated with at least one of a service per broadcast station and a service per program provided by a broadcast station.

(9) The receiving device according to any one of (1) to (8), in which the data processing unit determines whether or not applications applied to program playback before and after received channel switching are same when the received channel switching occurs on the basis of the service category identifier, and when confirming that the applications applied to the program playback before and after the received channel switching are the same, performs the continuation process on the application that is being executed before the received channel switching.

(10) The receiving device according to any one of (1) to (9), in which the communication unit further receives a delivery application identification flag indicating whether or not an application received from the transmitting device is a playback application applied to a playback process on the service provided by the transmitting device, and the data processing unit executes an application control on the basis of a value of the delivery application identification flag.

(11) The receiving device according to (10), in which the data processing unit executes a broadcast playback application provided by the transmitting device as the playback application for the service provided by the transmitting device when the value of the delivery application identification flag indicates that the application is the playback application, and executes a broadcast application provided by the transmitting device when the value of the delivery application identification flag indicates that the application is not the playback application.

(12) The receiving device according to (10) or (11), in which the delivery application identification flag is configured in such a manner as to be recorded in an AIT (Application Information Table) recording control information corresponding to the application provided by the transmitting device.

(13) A transmitting device including:

a communication unit configured to transmit configuration data on a service available in a receiving device, a service category identifier capable of identifying an application applied to the service, and the application applied to the service.

(14) The transmitting device according to (13), in which the application is a playback application applied to a playback process on a content provided by the transmitting device, and the service category identifier is an identifier capable of identifying the service by determining whether to apply a playback application (a) or a playback application (b) for playback of the service, the playback application (a) being a residential playback application that is a receiving-device resident type playback application, the playback application (b) being a broadcast playback application that is provided by the transmitting device as a playback application for the service provided by the transmitting device.

(15) The transmitting device according to (13) or (14), in which the application is a playback application applied to a playback process on a content provided by the transmitting device, and the service category identifier is an identifier capable of identifying the service by determining whether to apply a playback application (b1) or a playback application (b2) for the playback of the service, the playback application (b1) being a shared broadcast playback application that is the playback application dedicated to the service provided by the transmitting device and that is applicable to the playback process on a plurality of different services, the playback application (b2) being a native broadcast playback application that is the playback application dedicated to the service provided by the transmitting device and that is applicable only to the playback process on one service.

(16) The transmitting device according to any one of (13) to (15), in which
the communication unit records the service category identifier in an SLT (Service List Table) storing a service entry that records information per service, and
transmits the SLT (Service List Table).

(17) The transmitting device according to any one of (13) or (16), in which
the service category identifier is an identifier set to be associated with at least one of a service per broadcast station and a service per program provided by a broadcast station.

(18) The transmitting device according to any one of (13) to (17), in which
the communication unit further transmits a delivery application identification flag indicating whether or not an application transmitted by the transmitting device is a playback application applied to a playback process on the service provided by the transmitting device.

(19) A data processing method executed by a receiving device, including:
receiving, by a communication unit, a service category identifier capable of identifying an application applied to a service provided by a transmitting device;
determining, by a data processing unit, an application applied to the service in response to the service category identifier; and
performing, by the data processing unit, a continuation process on an application applied before service transition when the service transition occurs and when applications applied to services before and after the service transition are same.

(20) A data processing method executed by a transmitting device, comprising:
transmitting configuration data on a service available in a receiving device,
a service category identifier capable of identifying an application applied to the service, and
the application applied to the service.

Furthermore, a series of processes described in the specification can be implemented by hardware, software or a combined configuration of the hardware and the software. If the processes are implemented by the software, then a program recording a process sequence can be executed by being installed in a memory within a computer incorporated into dedicated hardware, or can be executed by being installed in a general-purpose computer capable of executing various processes. For example, the program can be recorded in a recording medium in advance. The program can be executed by not only being installed from the recording medium in the computer but also by being received via the network such as the LAN (Local Area Network) or the Internet and being installed in a recording medium such as a hard disk embedded in the computer.

The various processes described in the specification may be executed not only in time series in accordance with the description but also executed individually or in parallel in response to a processing capability of a device that executes the processes or as needed. Moreover, a system means in the present specification a logical assembly configuration of a plurality of devices and is not limited to a system in which devices with configurations are provided in the same casing.

INDUSTRIAL APPLICABILITY

As described so far, according to the configuration of one embodiment of the present disclosure, a configuration in which the playback application applied in the receiving device can be determined using the service category identifier recorded in the SLT that can be received in advance is realized.

Specifically, the service category identifier capable of identifying an application applied to a provided service such as a program provided by the transmitting device is transmitted to the receiving device. The receiving device performs a continuation process on an application applied before service transition when the service transition occurs and when applications applied to services before and after the transition are same. The service category identifier is an identifier capable of identifying the service by determining whether to apply a residential playback application or a broadcast playback application for playback of the service.

With the present configuration, a configuration is realized such that a playback application applied in a receiving device can be determined using a service category identifier recorded in an SLT that can be received in advance.

REFERENCE SIGNS LIST

10: Communication system
20: Transmitting device
21: Broadcast server
22: Data delivery server
30: Receiving device
31: TV
32: PC
33: Mobile terminal
50: Signaling data
60: AV segment
70: Other data
110: Middleware
111: Communication unit (PHY/MAC)
112: Signaling acquisition unit
113: Signaling analysis unit
114: Segment acquisition unit
120: HTTP proxy server
121: Cache unit
122: Address resolving unit
130: Playback processing unit (application execution unit)
131: Playback control unit
132: Output control unit
201: MPD acquisition unit
202: MPD analysis unit
203: Segment acquisition unit
204: Segment analysis unit
211: Decoding unit
212: Output unit
301: Service list table (SLT)
311 to 313: Service
351 to 353: Service entry
361: Basic attribute information per service
362: Service signaling boot strap address
751: Data processing unit
752: Communication unit
753: Storage unit
771: Data processing unit
772: Communication unit
773: Storage unit
774: Input unit
775: Output unit
801: CPU
802: ROM
803: RAM
804: Bus 805: Input/output interface
806: Input unit
807: Output unit
808: Storage unit
809: Communication unit
810: Drive
811: Removable medium

The invention claimed is:

1. A receiving device comprising:
a receiver configured to receive service category identifiers that identify a category of an application associated with each service provided via broadcast by a transmitting device, wherein the identified category of the application indicates one of a receiving-device resident type application and an application transmitted to the receiving device for a service provided by the transmitting device; and
circuitry configured to
determine applications associated with services before and after a service transition based on the service category identifiers, and
perform a continuation process on an application executed before service transition when the service transition occurs and in response to a determination that service category identifiers of the applications associated with the services before and after the service transition are determined to be same, wherein
the service category identifiers are included in a Service List Table (SLT), and
types of the categories of the application include audio only service and audio visual service.

2. The receiving device according to claim 1, wherein the application associated with each service is a playback application for performing a playback process on a content provided by the respective service.

3. The receiving device according to claim 2, wherein the circuitry performs the continuation process on the application executed before the service transition when the service transition occurs and in response to a determination that the service category identifiers of each of the applications associated with the services before and after the service transition indicate the receiving-device resident type application.

4. The receiving device according to claim 1, wherein the application associated with each service is a playback application for performing a playback process on a content provided by the respective service, and the service category identifier further indicates whether the associated playback application is a shared broadcast playback application that is provided via broadcast by the transmitting device and that is associated with a plurality of different services, or whether the associated playback application is associated only with one service.

5. The receiving device according to claim 4, wherein the circuitry performs the continuation process on the application executed before the service transition when the service transition occurs and in response to a determination that the service category identifiers of each of the applications associated with the services before and after the service transition indicates the shared broadcast playback application.

6. The receiving device according to claim 1, wherein the receiver receives the service category identifiers as signaling data transmitted by the transmitting device.

7. The receiving device according to claim 6, wherein the signaling data is the SLT (Service List Table) storing a service entry that records information per service.

8. The receiving device according to claim 1, wherein each service category identifier is an identifier set to be associated with at least one of a service per broadcast station and a service per program provided by a broadcast station.

9. The receiving device according to claim 1,
the circuitry determines whether or not the service category identifiers of the applications associated with services before and after received channel switching are same when the received channel switching occurs, and,
when it is determined that the service category identifiers of the applications associated with the services before and after the received channel switching are the same, performs the continuation process on the application that is being executed before the received channel switching.

10. The receiving device according to claim 1, wherein
the receiver further receives a delivery application identification flag indicating whether or not an application received from the transmitting device is a playback application associated with a service provided by the transmitting device, and
the circuitry executes an application control on the basis of a value of the delivery application identification flag.

11. The receiving device according to claim 10, wherein the circuitry
executes a broadcast playback application provided by the transmitting device as the playback application for the service provided by the transmitting device when the value of the delivery application identification flag indicates that the application is the playback application associated with the service, and
executes a broadcast application provided by the transmitting device when the value of the delivery application identification flag indicates that the application is not the playback application associated with the service.

12. The receiving device according to claim 10, wherein the delivery application identification flag is configured in such a manner as to be recorded in an AIT (Application Information Table) recording control information corresponding to the application provided by the transmitting device.

13. A transmitting device comprising:
a transmitter configured to transmit to a receiving device
configuration data on services available in the receiving device,
service category identifiers identifying a category of an application associated with each service, wherein the identified category of the application indicates one of a receiving-device resident type application and an application transmitted to the receiving device for a service provided by the transmitting device, and
applications associated with the services, wherein
the receiving device is configured to
determine applications associated with services before and after a service transition in the receiving device based on the transmitted service category identifiers, and
perform a continuation process on an application executed before service transition in the receiving device when the service transition occurs and in response to a determination that service category identifiers of the applications associated with the services before and after the service transition are determined to be same, the service category identifiers are included in a Service List Table (SLT), and types of the categories of the application include audio only service and audio visual service.

14. The transmitting device according to claim 13, wherein
the application associated with each service is a playback application for performing a playback process on a content provided by the respective service.

15. The transmitting device according to claim 13, wherein
the application associated with each service is a playback application for performing a playback process on a content provided by the respective service, and
the service category identifier further indicates whether the associated playback application is a shared broadcast playback application that is provided via broadcast by the transmitting device and that is associated with a plurality of different services, or whether the associated playback application is associated with only one service.

16. The transmitting device according to claim 13, wherein the transmitter records the service category identifier in the SLT (Service List Table) storing a service entry that records information per service, and transmits the SLT (Service List Table).

17. The transmitting device according to claim 13, wherein each service category identifier is an identifier set to be associated with at least one of a service per broadcast station and a service per program provided by a broadcast station.

18. The transmitting device according to claim 13, wherein
the transmitter further transmits a delivery application identification flag indicating whether or not an application transmitted by the transmitting device is a playback application associated with a service provided by the transmitting device.

19. A data processing method executed by a receiving device, comprising:
receiving, by a receiver, service category identifiers that identify a category of an application associated with each service provided via broadcast by a transmitting device, wherein the identified category of the application indicates one of a receiving-device resident type application and an application transmitted to the receiving device for a service provided by the transmitting device;

determining, by circuitry, applications associated with services before and after a service transition based on the service category identifiers; and performing, by the circuitry, a continuation process on an application executed before service transition when the service transition occurs and in response to a determination that service category identifiers of the applications associated with the services before and after the service transition are determined to be same, wherein the ice category identifiers are included in a Service List Table (SLT), and types of the categories of the application include audio only service and audio visual service.

20. A data processing method executed by a transmitting device, comprising:
transmitting, to a receiving device,
configuration data on services available in the receiving device,
service category identifiers identifying a category of an application associated with each service, wherein the identified category of the application indicates one of a receiving-device resident type application and an application transmitted to the receiving device for a service provided by the transmitting device, and
applications associated with the services, wherein the receiving device is configured to
determine applications associated with services before and after a service transition in the receiving device based on the transmitted service category identifiers, and
perform a continuation process on an application executed before service transition in the receiving device when the service transition occurs and in response to a determination that service category identifiers of the applications associated with the services before and after the service transition are determined to be same, the service category identifiers are included in a Service List Table (SLT), and types of the categories of the application include audio only service and audio visual service.

* * * * *

UNITED STATES PATENT AND TRADEMARK OFFICE
CERTIFICATE OF CORRECTION

PATENT NO. : 10,595,064 B2
APPLICATION NO. : 15/566900
DATED : March 17, 2020
INVENTOR(S) : Yasuaki Yamagishi et al.

It is certified that error appears in the above-identified patent and that said Letters Patent is hereby corrected as shown below:

In the Claims

At Column 62, Line 9, replace "1," with --1, wherein--

At Column 64, Line 14, replace "ice category" with --service category--

Signed and Sealed this
Fifteenth Day of August, 2023

Katherine Kelly Vidal
*Director of the United States Patent and Trademark Office*